(12) United States Patent
Arimoto

(10) Patent No.: US 6,263,751 B1
(45) Date of Patent: Jul. 24, 2001

(54) HYDRAULIC CIRCUIT FOR CONTROLLING AN AUTOMATIC TRANSMISSION

(75) Inventor: Takashi Arimoto, Neyagawa (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/412,790

(22) Filed: Oct. 5, 1999

(30) Foreign Application Priority Data

Oct. 7, 1998 (JP) .................................................. 10-285278

(51) Int. Cl.$^7$ .............................. F16H 61/30; F16D 25/10
(52) U.S. Cl. ......................... 74/335; 477/906; 192/87.18
(58) Field of Search ..................... 477/906, 125; 74/335; 192/87.18, 87.14

(56) References Cited

U.S. PATENT DOCUMENTS

| | | | |
|---|---|---|---|
| 4,729,408 | * | 3/1988 | Coutant ............................. 137/637.1 |
| 5,622,080 | * | 4/1997 | Furukawa .............................. 74/335 |
| 6,010,427 | * | 1/2000 | Hagimoto et al. ............... 477/906 X |
| 6,055,879 | * | 5/2000 | Abe et al. ..................... 192/87.18 X |

* cited by examiner

Primary Examiner—Charles A Marmor
Assistant Examiner—Ankur Parekh
(74) Attorney, Agent, or Firm—Shinjyu Global IP Counselors, LLP

(57) ABSTRACT

An automatic transmission hydraulic control circuit for controlling forward and reverse hydraulic clutches provided in an automatic transmission for setting a vehicle to a selected state among forward, reverse and neutral states, includes a main pressure transmission line for selectively transmitting a main pressure for operating only one at any time of the forward or reverse hydraulic clutch, forward/reverse selecting valves for switching the main pressure transmission line to set the vehicle to the selected state; and a neutral valve for interrupting transmission of the main pressure setting the vehicle to the forward or reverse state opposite to the selected state when the forward/reverse selecting valves cannot operate. The main pressure is supplied to the hydraulic clutches via the forward/reverse selecting valves as well as the neutral valve.

15 Claims, 39 Drawing Sheets

HYDRAULIC CIRCUIT FOR CONTROLLING AN AUTOMATIC TRANSMISSION

BACKGROUND OF THE INVENTION

A. Field of the Invention

The invention relates to a hydraulic circuit for controlling an automatic transmission in an automotive vehicle, and particularly a hydraulic circuit for controlling operation of forward and reverse clutches within an automatic transmission whereby the hydraulic circuit controls selection of torque transmission state, such as a forward drive state, a reverse drive state and a neutral state of the automatic transmission.

B. Description of the Background Art

An automatic transmission of a vehicle such as a construction machine or an industrial machine has forward and reverse hydraulic clutches which are hydraulically operated for forward drive and reverse drive, respectively. These clutches are controlled by a hydraulic circuit to set a vehicle in motion a forward drive state, a reverse drive state or a neutral state, where the drive state is selected by a vehicle driver or operator.

FIG. 7 shows a known structure of such a control hydraulic circuit (i.e., hydraulic circuit for control). A control hydraulic circuit 601 has a main pressure transmission line 602 which provides fluid pressure to a forward hydraulic clutch 611 and a reverse hydraulic clutch 612 via an accumulator 691, an inching valve 692 and a forward/reverse selector valve 641, and a pilot pressure transmission line 603 which is branched from the main pressure transmission line 602 and is connected to the forward/reverse selector valve 641 via a solenoid valve 671. Each of the transmission lines 602 and 603 carries working fluid that provides hydraulic pressure to the above valves for operation thereof.

The main pressure transmission line 602 extends through the accumulator 691 and the inching valve 692 and is thereafter divided into two main pressure transmission lines 621 and 622, which are connected to different portions of the forward/reverse selector valve 641, respectively. The forward/reverse selector valve 641 is internally provided with a forward selector spool 642 and a reverse select spool 652, which are opposed to each other with a spring 643 therebetween. The main pressure transmission lines 621 and 622 are connected via the forward/reverse selector valve 641 to main pressure transmission lines 623 and 624, which are connected to the forward and reverse hydraulic clutches 611 and 612, respectively.

A pilot pressure transmission line 603 is connected to the solenoid valve 671, and then is divided into two pilot pressure transmission lines 631 and 632, which are connected to different portions of the forward/reverse selector valve 641, respectively, as shown in FIG. 6. The solenoid valve 671 is internally provided with a direction select spool 672, which can move leftward or rightward depending on a signal sent to the solenoid valve 671. The pilot pressure transmission line 631 is connected to the side in the forward/reverse selector valve 641 near the forward selector spool 642, and the pilot pressure transmission line 632 is connected to the side near the reverse select spool 652.

In this control hydraulic circuit 601, a vehicle driver specifies or selects the forward, reverse or neutral setting via a control panel or control switch (not shown), whereby an electric signal is sent to the solenoid valve 671. Thereafter, the direction select spool 672 moves to a predetermined position corresponding to the forward drive state, the reverse drive state or the neutral state so that a flow path of the working fluid applying a pilot pressure is changed.

When the forward drive state is selected, the direction select spool 672 is pulled leftward by the solenoid. Thereby, the pilot pressure transmission line 631 opens so that the pilot pressure is transmitted via the pilot pressure transmission line 631 to the forward/reverse selector valve 641. The working fluid in the pilot pressure transmission line 631 flows into the side in forward/reverse selector valve 641 near the forward selector spool 642. Thereafter, the fluid pressure of the working fluid causes the forward selector spool 642 to move rightward against resistance of the spring 643. Since a right enlarged portion of the forward selector spool 642, which has closed the main pressure transmission line 623, moves rightward, the main pressure transmission line 623 opens. Thereby, the main pressure which has been cut off at an outlet of the main pressure transmission line 621 is transmitted to the main pressure transmission line 623, and further is supplied to the forward hydraulic clutch 611 to activate the forward hydraulic clutch 611. In this manner, the forward drive selected by the vehicle driver is executed.

When the reverse drive is selected, the direction select spool 672 is pushed rightward by the solenoid 671. Thereby, the pilot pressure transmission line 632 opens so that the pilot pressure transmitted through the pilot pressure transmission line 603 is transmitted to the forward/reverse selector valve 641 via the pilot pressure transmission line 632. The working fluid in the pilot pressure transmission line 632 flows toward the reverse select spool 652 of the forward/reverse selector valve 641. Thereafter, the fluid pressure of the working fluid pushes the reverse select spool 652 leftward against the biasing force of the spring 643. Since the left enlarged portion of the reverse select spool 652 which has closed the main pressure transmission line 624 moves leftward, the main pressure transmission line 624 opens. Thereby, the main pressure in the main pressure transmission line 622 which had been obstructed by the reverse select spool 652, is now transmitted into the main pressure transmission line 624, and then is supplied to the reverse hydraulic clutch 612 so that the reverse hydraulic clutch 612 is operated. In this manner, the reverse drive selected by the vehicle driver is executed.

When the neutral position is selected, the direction select spool 672 moves to a position where the left enlarged portion closes the pilot pressure transmission line 631, and the right enlarged portion closes the pilot pressure transmission line 632. Thereby, the pilot pressure is cut off by the solenoid valve 671, and is not transmitted to the forward/reverse selector valve 641. Accordingly, the forward/reverse selector valve 641 maintains the main pressure transmission lines 621 and 622 in the interrupted state, and the main pressure is transmitted to neither the forward hydraulic clutch 611 nor the reverse hydraulic clutch 612. In this manner, the neutral position selected by the vehicle driver is achieved.

However, a so-called "stick" may occur. More specifically, the select spools 642 and 652 sometimes are not able to return to the initial neutral position due to clogging of dust particles or the like which may enter the forward/reverse selector valve. In this case, the hydraulic circuit having the above structure may drive the vehicle in a direction opposite to that selected by the vehicle driver. For example, let us assume that a "stick" occurs where the forward drive has been selected in FIG. 7, and thus the forward selector spool 642 moved to the right position cannot return to the initial neutral position shown in FIG. 7. In this case, if the vehicle driver who is not aware of the stick releases the forward drive state and selects the reverse drive state, the reverse select spool 652 cannot move leftward because the forward selector spool 642 cannot return from the right position. Therefore, it is impossible to open the main pressure transmission line 624 for operating the reverse hydraulic clutch 612, and the main pressure transmission line 623 remains open so that the main pressure is supplied to the forward hydraulic clutch 611. As a result, the vehicle is driven forward although the driver has selected the reverse drive state. Conversely, the stick may occur in the reverse drive state, in which case the vehicle is reversed even if the forward drive is selected. As described above, the stick in the forward/reverse selector valve may cause a risky state that the vehicle moves in a direction opposite to the direction intended by the driver.

SUMMARY OF THE INVENTION

One object of the invention is to prevent a transmission in a vehicle from being engaged in a drive state that is opposite to a direction selected by a vehicle driver.

Another object of the present invention, is to prevent engagement of a drive state in a transmission in response to a stuck control valve that might otherwise cause the transmission to be engaged in an unselected drive state.

In accordance with one aspect of the present invention, a hydraulic control circuit for controlling forward and reverse hydraulic clutches is provided in an automatic transmission for engaging the automatic transmission in any one of a plurality selected states including a forward drive state, a reverse drive state and a neutral drive state. The hydraulic control circuit includes a main pressure transmission line in selective fluid communication with a forward hydraulic clutch and a reverse hydraulic clutch such that transmission of a main pressure in an operating fluid in the main pressure transmission line causes one of the forward hydraulic clutch and the reverse hydraulic clutch to become engaged for torque transmission through the automatic transmission. A first forward/reverse selecting valve selectively directs the main pressure in the operating fluid from the main pressure transmission line to the forward hydraulic clutch. A second forward/reverse selecting valve selectively directs the main pressure in the operating fluid from the main pressure transmission line to the reverse hydraulic clutch. The first and second forward/reverse selecting valves are connected together such that in response to one of the first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches.

Preferably, a portion of the first forward/reverse selecting valve is connected in series to a portion of the second forward/reverse selecting valve such that the main pressure in the operating fluid is directed through the portion of the first forward/reverse selecting valve in response to selection of the reverse hydraulic clutch, and in response to the first forward/reverse selecting valve becoming jammed in an undesirable position, the main pressure in the operating fluid directed through the second forward/reverse selecting valve is prevented from transmission to the reverse clutch.

Preferably, a portion of the second forward/reverse selecting valve is connected in series to a portion of the first forward/reverse selecting valve such that the main pressure in the operating fluid is directed through the portion of the second forward/reverse selecting valve in response to selection of the forward hydraulic clutch, and in response to the second forward/reverse selecting valve becoming jammed in an undesirable position, the main pressure in the operating fluid directed through the first forward/reverse selecting valve is prevented from transmission to the forward clutch.

Preferably, a pilot pressure transmission line is connected to the main pressure transmission line for receiving the working fluid. A forward solenoid is connected to the pilot pressure line and a portion of the first forward/reverse selecting valve and the forward solenoid is adapted for selectively controlling transmission of pilot pressure in the working fluid from the pilot pressure transmission line to the first forward/reverse selecting valve.

Preferably, a reverse solenoid is connected to the pilot pressure line and a portion of the second forward/reverse selecting valve, the forward solenoid being adapted for selectively controlling transmission of pilot pressure in the working fluid from the pilot pressure transmission line to the second forward/reverse selecting valve.

Preferably, the control circuit further includes a neutral control valve. Portions of the first and second forward/reverse selecting valve are in fluid communication with the neutral control valve such that the neutral control valve and the first and second forward/reverse selecting valves are connected together such that in response to one of the neutral control valve and the first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches.

In accordance with another aspect of the present invention, a hydraulic control circuit for controlling forward and reverse hydraulic clutches is provided in an automatic transmission for engaging the automatic transmission in any one of a plurality selected states including a forward drive state, a reverse drive state and a neutral drive state. The hydraulic control circuit includes a main pressure transmission line in selective fluid communication with a forward hydraulic clutch and a reverse hydraulic clutch such that transmission of a main pressure in an operating fluid in the main pressure transmission line causes one of the forward hydraulic clutch and the reverse hydraulic clutch to become engaged for torque transmission through the automatic transmission. A means for selective control of engagement of the forward hydraulic clutch is in selective fluid communication with the main pressure transmission line. A means for selective control of the reverse hydraulic clutch is in selective fluid communication with the main pressure transmission line. Further, there is a means for preventing mis-engagement of the forward and reverse hydraulic clutches.

Preferably, the means for selective control of engagement of the forward hydraulic control includes a first forward/reverse selecting valve that is adapted for selectively directing the main pressure in the operating fluid from the main pressure transmission line to the forward hydraulic clutch.

Preferably, the means for selective control of engagement of the reverse hydraulic control includes a second forward/reverse selecting valve adapted for selectively directing the main pressure in the operating fluid from the main pressure transmission line to the reverse hydraulic clutch.

Preferably, the first and second forward/reverse selecting valves are connected together such that in response to one of the first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches Preferably, a portion of the first forward/reverse selecting valve is connected in series to a portion of the second forward/reverse selecting valve such that the main pressure in the operating fluid is directed through the portion of the first forward/reverse selecting valve in response to selection of the reverse hydraulic clutch, and in response to the first forward/reverse selecting valve becoming jammed in an undesirable position, the main pressure in the operating fluid directed through the second forward/reverse selecting valve is prevented from transmission to the reverse clutch.

Preferably, a portion of the second forward/reverse selecting valve is connected in series to a portion of the first forward/reverse selecting valve such that the main pressure in the operating fluid is directed through the portion of the second forward/reverse selecting valve in response to selection of the forward hydraulic clutch, and in response to the second forward/reverse selecting valve becoming jammed in an undesirable position, the main pressure in the operating fluid directed through the first forward/reverse selecting valve is prevented from transmission to the forward clutch Preferably, the hydraulic control circuit also includes a pilot pressure transmission line connected to the main pressure transmission line for receiving the working fluid. A forward solenoid is connected to the pilot pressure line and a second portion of the first forward/reverse selecting valve, the forward solenoid being adapted for selectively controlling transmission of pilot pressure in the working fluid from the pilot pressure transmission line to the first forward/reverse selecting valve.

Preferably, a reverse solenoid is connected to the pilot pressure line and a second portion of the second forward/reverse selecting valve, the forward solenoid being adapted for selectively controlling transmission of pilot pressure in the working fluid from the pilot pressure transmission line to the second forward/reverse selecting valve.

Preferably, a neutral control valve, portions of the first and second forward/reverse selecting valve are in fluid communication with the neutral control valve. Further, the neutral control valve and the first and second forward/reverse selecting valves are connected together such that in response to one of the neutral control valve and the first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

First Embodiment

A hydraulic circuit for controlling an automatic transmission according to a first embodiment of the present invention is shown in FIGS. 1, 2A, 2B, 2C, 2D, 2E, 3A, 3B, 3C, 3D and 3E.

Figure 1:
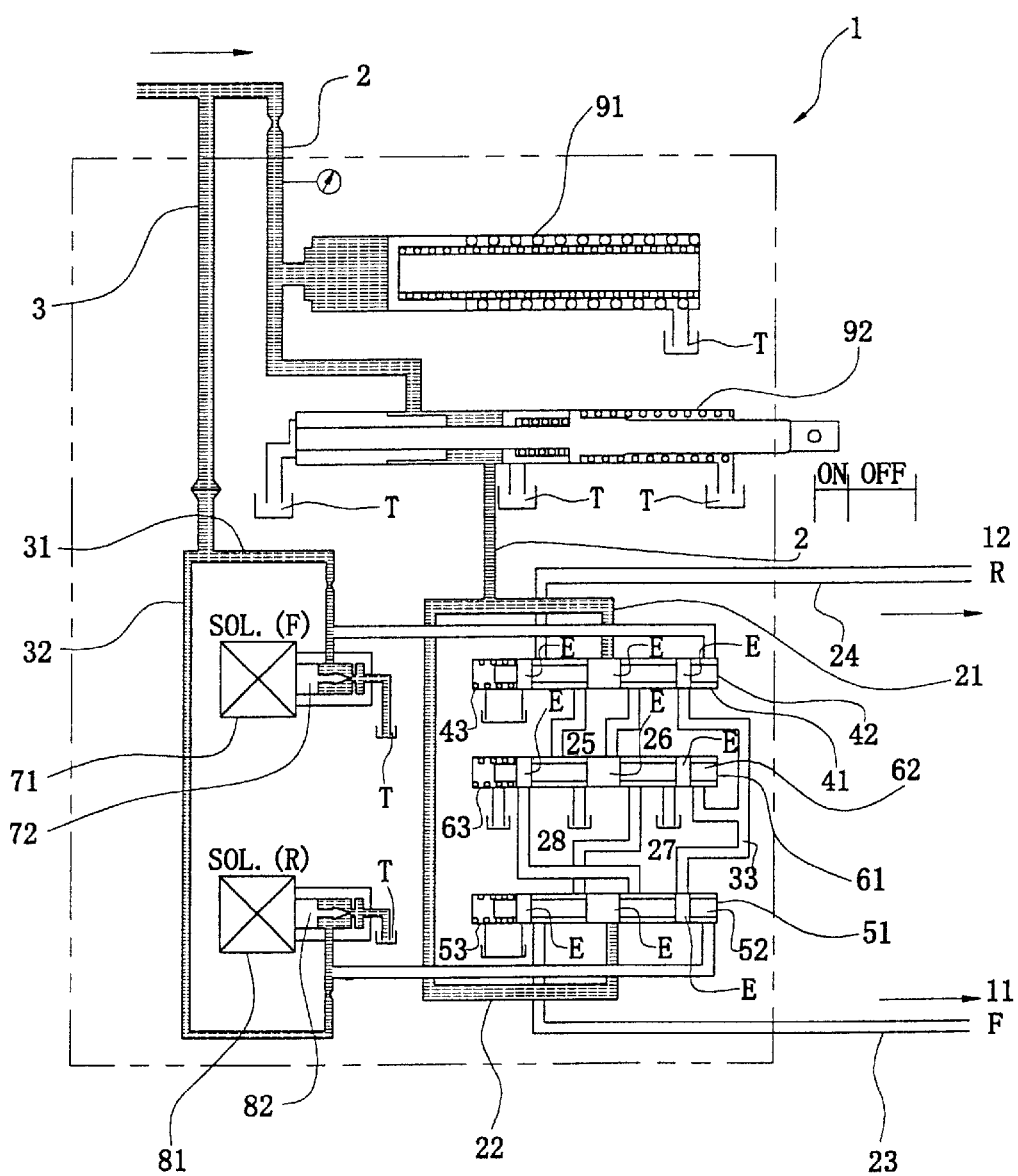
FIG. 1 is a schematic drawing showing a hydraulic control circuit for a hydraulically controlled transmission in accordance with a first embodiment of the invention.

As shown in FIG. 1, a control hydraulic circuit 1 of the first embodiment includes a main pressure transmission line 2 which transmits a main pressure for operating a forward hydraulic clutch 11 and a reverse hydraulic clutch 12, and a pilot pressure transmission line 3 for switching forward/reverse selector valves 41 and 51 as well as a neutral valve 61.

The main pressure transmission line 2 is connected to an accumulator 91 and an inching valve 92, and thereafter divides into two main pressure transmission lines 21 and 22, which are connected to forward/reverse selector valves 41 and 51, and provides hydraulic pressure thereto.

The forward/reverse selector valves 41 and 51 are both employed for switching the path of the main pressure in accordance with the state (i.e., forward, reverse or neutral state) selected by a vehicle driver in a manner described below. The forward/reverse selector valves 41 and 51 are internally provided with forward/reverse selector spools 42 and 52, which are biased rightward (with respect to the orientation of FIGS. 1 through 3E) by springs 43 and 53, respectively. Each of the forward/reverse selector spools 42 and 52 is provided at predetermined axial positions with several recessed portions and several enlarged portions E. It should be appreciated that the recessed portions when aligned with any of the lines such as the line 21, allows for the flow of working fluid. However when one of the enlarged portions E (having a cylindrical shape) is aligned with one of the lines, such as the line 21, working fluid flow is blocked.

The main pressure transmission line 21 extends to the forward/reverse selector valve 41. From the forward/reverse selector valve 41, fluid flow from the line 21 may be diverted to either a main pressure transmission lines 25 or a main pressure transmission line 26, both of which are connected to respective portions of a neutral valve 61. The main pressure transmission line 22 extends to the forward/reverse selector valve 51, and then is divided by the forward/reverse selector valve 51 into the main pressure transmission lines 27 and 28, which are also connected to the neutral valve 61.

The pilot pressure transmission line 3 is branched from the main pressure transmission line 2, and then is divided into pilot pressure transmission lines 31 and 32, which are connected to solenoid valves 71 and 81, respectively as shown in FIGS. 1–3. The pilot pressure transmission line 31 is connected to the forward/reverse selector valve 41 via the solenoid valve 71, and passes through the forward/reverse selector valve 41 to form a pilot pressure transmission line 33, which is connected to the neutral valve 61 and the forward/reverse selector valve 51, and is connected via the forward/reverse selector valve 51 to the pilot pressure transmission line 32. The pilot pressure transmission line 32 is connected to the forward/reverse selector valve 51 via the solenoid valve 81.

Each of the solenoid valves 71 and 81 is provided with a tank port T. The tank port T is connected to a drain tank, and is normally vented so that a hydraulic pressure is not usually transmitted. The solenoid valves 71 and 81 are internally provided with spools 72 and 82. When the solenoid valves 71 and 81 are energized, the spools 72 and 82 move rightward (with respect to FIG. 1) to close the tank ports T, respectively, and thereby raise the hydraulic pressure in lines connected thereto, as is described in greater detail below. When the solenoid valves 71 and 81 are not energized, the spools 72 and 82 move leftward (with respect to FIG. 1) to open the tank ports T, respectively, and thereby opening flow out of the lines connected thereto and lowering the hydraulic pressure in the lines connected thereto.

Operation of the control hydraulic circuit 1 is described below.

First, description is given on the operation which is performed when a vehicle driver selects a forward drive state.

Figure 2A:
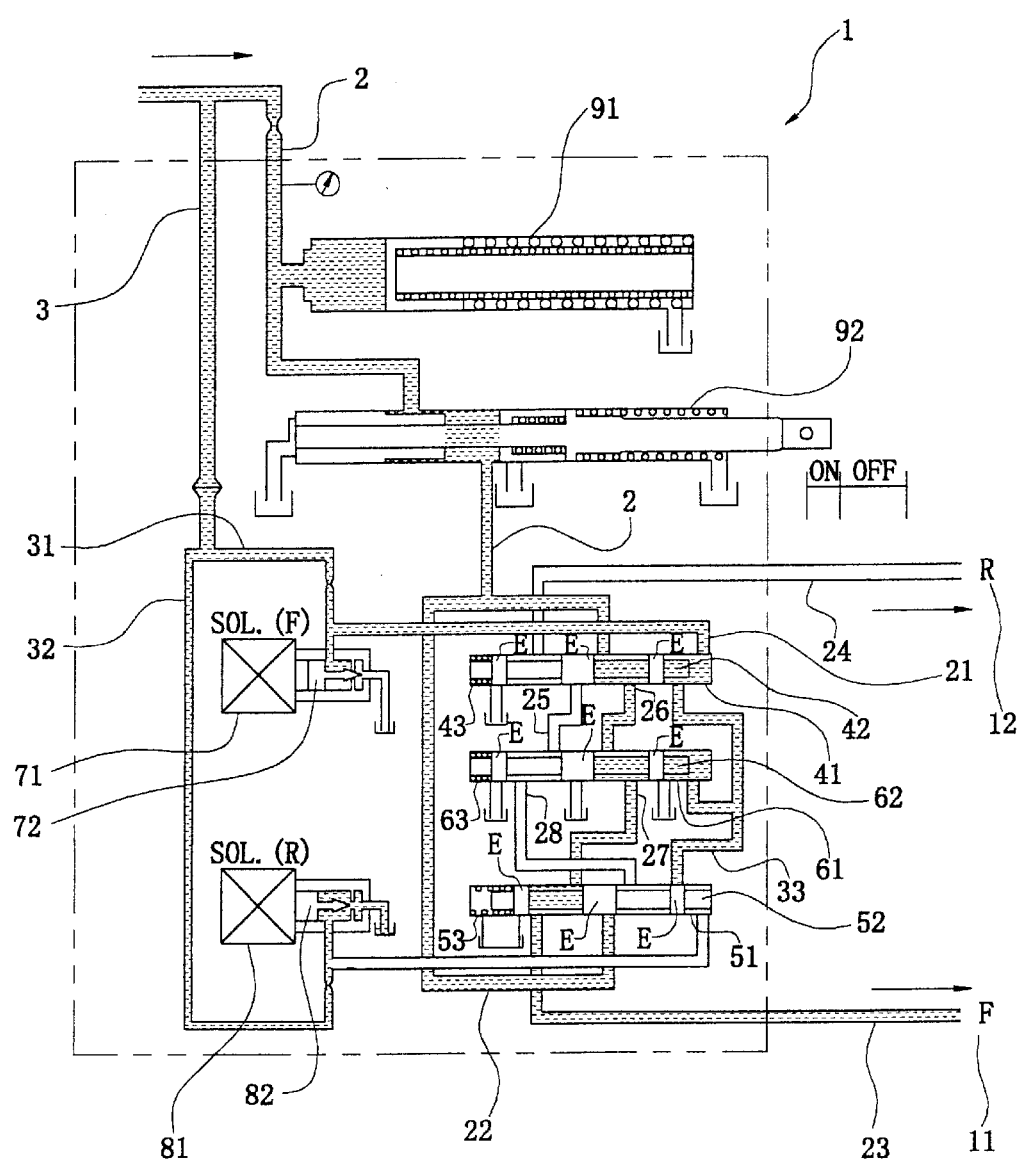
FIG. 2A is a schematic drawing showing the hydraulic control circuit depicted in FIG. 1 in a forward drive state.

When the vehicle driver selects the forward drive state, the solenoid valve 71 is energized so that the spool 72 moves rightward to close the tank port, as shown in FIG. 2A. Thereby, the pilot pressure is transmitted via the pilot pressure transmission line 31 to the forward/reverse selector valve 41. In this operation, the working fluid in the pilot pressure transmission line 31 flows into the right recessed portion of the forward/reverse selector spool 42, and pushes the forward/reverse selector spool 42 leftward against the biasing force of the spring 43. Thereby, the pilot pressure transmission line 33 opens, and the pilot pressure is transmitted to the neutral valve 61. In this operation, the working fluid in the pilot pressure transmission line 33 flows into the right recessed portion of the neutral spool 62, and pushes the neutral spool 62 leftward against the biasing force of the spring 63. Since the pilot pressure is interrupted by the rightmost of enlarged portions E of the forward/reverse selector spool 52, the forward/reverse selector spool 52 does not move. At this point, the forward/reverse selector spool 42 and the neutral spool 62 have already moved to the left positions, respectively, while the forward/reverse selector spool 52 stays in the central (the position of the spool 52 depicted in FIGS. 1 and 2A).

As a result, the main pressure transmission line 21 is connected to the main pressure transmission line 23 via the forward/reverse selector valve 41 as well as the main pressure transmission line 26, the neutral valve 61, the main pressure transmission line 27 and the forward/reverse selector valve 51. The main pressure transmission line 22 is closed by the forward/reverse selector valve 51. Therefore, the main pressure is supplied from the main pressure transmission line 2 to the forward hydraulic clutch 11 via the main pressure transmission lines 21, 26, 27 and 23. In this manner, the forward drive state selected by the vehicle driver is achieved.

Now, description is given on the operation of the control hydraulic circuit 1 in the case where the forward/reverse selector spool 42 is stuck when the vehicle driver selects the reverse drive state after releasing the forward drive state.

Figure 2B:
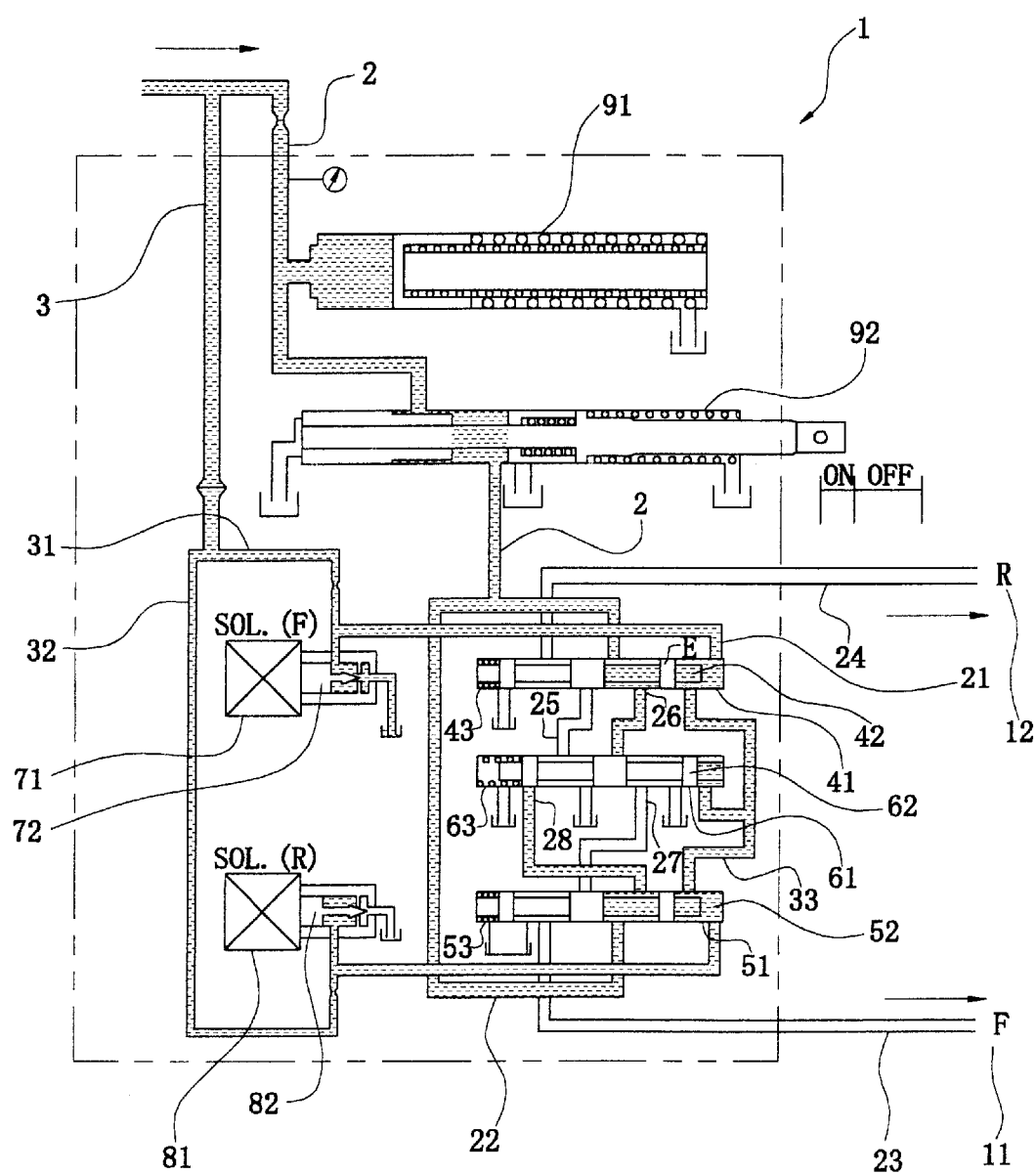
FIG. 2B is a schematic drawing showing the hydraulic control circuit depicted in FIG. 1 in a reverse drive state with a first spool member jammed in a forward drive state position.

When the vehicle driver selects the reverse drive state and the hydraulic circuit at that moment is in the forward drive state, the solenoid valve 71 is de-energized thereby moving the spool 72 leftward as shown in FIG. 2B allowing the fluid pressure in the line 21 to vent into the tank port T at the spool 71. Also, the solenoid valve 81 is energized to move the spool 82 toward the right as shown in FIG. 2B. If during this operation the forward/reverse selector spool 42 should be jammed or stuck in the position depicted in FIG. 2B, then fluid pressure in the line 2 would continue to be fed to the line 26. In other words, if the spool 42 should fail to move in response to urging from the spring 43 once the fluid pressure in the line 21 has been vented to the tank port T at the spool 72, then fluid pressure from the line 2 would continue to be provided to the line 26 due to the position of the central enlarged portion E of the spool 42. The spool 42 stays in the position depicted in FIG. 2B (toward the left side of FIG. 2B) but the neutral spool 62 returns to the initial position due to the urging of the spring 63 and the venting of fluid pressure in the line 33 through the right end chamber of the forward/reverse selector spool 42 and further through the line 21 and the tank port T at the spool 72.

In the above operation, the spool 82 has moved toward the right side of FIG. 2B to close the opening leading to the tank port T adjacent to the spool 82, thereby causing fluid pressure to be fed through the line 32 to the right hand side chamber of the forward/reverse selector spool 52, and to the line 33. The working fluid in the pilot pressure transmission line 32 flows into the right recessed portion or chamber of the forward/reverse selector spool 52, and pushes the forward/reverse selector spool 52 leftward against the biasing force of the spring 53. Thereby, the fluid pressure transmission line 33 opens, and the pilot pressure is transmitted to the neutral valve 61 and the forward/reverse selector valve 41. The forward/reverse selector spool 42 maintains the state where it is stuck in the left position and as a result, the fluid pressure therein is transmitted through the pilot pressure transmission line 31 and the tank port T of the solenoid valve 72 to the drain tank port thereof. Thereby, no pressure occurs in the right recessed portion of the neutral spool 62 so that the neutral spool 62 does not move. At this point of time, the forward/reverse selector spools 42 and 52 have already moved leftward. The neutral spool 62 stays in the neutral position as shown in FIG. 2B.

As a result, the main pressure is interrupted by the central enlarged portion E of the neutral spool 62 between the main pressure transmission lines 26 and 27. The main pressure is also interrupted by the leftmost enlarged portion E of the neutral spool 62 between the main pressure transmission lines 28 and 25. Accordingly, the fluid pressure is supplied to neither the forward hydraulic clutch 11 nor the reverse hydraulic clutch 12, and therefore activates neither of them. Thus, the vehicle is in the neutral state.

Figure 2C:
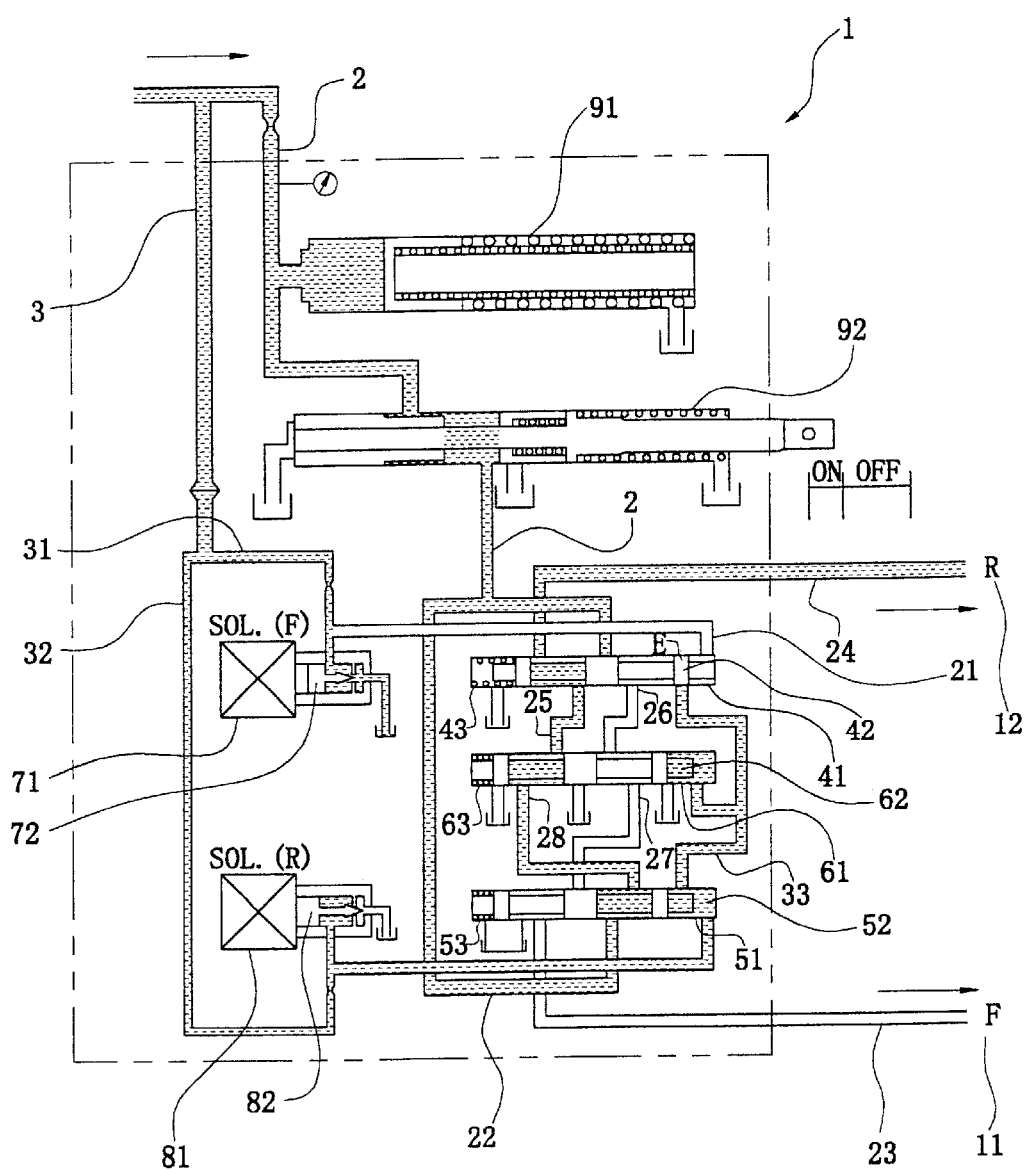
FIG. 2C is a schematic drawing showing the hydraulic control circuit depicted in FIG. 1 in a reverse drive state with a second spool member jammed in a forward drive state position.

Now, description is given on the operation of the control hydraulic circuit 1 in the case where the neutral spool 62 is stuck or jammed in position when the vehicle driver selects the reverse drive state with the forward drive state having previously being engaged, with reference to FIG. 2C.

When the vehicle driver selects the reverse drive state after having been in the forward drive state, the solenoid valve 71 is de-energized to return the spool 72 toward the left in FIG. 2C, and the solenoid valve 81 is energized to move the spool 82 rightward. In this operation, the forward/reverse selector spool 42 returns to the initial position as shown in FIG. 2C, and the neutral spool 62, being jammed or stuck in position, stays in the left position. Thereby, the pilot pressure is transmitted through the pilot pressure transmission line 32 to the forward/reverse selector valve 51. In this operation, the working fluid in the pilot pressure transmission line 32 flows into the right recessed portion of the forward/reverse selector spool 52, and pushes the forward/reverse selector spool 52 leftward against the biasing force of the spring 53. Thereby, the pilot pressure transmission line 33 opens, and the pilot pressure is transmitted to the neutral valve 61. The neutral spool 62 is stuck and stays in the left position. Since the pilot pressure is interrupted by the right enlarged portion E of the forward/reverse selector spool 42, the forward/reverse selector spool 42 stays in the same position. At this point of time, the neutral spool 62 and the forward/reverse selector spool 52 are already moved leftward, and the forward/reverse selector spool 42 stays in the same position.

As a result, the main pressure is interrupted by the forward/reverse selector spool 42 between the main pressure transmission lines 21 and 26. However, the main pressure is applied to the main pressure transmission lines 22, 28, 25 and 24. Accordingly, the pilot pressure is supplied to the reverse hydraulic clutch 12. Thus, the vehicle enters the reverse drive state as selected by the driver.

According to the control hydraulic circuit of this embodiment, as described above, the vehicle enters either the reverse drive state or the neutral state in the case where the forward/reverse selector spool and the neutral spool cannot operate when the vehicle driver switches the state from the forward drive to the reverse drive. Even in the above case, therefore, it is possible to prevent at least forward movement of the vehicle, i.e., the movement in the direction opposite to that selected by the vehicle driver.

Now, description is given on the operation of the control hydraulic clutch 1 in the case where the forward/reverse selector spool 42 is stuck when the vehicle driver selects the neutral position where the vehicle has been in the forward drive state.

Figure 2D:
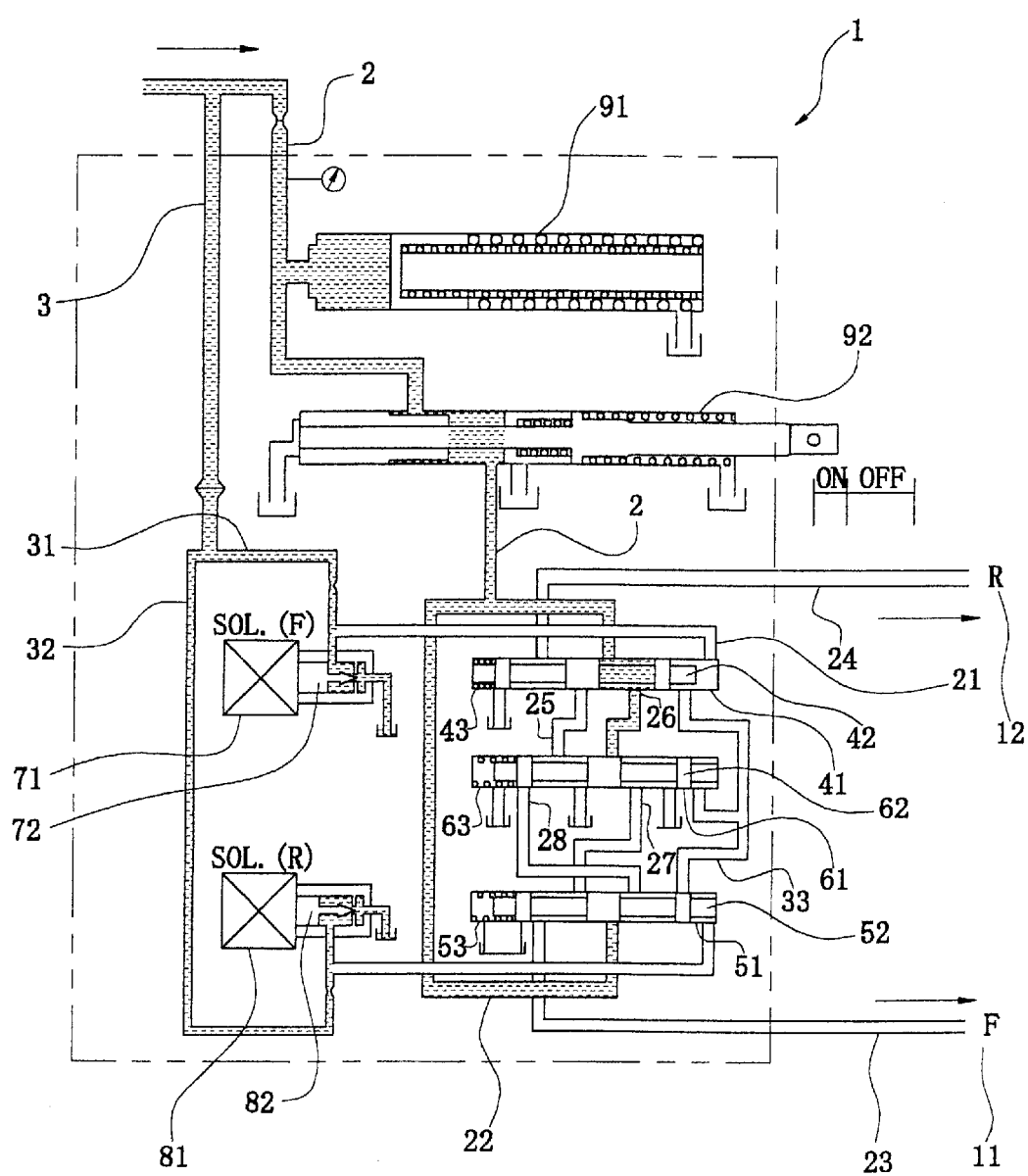
FIG. 2D is a schematic drawing showing the hydraulic control circuit depicted in FIG. 1 in a neutral drive state with the first spool member jammed in a forward drive state position.

When the vehicle driver selects the neutral position after releasing the forward drive state, the solenoid valve 71 is de-energized to return the spool 72 leftward. At this point of time, the forward/reverse selector spool 42 is stuck or jammed and therefore stays in the left position, and the neutral spool 62 returns to the initial position as shown in FIG. 2D. Thereby, both the tank ports T of the solenoid valves 71 and 81 are open so that the pilot pressure is not transmitted, and is not supplied to the forward/reverse selector valves 41 and 51 or the neutral valve 61. Accordingly, the spools 42, 52 and 62 in the valves 41, 61 and 51 stay in the positions depicted in FIG. 2D, respectively. Thus, the forward/reverse selector spool 42 moves leftward, and the neutral spool 62 and the forward/reverse selector spool 52 do not move.

As a result, the main pressure is interrupted between the main pressure transmission lines 26 and 27, and is also interrupted between the main pressure transmission lines 22 and 28. Therefore, the main pressure is supplied to neither the forward hydraulic clutch 11 nor the reverse hydraulic clutch 12, and activates neither of them. Thus, the vehicle attains the neutral state.

Figure 2E:
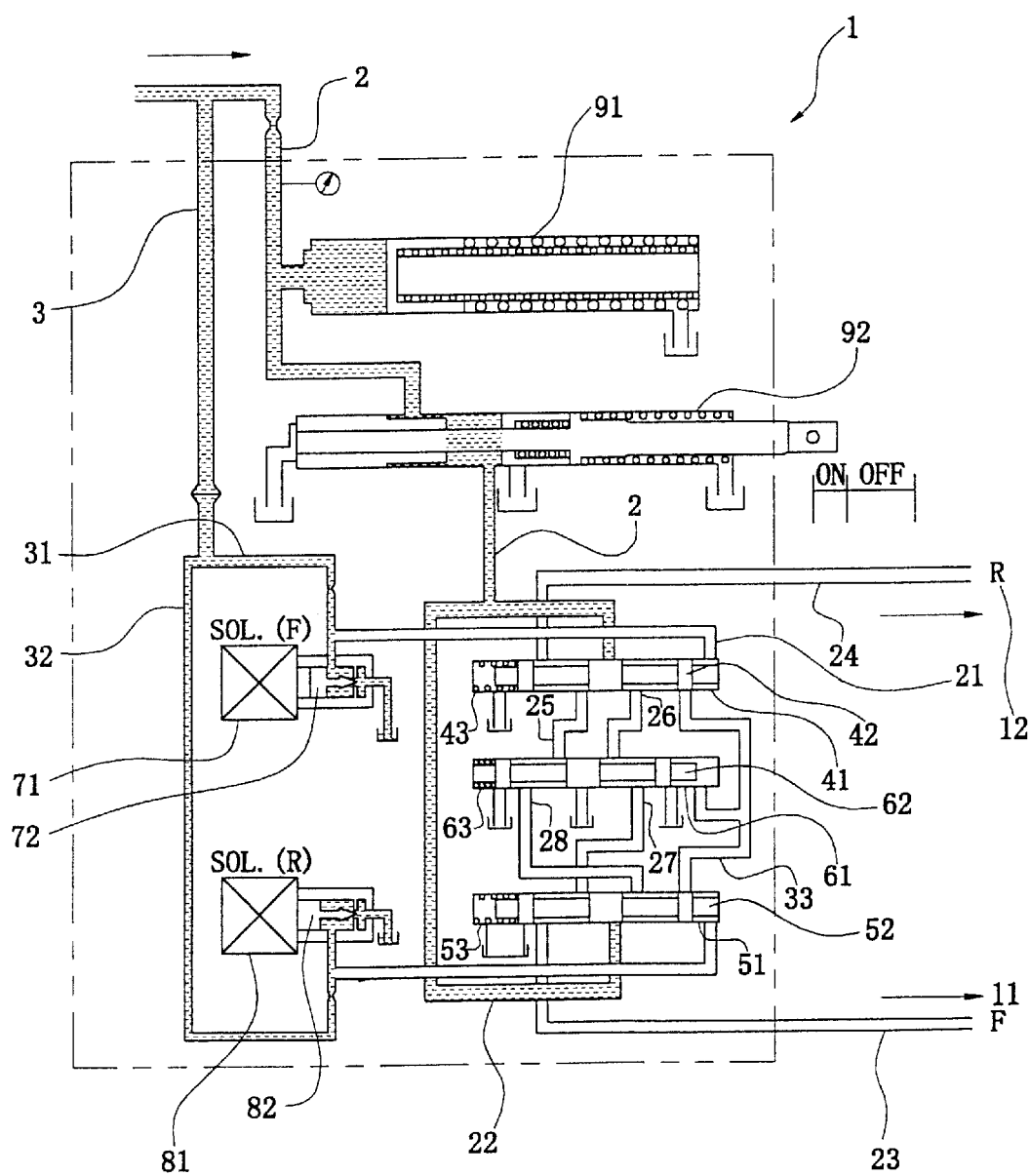
FIG. 2E is a schematic drawing showing the hydraulic control circuit depicted in FIG. 1 in a neutral drive state with the second spool member jammed in a non-neutral drive state position.

Now, description is given on the operation of the control hydraulic circuit 1 in the case where the neutral spool 62 is stuck or jammed in position when the vehicle driver selects the neutral state after having been in the forward drive state of the vehicle, with respect to FIG. 2E.

When the vehicle driver selects the neutral state after releasing the forward drive state (FIG. 2A), the solenoid valve 71 is de-energized to return the spool 72 leftward to the position shown in FIG. 2E. In this operation, the forward/reverse selector spool 42 returns to the initial position, and the neutral spool 62 stays stuck in the left position. Thereby, both the tank ports of the solenoid valves 71 and 81 are open so that the pilot pressure is not transmitted, and is not supplied to the forward/reverse selector valves 41 and 51 as well as the neutral valve 61. Accordingly, the spools 42, 52 and 62 in the valves 41, 61 and 51 do not change their positions, respectively. The neutral spool 62 is in the left position, and the forward/reverse selector spools 42 and 52 do not move.

As a result, the main pressure is interrupted between the main pressure transmission lines 21 and 26, and is also interrupted between the main pressure transmission lines 22 and 28. Accordingly, the main pressure is supplied to neither the forward hydraulic clutch 11 nor the reverse hydraulic clutch 12, and activates neither of them. Thus, the vehicle attains the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the forward drive to the neutral state. Even in the above case, therefore, the neutral state can be achieved as selected by the vehicle driver.

Now, description is given on the operation in the case where the vehicle driver selects the reverse drive state.

Figure 3A:
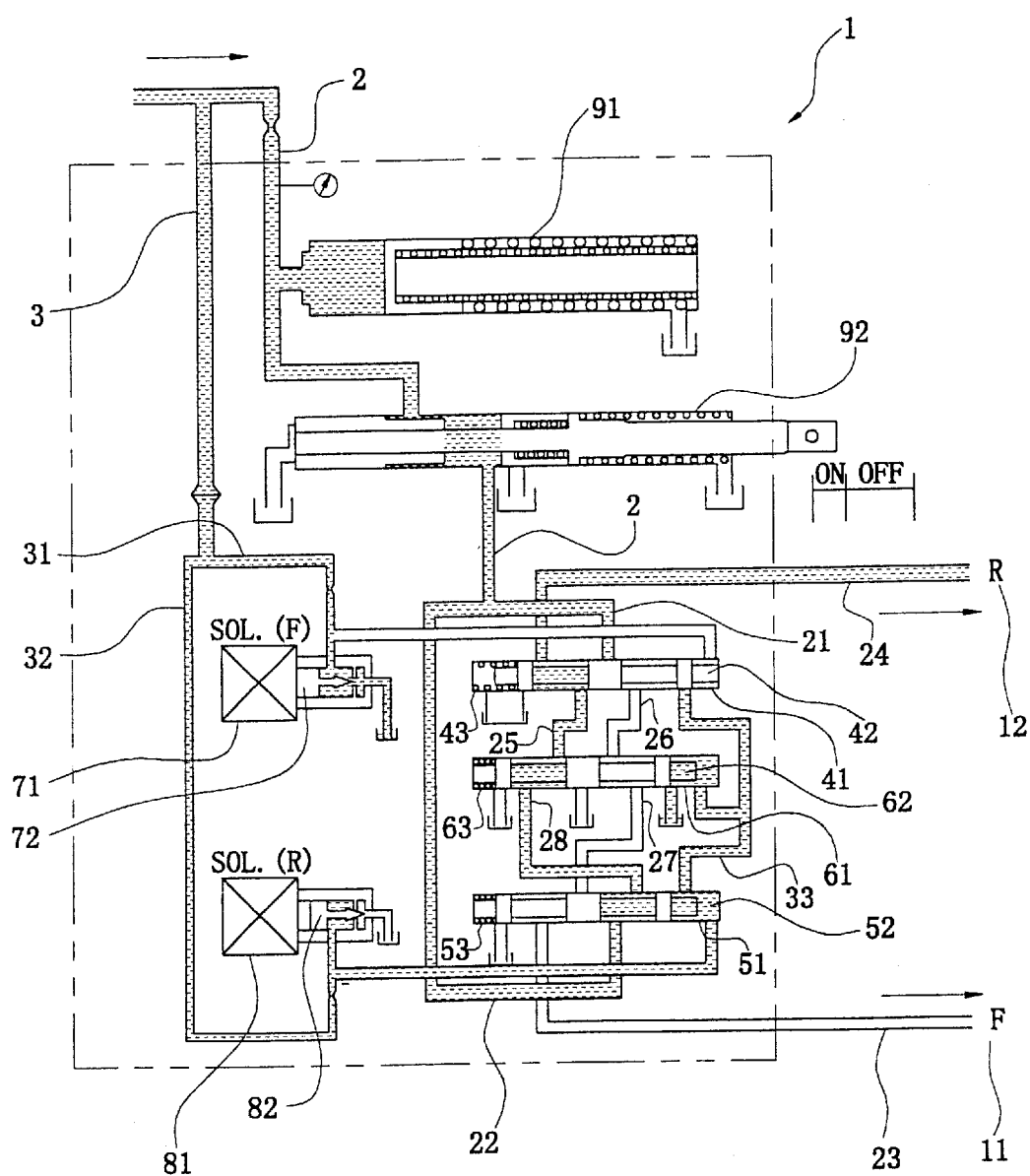
FIG. 3A is a schematic drawing showing the hydraulic control circuit depicted in FIG. 1 in a reverse drive state.

As shown in FIG. 3A, when the vehicle driver selects the reverse drive state, the solenoid valve 81 is energized to move the spool 82 rightward so that the tank port is closed. Thereby, the pilot pressure is transmitted to the forward/reverse selector valve 51 via the pilot pressure transmission line 32. In this operation, the working fluid in the pilot pressure transmission line 32 flows into the right recessed portion of the forward/reverse selector spool 52, and pushes the forward/reverse selector spool 52 leftward against the biasing force of the spring 53. Thereby, the pilot pressure transmission line 33 opens, and the pilot pressure is transmitted to the neutral valve 61. In this operation, the working fluid in the pilot pressure transmission line 33 flows into the right recessed portion of the neutral spool 62, and pushes the neutral spool 62 leftward against the biasing force of the spring 63. Since the pilot pressure is interrupted by the right enlarged portion E of the forward/reverse selector spool 42, the forward/reverse selector spool 42 stays in the same position as in FIG. 1 (neutral position). At this point of time, the forward/reverse selector spool 52 and the neutral spool 62 are already moved leftward, and the forward/reverse selector spool 42 stays in the neutral position (toward the right side of FIG. 3A).

As a result, the main pressure transmission line 22 is connected to the main pressure transmission line 28 via the forward/reverse selector valve 51, to the main pressure transmission line 25 via the neutral valve 61 and to the main pressure transmission line 24 via the forward/reverse selector valve 41. The main pressure transmission line 21 is interrupted by the forward/reverse selector valve 41. Accordingly, the main pressure is supplied to the reverse hydraulic clutch 12 through the main pressure transmission lines 22, 28, 25 and 24. In this manner, the reverse drive state selected by the vehicle driver is achieved.

Figure 3B:
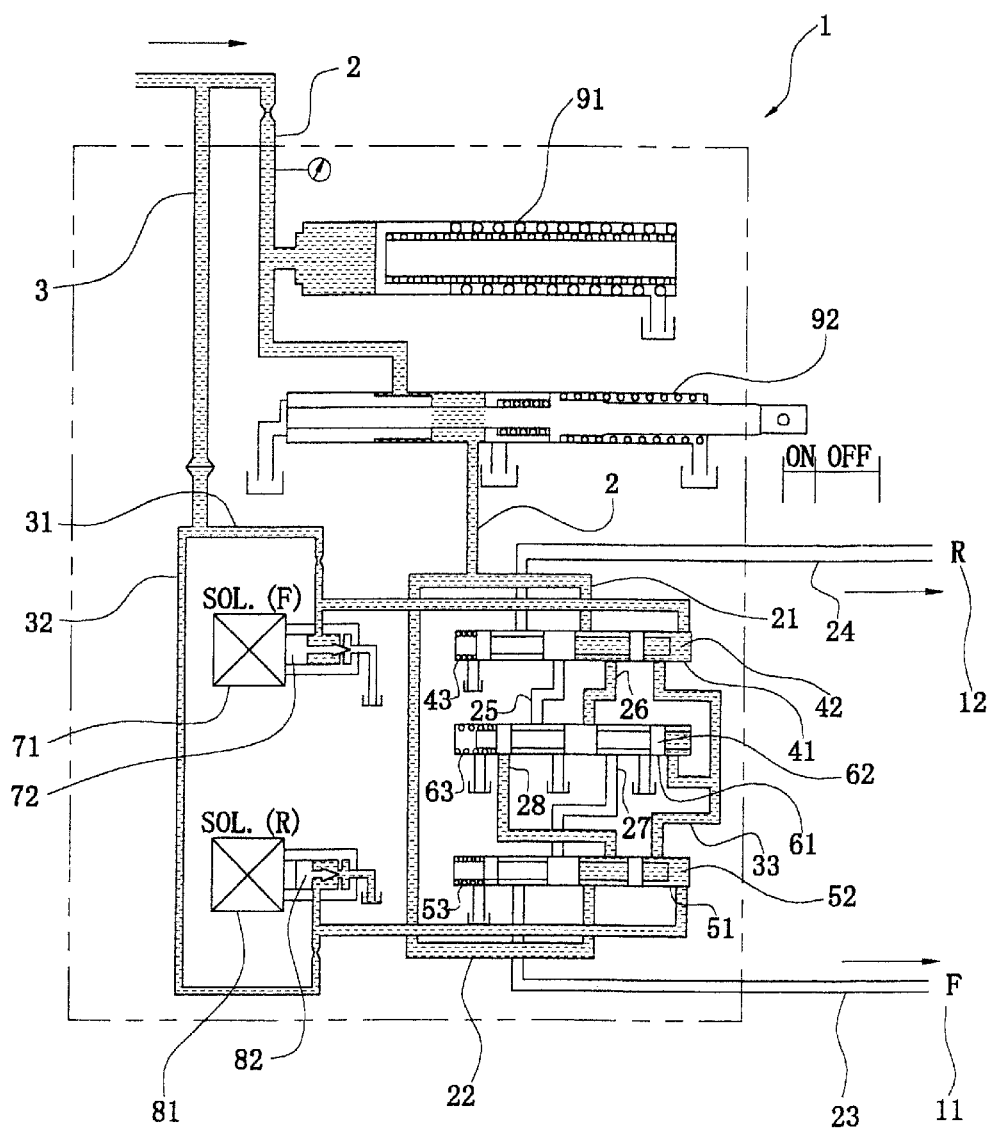
FIG. 3B is a schematic drawing showing the hydraulic control circuit depicted in FIG. 1 with the forward drive state selected, but with a third spool member jammed in a non-forward drive state position.

Now, description is given on the operation of the control hydraulic clutch 1 in the case where the forward/reverse selector spool 52 is stuck when the vehicle driver selects the forward drive state after being in the reverse drive state of the vehicle, with reference to FIG. 3B.

When the vehicle driver selects the forward drive state after being in the reverse drive state, the solenoid valve 81 is deenergized to return the spool 82 leftward, and the solenoid valve 71 is energized to move the spool 72 rightward. In this operation, the forward/reverse selector spool 52 is stuck, and therefore stays in the left position so that the neutral spool 62 returns to the initial position. Thereby, the pilot pressure is transmitted to the forward/reverse selector valve 41 via the pilot pressure transmission line 31. In this operation, the working fluid in the pilot pressure transmission line 31 flows into the right recessed portion of the forward/reverse selector spool 42, and pushes the forward/reverse selector spool 42 leftward against the biasing force of the spring 43. Thereby, the pilot pressure transmission line 33 opens, and the pilot pressure is transmitted to the neutral valve 61 and the forward/reverse selector valve 51. The forward/reverse selector spool 52 is stuck, and therefore stays in the left position. The pilot pressure is transmitted from the pilot pressure transmission line 32 to the drain tank port via the tank port of the solenoid valve 82. Thereby, no pressure occurs in the right recessed portion of the neutral spool 62 so that the neutral spool 62 does not move. At this point of time, the forward/reverse selector spools 42 and 52 are already moved to the left positions. The neutral spool 62 stays in the same position.

As a result, the main pressure is interrupted by the neutral spool 62 between the main pressure transmission lines 28 and 25. Also, the main pressure is interrupted by the neutral spool 62 between the main pressure transmission lines 26 and 27. Accordingly, the main pressure is supplied to neither the forward hydraulic clutch 11 nor the reverse hydraulic clutch 12, and activates neither of them. Thus, the vehicle attains the neutral state.

Figure 3C:
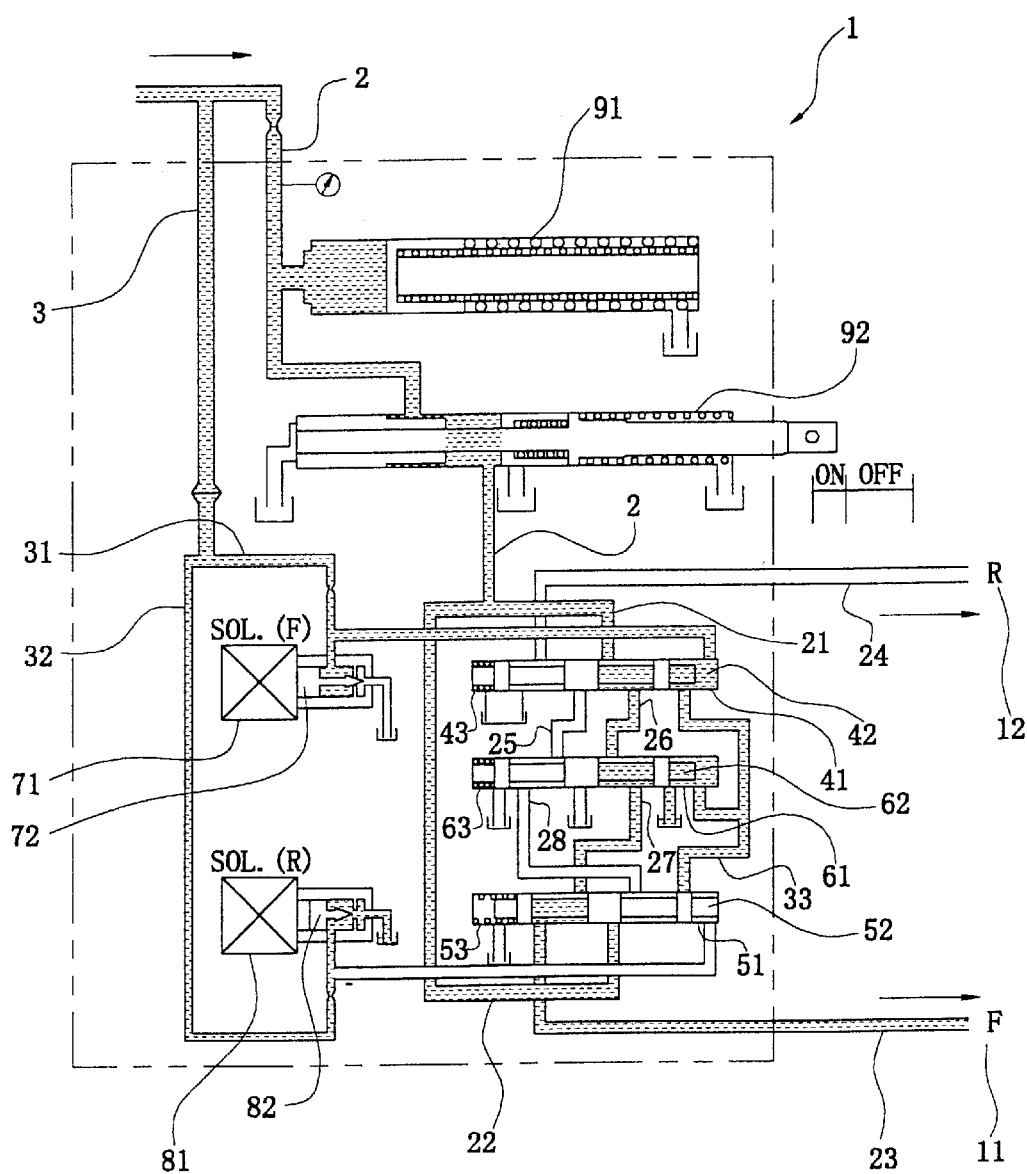
FIG. 3C is a schematic drawing showing the hydraulic control circuit depicted in FIG. 1 with the forward drive state selected, but with the second spool member jammed in a non-forward drive state position.

Now, description is given on the operation of the control hydraulic clutch 1 in the case where the neutral spool 62 is stuck when the vehicle driver selects the forward drive state after having been in the reverse drive state of the vehicle, as shown in FIG. 3C.

When the vehicle driver selects the forward drive state after having been in the reverse drive state, the solenoid valve 81 is deenergized to return the spool 82 leftward, and the solenoid valve 71 is energized to move the spool 72 rightward. In this operation, the forward/reverse selector spool 52 returns to the initial position, and the neutral spool 62 which is stuck stays in the left position. Thereby, the pilot pressure is transmitted to the forward/reverse selector valve 41 via the pilot pressure transmission line 31. In this operation, the working fluid in the pilot pressure transmission line 31 flows into the right recessed portion of the forward/reverse selector spool 42, and pushes the forward/reverse selector spool 42 leftward against the biasing force of the spring 43. Thereby, the pilot pressure transmission line 33 opens, and the pilot pressure is transmitted to the neutral valve 61. The neutral spool 62 is stuck, and therefore stays in the left position. Since the pilot pressure is interrupted by the right enlarged portion E of the forward/reverse selector spool 52, the forward/reverse selector spool 52 does not move. At this point of time, the neutral spool 62 and the forward/reverse selector spool 42 are already moved leftward, and the forward/reverse selector spool 52 stays in the right side position.

As a result, the main pressure is interrupted by the forward/reverse selector spool 52 between the main pressure transmission lines 22 and 28. The main pressure is applied to the main pressure transmission lines 21, 26, 27 and 23. Accordingly, the pilot pressure is supplied to the forward hydraulic clutch 11. Thus, the vehicle attains the forward drive state as selected by the vehicle driver.

According to the control hydraulic circuit of this embodiment, as described above, the vehicle enters either the neutral state or the forward drive state in the case where the forward/reverse selector spool and the neutral spool cannot operate when the vehicle driver switches the state from the reverse drive to the forward drive state. Even in the above case, therefore, the vehicle does not move at least in the reverse direction, i.e., the direction opposite to the direction selected by the vehicle driver.

Figure 3D:
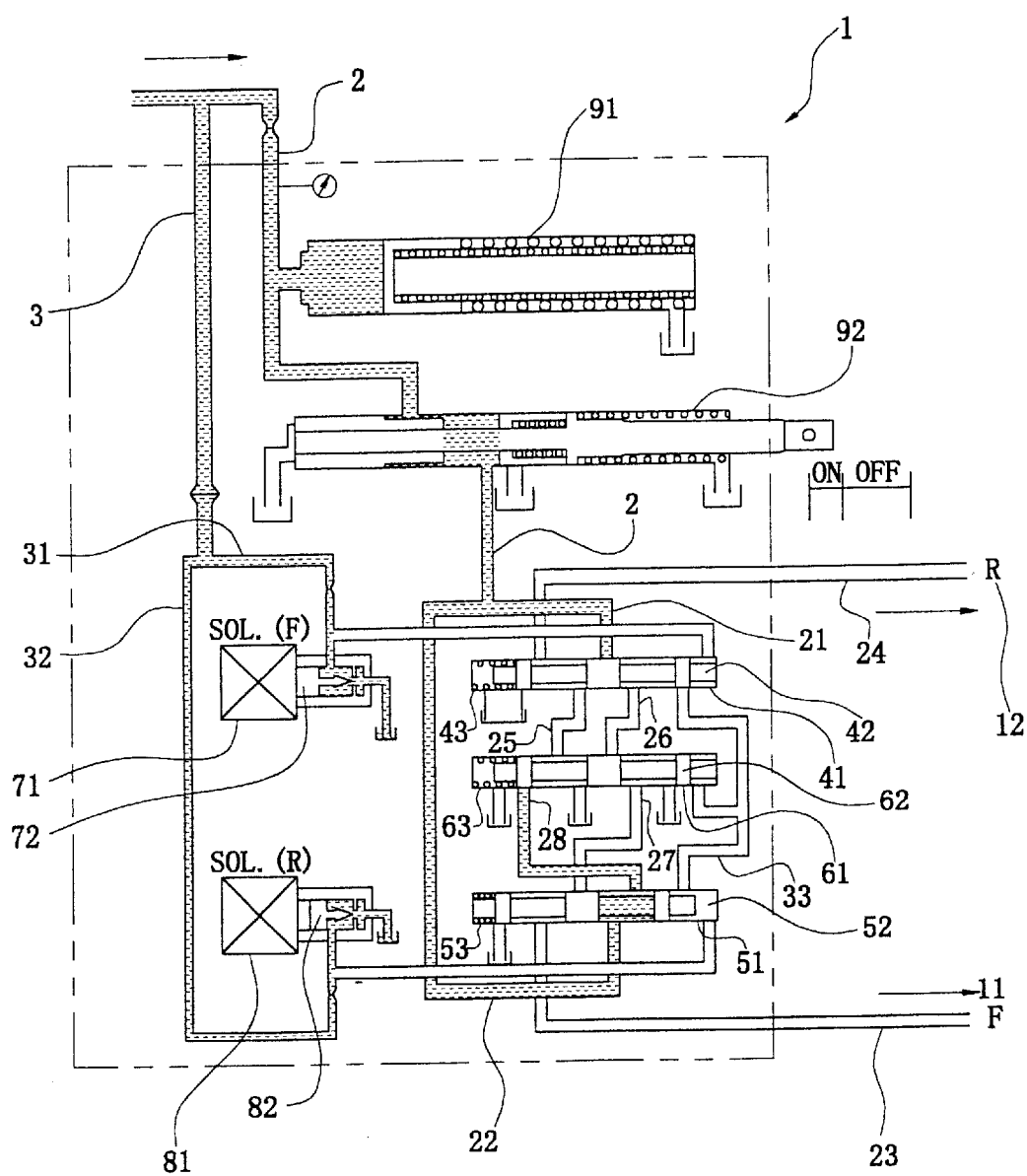
FIG. 3D is a schematic drawing showing the hydraulic control circuit depicted in FIG. 1 with the neutral drive state selected, but with the third spool member jammed in a non-neutral drive state position.

Now, description is given on the operation of the control hydraulic circuit 1 in the case where the vehicle driver selects the neutral state after releasing the reverse state, and the forward/reverse selector spool 52 is stuck, as shown in FIG. 3D.

When the vehicle driver selects the neutral state after being in the reverse state, the solenoid valve 81 is de-energized, and the spool 82 moves leftward. At this point of time, the forward/reverse selector spool 52 is stuck, and therefore stays in the left position, and the neutral spool 62 returns to the initial position (right position). Thereby, the pilot pressure is not transmitted, and therefore is not supplied to the forward/reverse selector valves 41 and 51 as well as the neutral valve 61 because both the tank ports T of the solenoid valves 71 and 81 are open. Accordingly, the spools 42, 52 and 62 of the valves 41, 51 and 61 do not change their positions, respectively. The forward/reverse selector spool 52 is in the left position, and the neutral spool 62 and the forward/reverse selector spool 42 stay in the same positions.

As a result, the main pressure is interrupted between the main pressure transmission lines 28 and 25, and is also interrupted between the main pressure transmission lines 21 and 26. Accordingly, the main pressure is supplied to neither the forward hydraulic clutch 11 nor the reverse hydraulic clutch 12, and activates neither of them. Thus, the vehicle is in the neutral state.

Figure 3E:
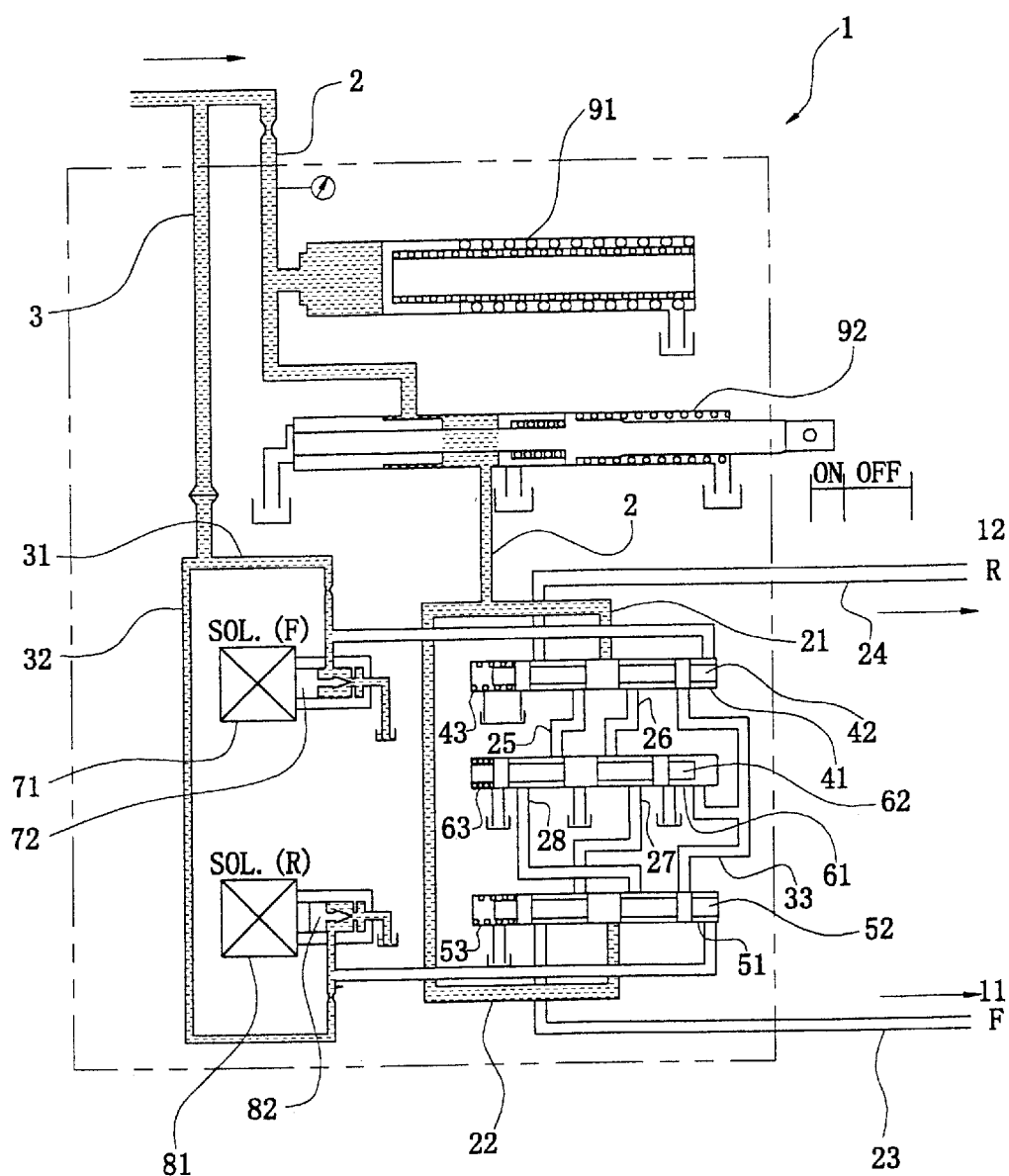
FIG. 3E is a schematic drawing showing the hydraulic control circuit depicted in FIG. 1 with the neutral drive state selected, but with the second spool member jammed in a non-neutral drive state position.

Now, description is given on the operation of the control hydraulic circuit 1 in the case where the neutral spool 62 is stuck when the vehicle driver selects the neutral state after releasing the reverse state, as shown in FIG. 3E.

When the vehicle driver selects the neutral state after releasing the reverse state, the solenoid valve 81 is deenergized, and the spool 82 returns leftward. At this point, the forward/reverse selector spool 52 returns to the initial position, and the neutral spool 62 which is stuck stays in the left position. Since both the tank ports of the solenoid valves 71 and 81 are open, the pilot pressure is not transmitted, and therefore is not supplied to the forward/reverse selector valves 41 and 51 as well as the neutral valve 61. Accordingly, the spools 42, 52 and 62 of the valves 41, 51 and 61 do not change their positions, respectively. The neutral spool 62 is in the left position, and the forward/reverse selector spools 42 and 52 stay in the same positions.

As a result, the main pressure is interrupted between the main pressure transmission lines 22 and 28, and is also interrupted between the main pressure transmission lines 21 and 26. Accordingly, the main pressure is supplied to neither the forward hydraulic clutch 11 nor the reverse hydraulic clutch 12, and activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the reverse drive to the neutral state. Even in the above case, therefore, the neutral state selected by the vehicle driver can be achieved.

Second Embodiment

Figure 4A:
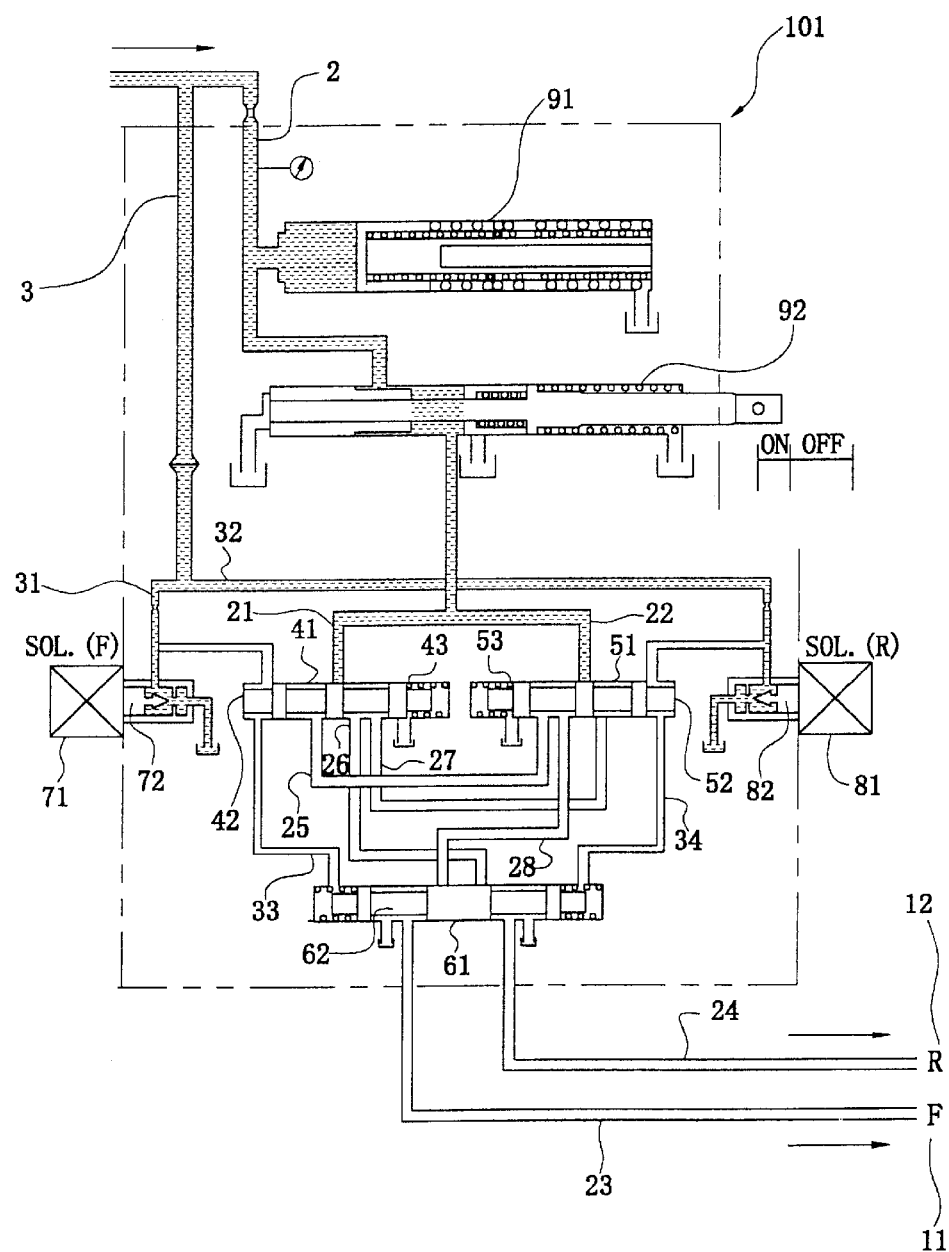
FIG. 4A is a schematic drawing showing a hydraulic control circuit for a hydraulically controlled transmission in accordance with a second embodiment of the invention, with the circuit in a neutral drive state.

A second embodiment of a hydraulic circuit 101 for controlling an automatic transmission is shown in FIG. 4A.

The following description focuses on differences between the hydraulic circuit 101 of the second embodiment and the above described hydraulic circuit 1 of the first embodiment. Specifically, all of the individual elements in the hydraulic circuit 101 are identical to the elements of the hydraulic circuit 1, but in the hydraulic circuit 101 the elements are arranged in a slightly different configuration.

In the second embodiment, the main pressure transmission line 21 is connected to the forward/reverse selector valve 41. Main pressure transmission lines 25, 26 and 27 are all connected to portions of the forward/reverse selector valve 41, as shown in FIG. 4A, and further described below. The main pressure transmission lines 25 and 27 are connected to the forward/reverse selector valve 51, and the main pressure transmission line 26 is connected to the neutral valve 61. The main pressure transmission line 28 is connected to the forward/reverse selector valve 51 and the neutral valve 61. The main pressure transmission lines 28 and 26 extend to the neutral valve 61. Main pressure transmission lines 23 and 24 are connected to the neutral valve 61 such that, depending upon the position of the spool 62, the lines 28 and 26 are connectable to the lines 23 and 24, respectively. The main pressure transmission lines 23 and 24 which are connected to the forward hydraulic clutch 11 and the reverse hydraulic clutch 12, respectively.

The pilot pressure transmission line 31 is connected to the forward/reverse selector valve 41 via the solenoid valve 71, and the portion thereof extending from the forward/reverse selector valve 41 forms the pilot pressure transmission line 33 that is further connected to the neutral valve 61. The pilot pressure transmission line 32 is connected to the forward/reverse selector valve 51 via the solenoid valve 81, and the portion thereof extending from the forward/reverse selector valve 51 connects to the pilot pressure transmission line 34 that is in turn connected to the neutral valve 61.

Now, the operation of control hydraulic circuit 101 is briefly described below, first with reference to FIG. 4B.

First, description is given on the operation in the case where the vehicle driver selects the forward drive state.

Figure 4B:
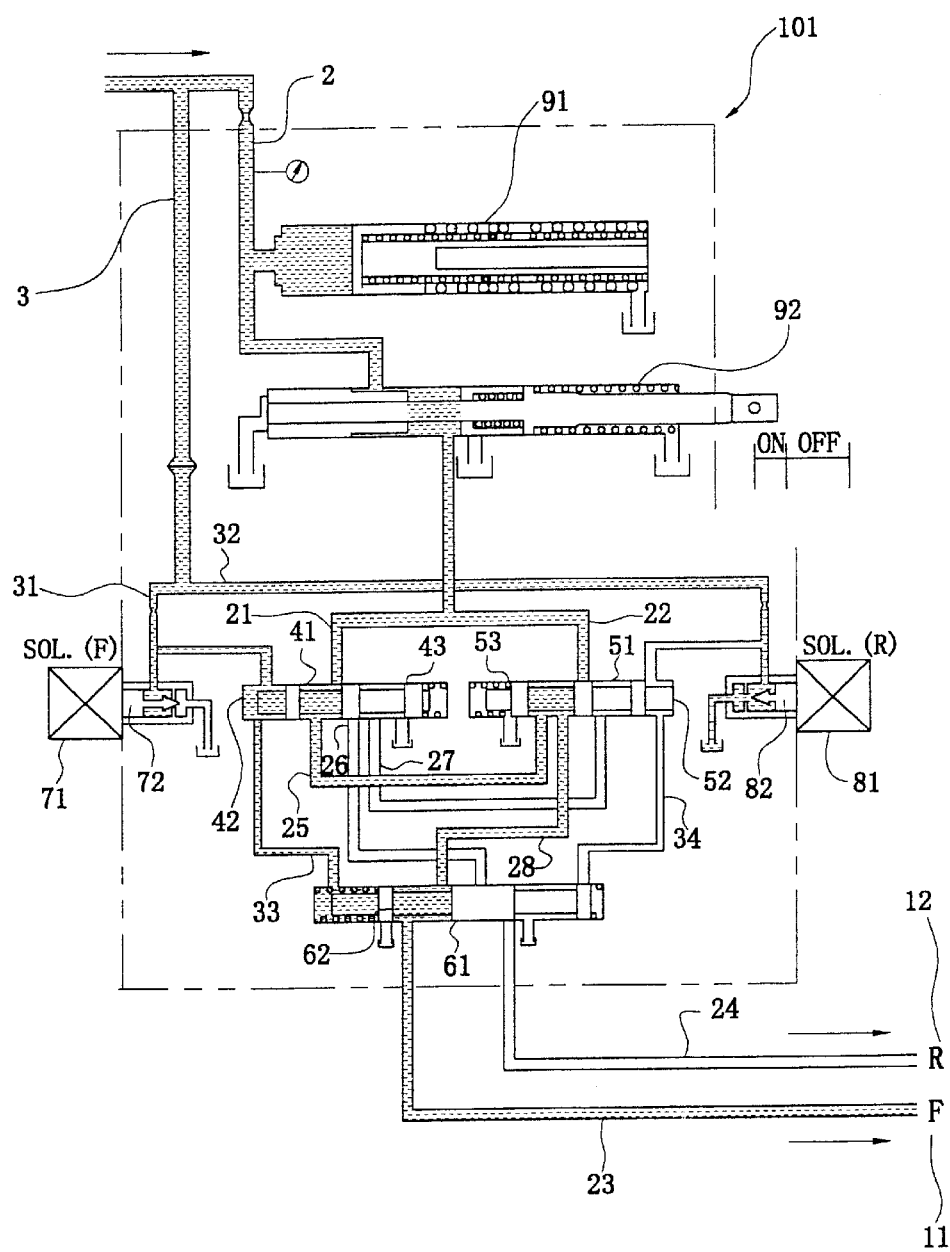
FIG. 4B is a schematic drawing showing the hydraulic control circuit depicted in FIG. 4A with the circuit in a forward drive state.

When the vehicle driver selects the forward drive state, solenoid 71 moves the spool 72 toward the right side of FIG. 4B, thereby causing the pilot pressure to be transmitted via the pilot pressure transmission line 31 to the forward/reverse selector valve 41 and there-through to the line 33 and the neutral valve 61. As a result of the introduction of pilot pressure into the valve 41, the forward/reverse selector spool 42 and the neutral spool 62 move rightward. The forward/reverse selector spool 52 does not move. Accordingly, the main pressure is supplied to the forward hydraulic clutch 11 via the main pressure transmission lines 21, 25, 28 and 23. In this manner, the forward state selected by the vehicle driver is achieved.

Figure 4C:
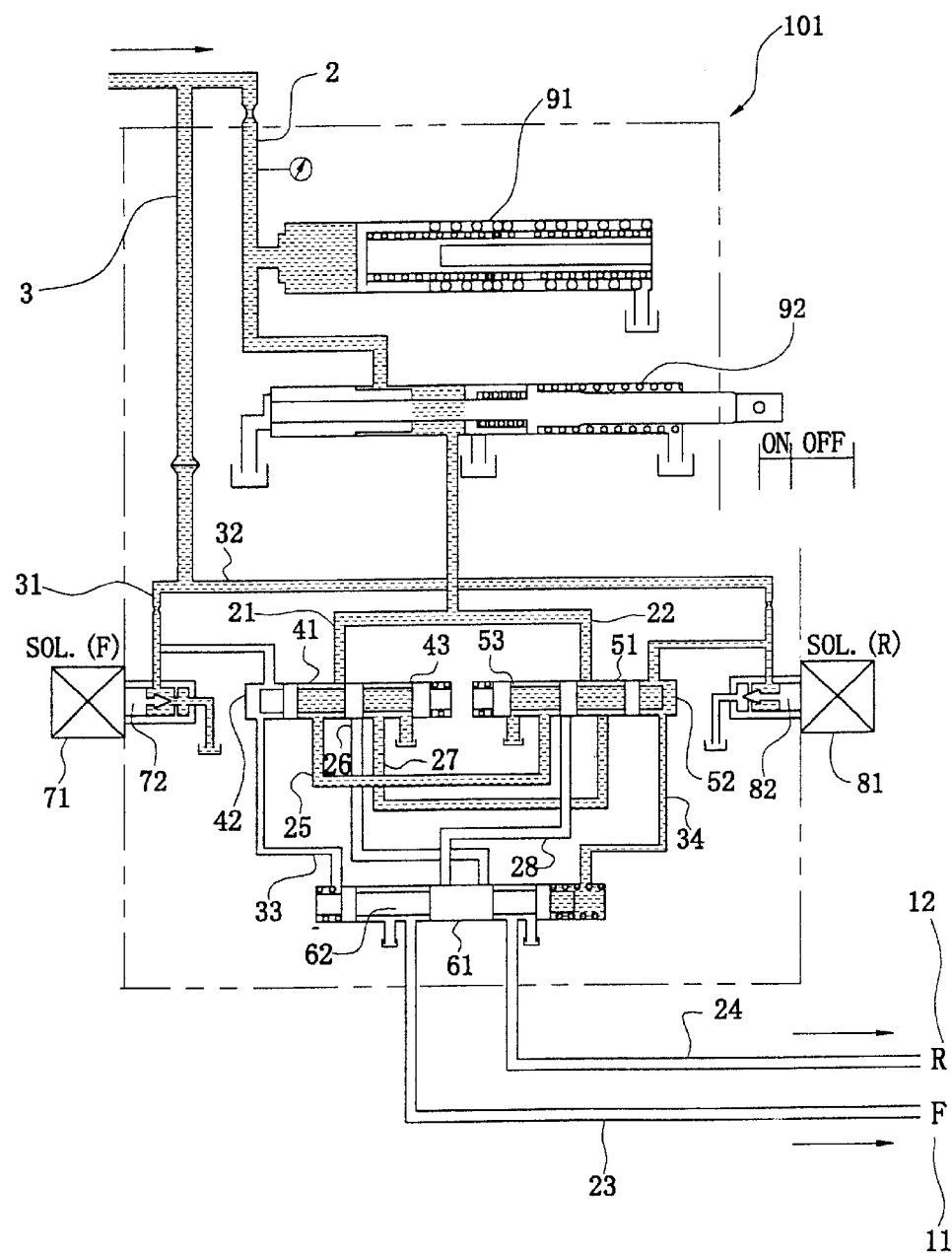
FIG. 4C is a schematic drawing showing the hydraulic control circuit depicted in FIG. 4A with the reverse drive state selected and a first spool member stuck in a forward drive state.

Now, description is given on the operation of the control hydraulic circuit 101 in the case where the forward/reverse selector spool 42 is stuck when the vehicle driver selects the reverse drive state after releasing the forward drive state, with respect to FIG. 4C.

When the vehicle driver selects the reverse drive state after releasing the forward drive state, the solenoid 71 moves the spool 72 toward the left side of FIG. 4C and the solenoid 81 causes the spool 82 to move toward the left side of FIG. 4C thereby causing the pilot pressure to be transmitted through the line 32 to the forward/reverse selector valves 51, and there-through to the line 34 to the valve 61. Thereby, the forward/reverse selector spool 52 and the neutral spool 62 both move leftward, as shown in FIG. 4C. Since the forward/reverse selector spool 42 is stuck, it stays in the right position. As a result, the main pressure is interrupted between the main pressure transmission lines 25 and 28. Further, the main pressure transmission line 22 is connected to the main pressure transmission line 27, but is disconnected from the main pressure transmission line 26. Accordingly, the main pressure is supplied to neither the forward hydraulic clutch 11 nor the reverse hydraulic clutch 12, and therefore activates neither of them. Thus, the vehicle is in the neutral state.

Figure 4D:
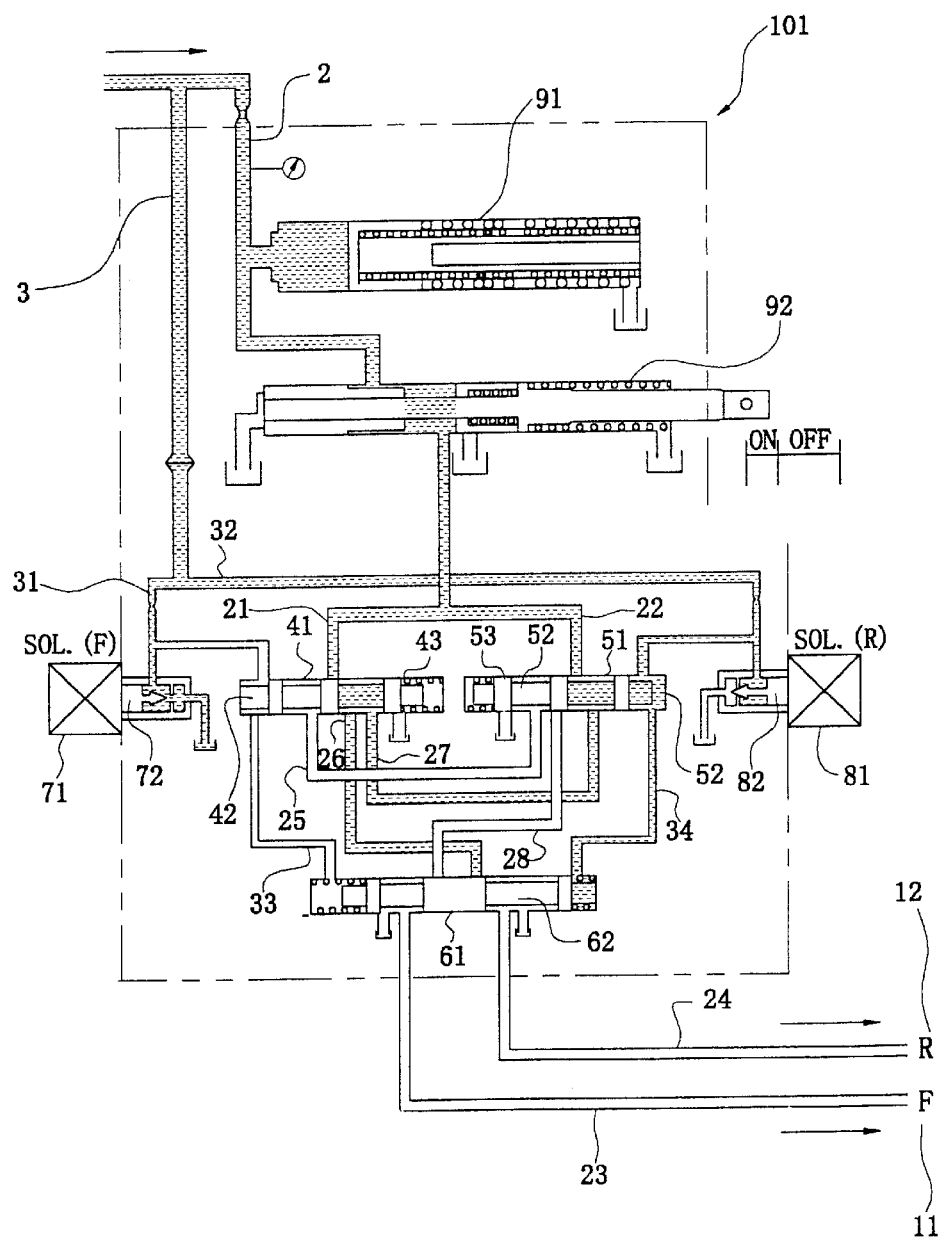
FIG. 4D is a schematic drawing showing the hydraulic control circuit depicted in FIG. 4A with the reverse drive state selected and a neutral spool member stuck in a forward drive state.

Now, description is given on the operation of the control hydraulic circuit 101 in the case where the neutral spool 62 is stuck when the vehicle driver selects the reverse drive state after releasing the forward drive state, with reference to FIG. 4D.

When the vehicle driver selects the reverse drive state after releasing the forward drive state, the solenoid 71 moves the spool 72 toward the left in FIG. 4D and the pilot pressure is released from forward/reverse selector valve 41 causing the spool 42 to move toward the left in FIG. 4D. The solenoid 81 causes the spool 82 to move toward the left side in FIG. 4D thereby causing the pilot pressure to be transmitted to the forward/reverse selector valve 51 via the pilot pressure transmission line 32, and from the valve 51 to the line 34. As a result, the forward/reverse selector spool 52 moves leftward, as depicted in FIG. 4D. Since the neutral spool 62 is stuck, it stays in the rightward position. The forward/reverse selector spool 42 is already returned to the initial position. As a result, the main pressure is interrupted between the main pressure transmission lines 21 and 25. Further, the main pressure transmission line 22 is connected to the main pressure transmission lines 27 and 26, but is disconnected from the main pressure transmission line 24. Accordingly, the main pressure is supplied to neither the forward hydraulic clutch 11 nor the reverse hydraulic clutch 12, and therefore activates neither of them. Thus, the vehicle is in the neutral state.

According to the control hydraulic circuit of this embodiment, as described above, the vehicle enters either the reverse drive state or the neutral state in the case where the forward/reverse selector spool and the neutral spool cannot operate when the vehicle driver switches the state from the forward drive to the reverse drive. Even in the above case, therefore, it is possible to prevent at least the forward movement of the vehicle, i.e., the movement in the direction opposite to that selected by the vehicle driver.

Figure 4E:
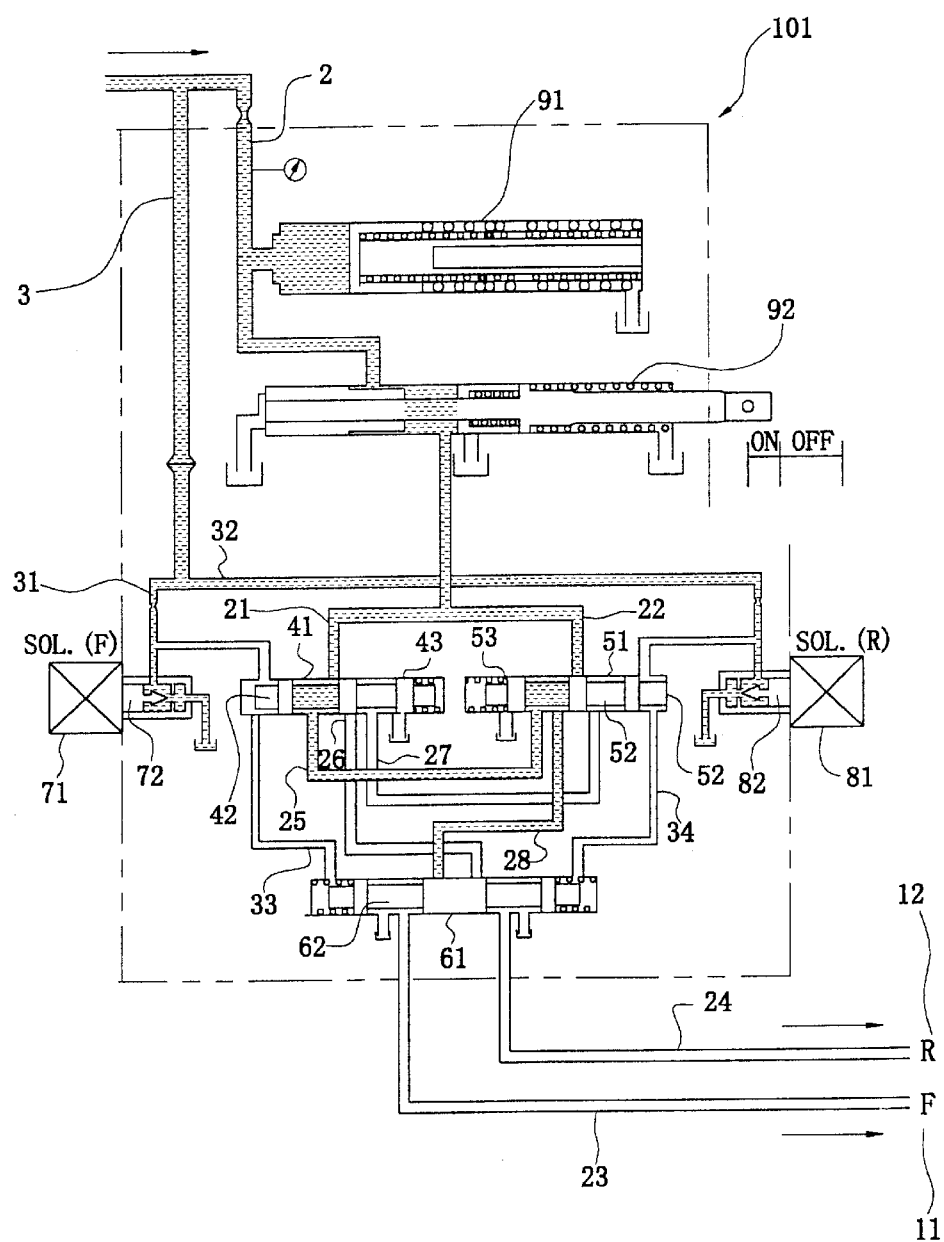
FIG. 4E is a schematic drawing showing the hydraulic control circuit depicted in FIG. 4A with the neutral drive state selected and a first spool stuck in a forward drive state.

Now, description is given on the operation of the control hydraulic circuit 101 in the case where the forward/reverse selector spool 42 is stuck when the vehicle driver selects the neutral state after releasing the forward drive state, as shown in FIG. 4E.

When the vehicle driver selects the neutral state after releasing the forward drive state, the pilot pressure is not transmitted to either of the forward/reverse selector spools 42 and 52, therefore, neither spool is urged by pilot pressure to move. Further, the neutral spool 62 does not change its positions from that shown in FIG. 4E. More specifically, the forward/reverse selector spool 42 stays stuck in the left position, and the neutral spool 62 and the forward/reverse selector spool 52 are in positions corresponding to neutral positions (the positions depicted in FIG. 4A). As a result, the main pressure is interrupted between the main pressure transmission lines 28 and 23, and is also interrupted between the main pressure transmission lines 22 and 28. Accordingly, the main pressure is supplied to neither the forward hydraulic clutch 11 nor the reverse hydraulic clutch 12, and therefore activates neither of them. Thus, the vehicle is in the neutral state.

Figure 4F:
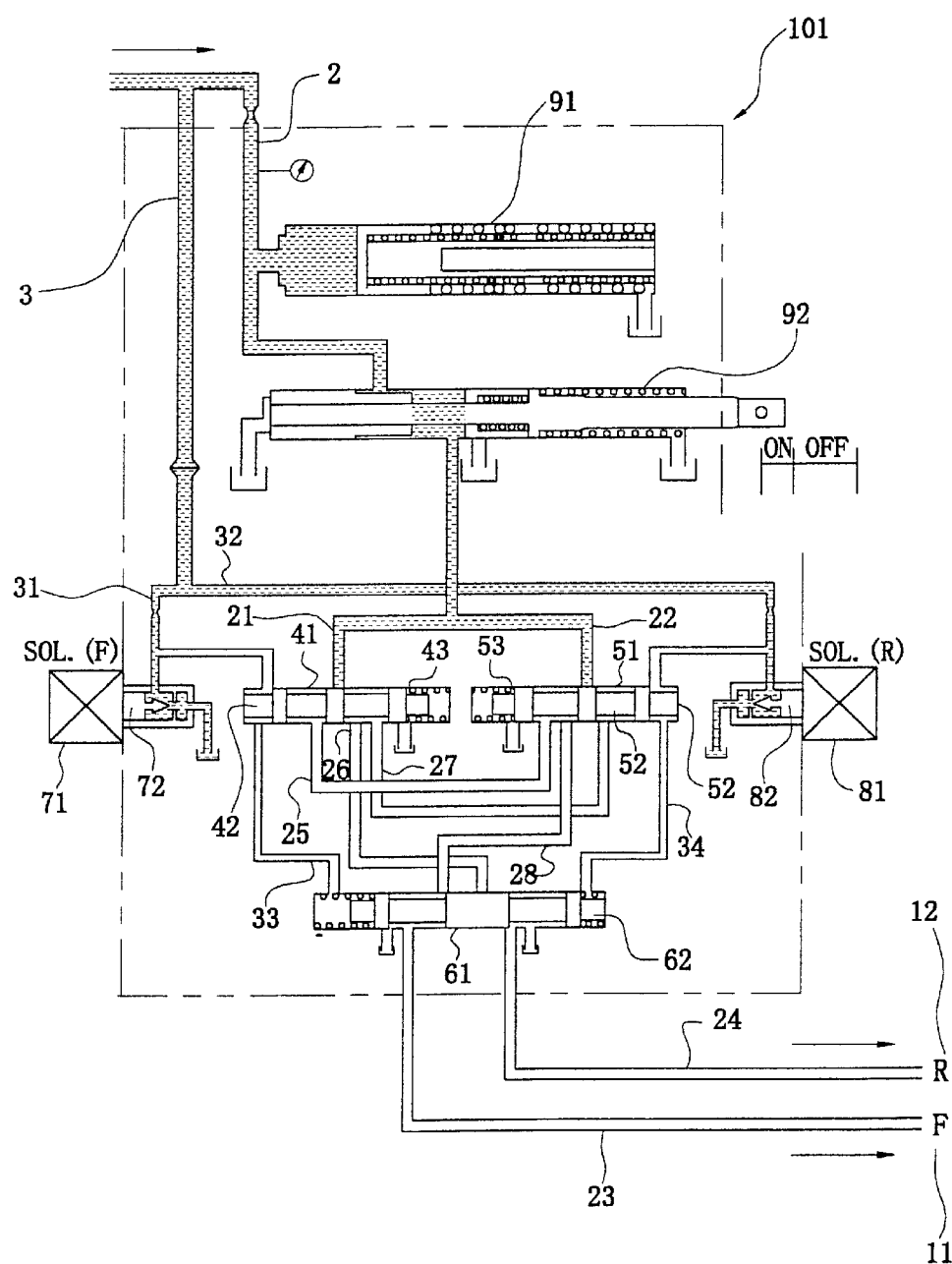
FIG. 4F is a schematic drawing showing the hydraulic control circuit depicted in FIG. 4A with the neutral drive state selected and the neutral spool member stuck in a drive state.

Now, description is given on the operation of the control hydraulic circuit 101 in the case where the neutral spool 62 is stuck when the vehicle driver selects the neutral state after releasing the forward drive state, as shown in FIG. 4F.

When the vehicle driver selects the neutral state after releasing the forward drive state, the pilot pressure is not transmitted to either of the valves 41 or 51 and therefore the forward/reverse selector spools 42 and 52 return to a neutral position, as depicted in FIG. 4F. Further, the neutral spool 62 does not change its position. More specifically, the neutral spool 62 is stuck and stays in the left position. As a result, the main pressure is interrupted between the main pressure transmission lines 21 and 25, and is also interrupted between the main pressure transmission lines 22 and 28. Accordingly, the main pressure is supplied to neither the forward hydraulic clutch 11 nor the reverse hydraulic clutch 12, and therefore activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the forward drive state to the neutral state. Even in the above case, therefore, the neutral state can be achieved as selected by the vehicle driver.

Figure 4G:
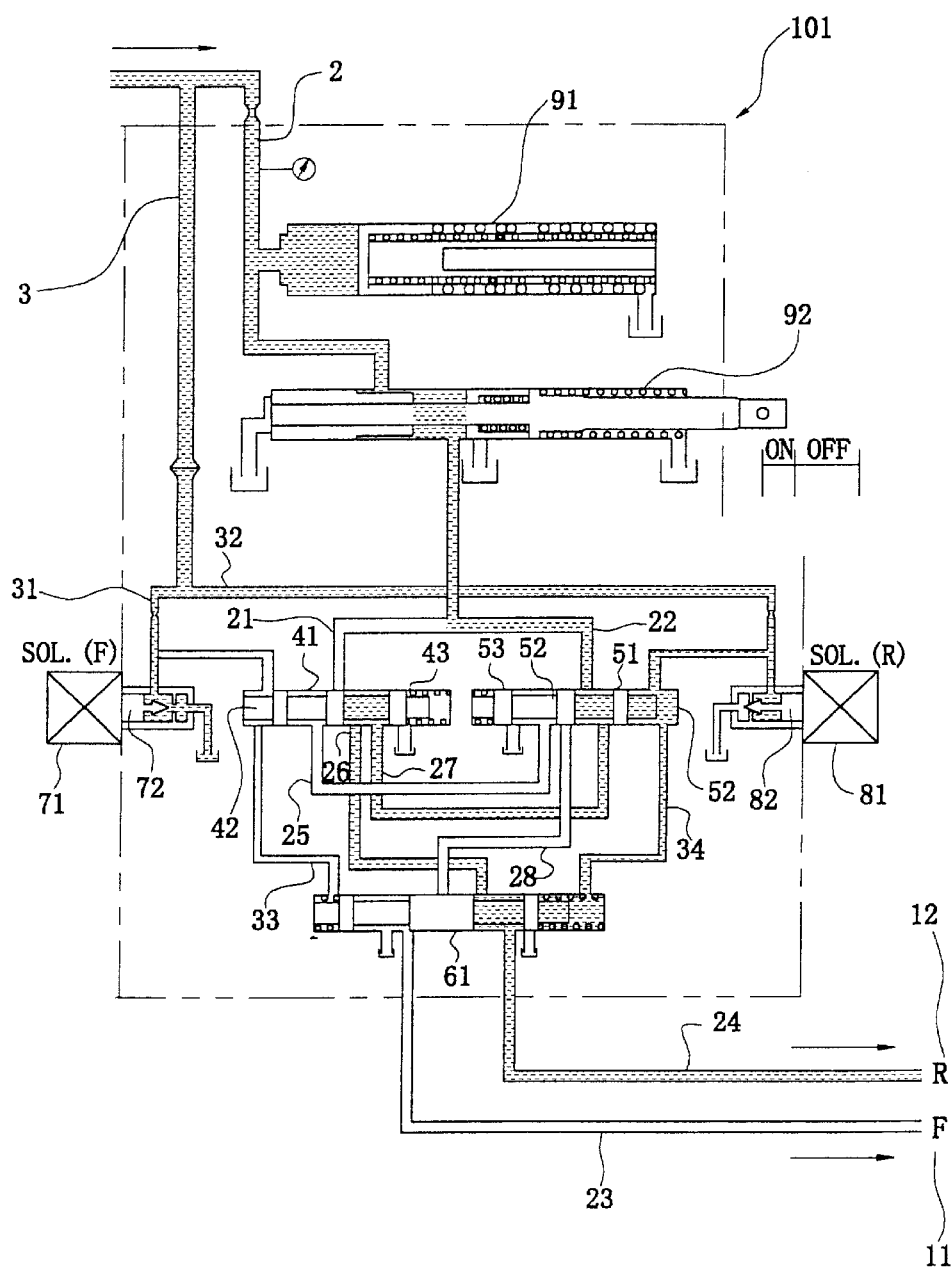
FIG. 4G is a schematic drawing showing the hydraulic control circuit depicted in FIG. 4A with reverse drive state selected.

Now, description is given on the operation in the case where the vehicle driver selects the reverse drive state, as shown in FIG. 4G.

When the vehicle driver selects the reverse drive state, the pilot pressure is transmitted to the forward/reverse selector valve 51 and the neutral valve 61 via the pilot pressure transmission lines 32 and 34. Thereby, the forward/reverse selector spool 52 and the neutral spool 62 move rightward. The forward/reverse selector spool 42 does not move. Accordingly, the main pressure is supplied to the reverse hydraulic clutch 12 via the main pressure transmission lines 22, 27, 26 and 24. In this manner, the reverse drive state selected by the vehicle driver is achieved.

Figure 4H:
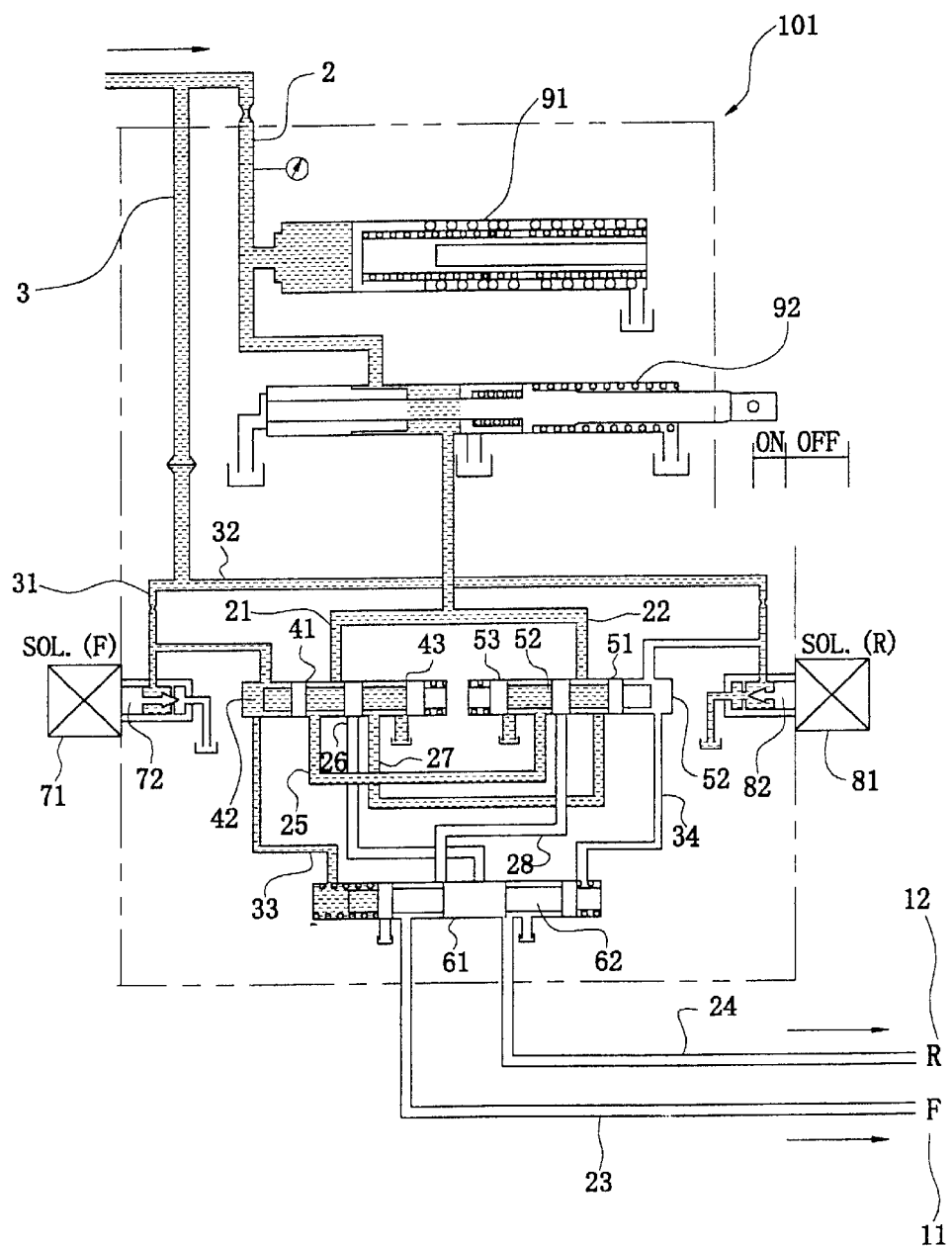
FIG. 4H is a schematic drawing showing the hydraulic control circuit depicted in FIG. 4A with the forward drive state selected and a second spool member stuck in a drive state.

Now, description is given on the operation of the control hydraulic circuit 101 in the case where the forward/reverse selector spool 52 is stuck when the vehicle driver selects the forward drive state after releasing the reverse drive state, as shown in FIG. 4H.

When the vehicle driver selects the forward drive state after releasing the reverse drive state, the pilot pressure is transmitted to the forward/reverse selector valve 41 and the neutral valve 61 via the pilot pressure transmission lines 31 and 33. Thereby, the forward/reverse selector spool 42 and the neutral spool 62 move leftward. Since the forward/reverse selector spool 52 is stuck, it stays in the rightward position. As a result, the main pressure is interrupted between the main pressure transmission lines 27 and 26. Also, the main pressure transmission line 21 is connected to the main pressure transmission line 25, but is disconnected from the main pressure transmission line 28. Accordingly, the main pressure is supplied to neither the forward hydraulic clutch 11 nor the reverse hydraulic clutch 12, and therefore activates neither of them. Thus, the vehicle is in the neutral state.

Figure 4I:
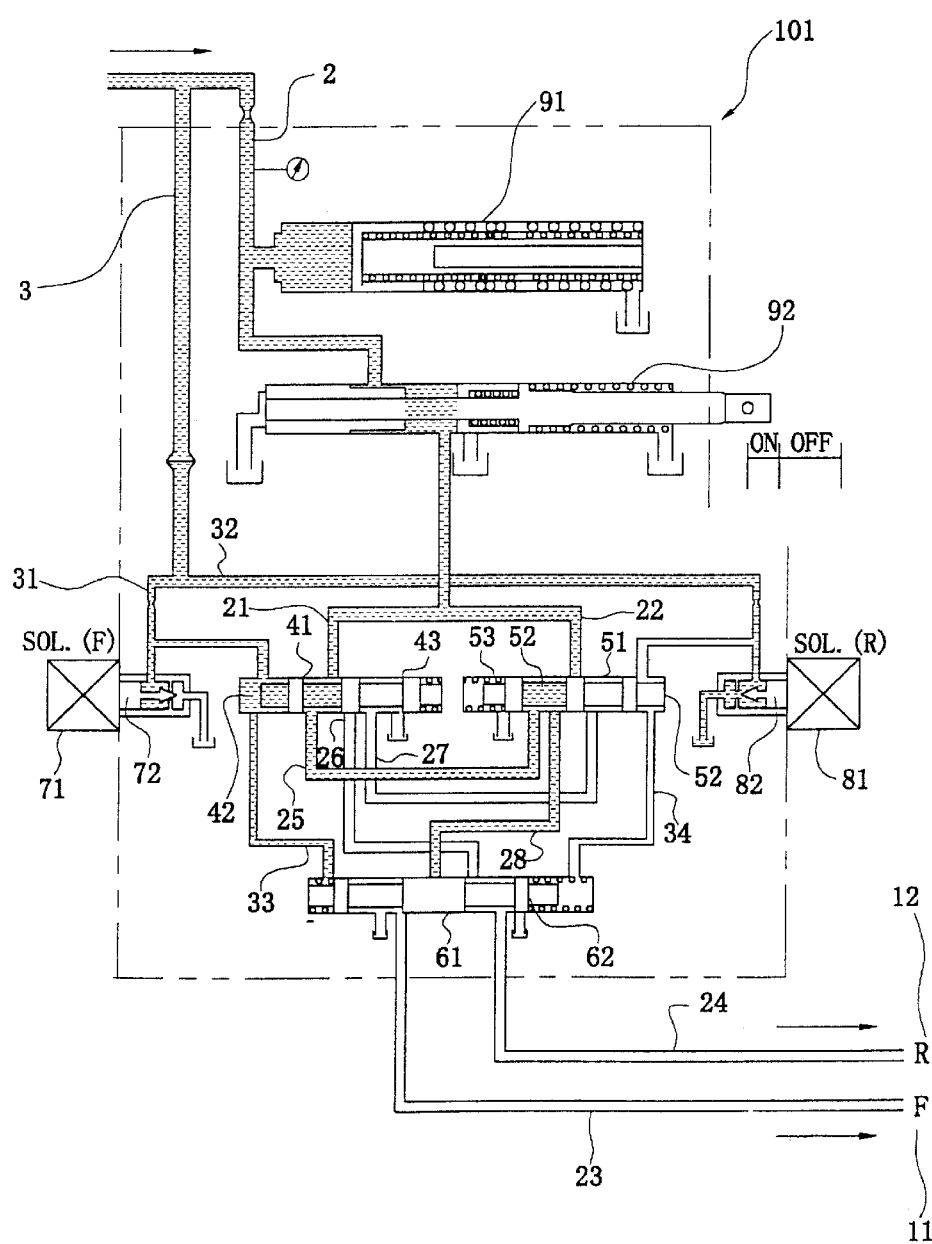
FIG. 4I is a schematic drawing showing the hydraulic control circuit depicted in FIG. 4A with the forward drive state selected and the neutral spool member stuck in a drive state.
Figure 4J:
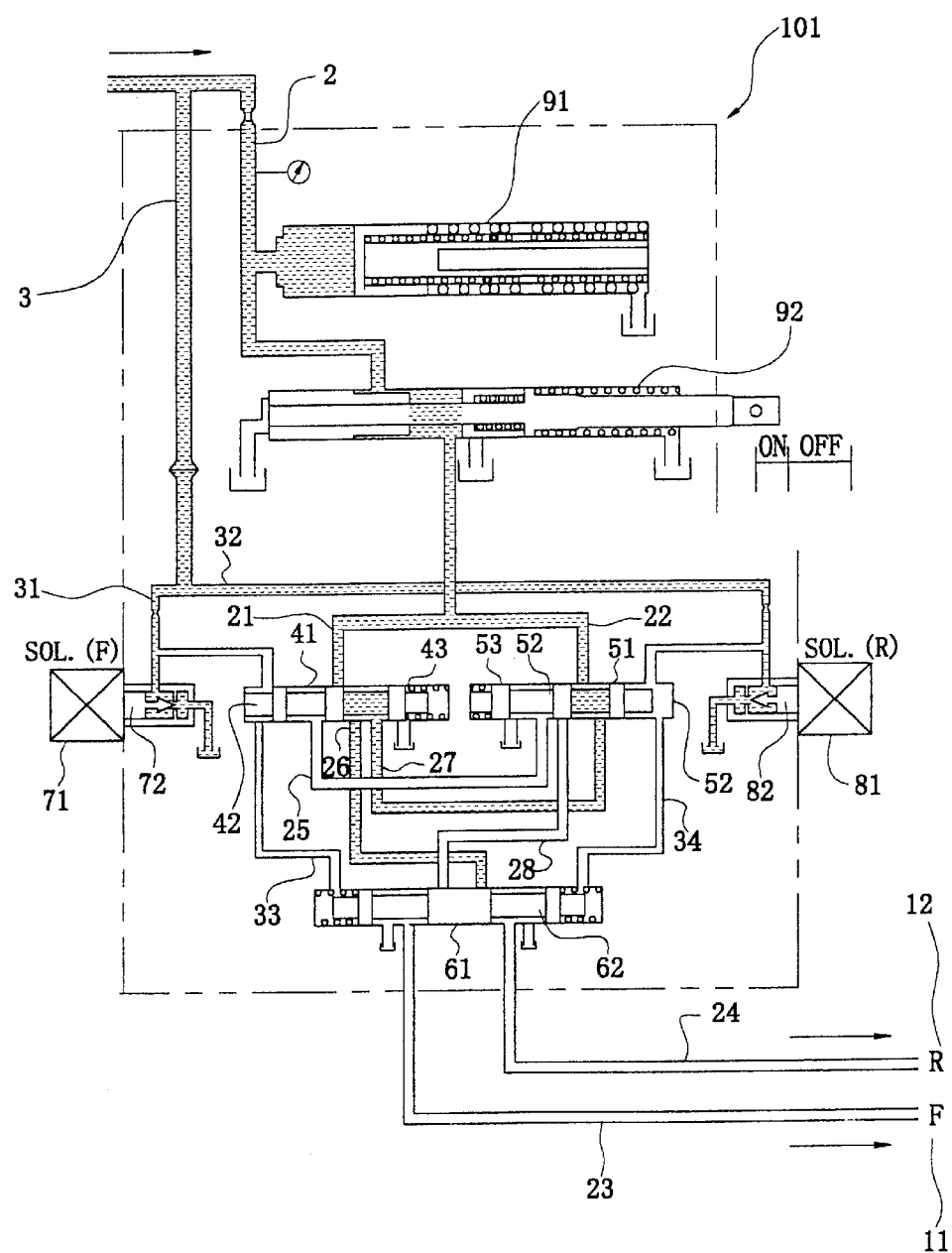
FIG. 4J is a schematic drawing showing the hydraulic control circuit depicted in FIG. 4A with the neutral drive state selected and the second spool member stuck in a drive state.

Now, description is given on the operation of the control hydraulic circuit 101 in the case where the neutral spool 62 is stuck when the vehicle driver selects the forward drive state after being in the reverse drive state, as shown in FIG. 4I.

When the vehicle driver selects the forward drive state after releasing the reverse drive state, the pilot pressure is transmitted to the forward/reverse selector valve 41 and the neutral valve 61 via the pilot pressure transmission lines 31 and 33. Thereby, the forward/reverse selector spool 42 moves rightward. Since the neutral spool 62 is stuck, it stays in the leftward position. The forward/reverse selector spool 52 which is already returned to the initial position stays there. As a result, the main pressure is interrupted between the main pressure transmission lines 22 and 27. Also, the main pressure transmission line 21 is connected to the main pressure transmission lines 25 and 28, but is disconnected from the main pressure transmission line 23. Accordingly, the main pressure is supplied to neither the forward hydraulic clutch 11 nor the reverse hydraulic clutch 12, and therefore activates neither of them. Thus, the vehicle is in the neutral state.

According to the control hydraulic circuit of this embodiment, as described above, the vehicle enters the neutral state in the case where the forward/reverse selector spool and the neutral spool cannot operate when the vehicle driver switches the state from the reverse drive to the forward drive state. Even in the above case, therefore, it is possible to prevent the reverse movement of the vehicle, i.e., the movement in the direction opposite to that selected by the vehicle driver.

Now, description is given on the operation of the control hydraulic circuit 101 in the case where the forward/reverse selector spool 52 is stuck when the vehicle driver selects the neutral state after being in the reverse drive state, as shown in FIG. 4G.

When the vehicle driver selects the neutral state after releasing the reverse drive state, the pilot pressure is not transmitted so that the forward/reverse selector spools 42 and 52 as well as the neutral spool 62 do not change their positions. More specifically, the forward/reverse selector spool 52 which is stuck stays in the left position, and the neutral spool 62 and the forward/reverse selector spool 42 stay in the same positions. As a result, the main pressure is interrupted between the main pressure transmission lines 26 and 24, and is also interrupted between the main pressure transmission lines 21 and 25. Accordingly, the main pressure is supplied to neither the forward hydraulic clutch 11 nor the reverse hydraulic clutch 12, and therefore activates neither of them. Thus, the vehicle is in the neutral state.

Figure 4K:
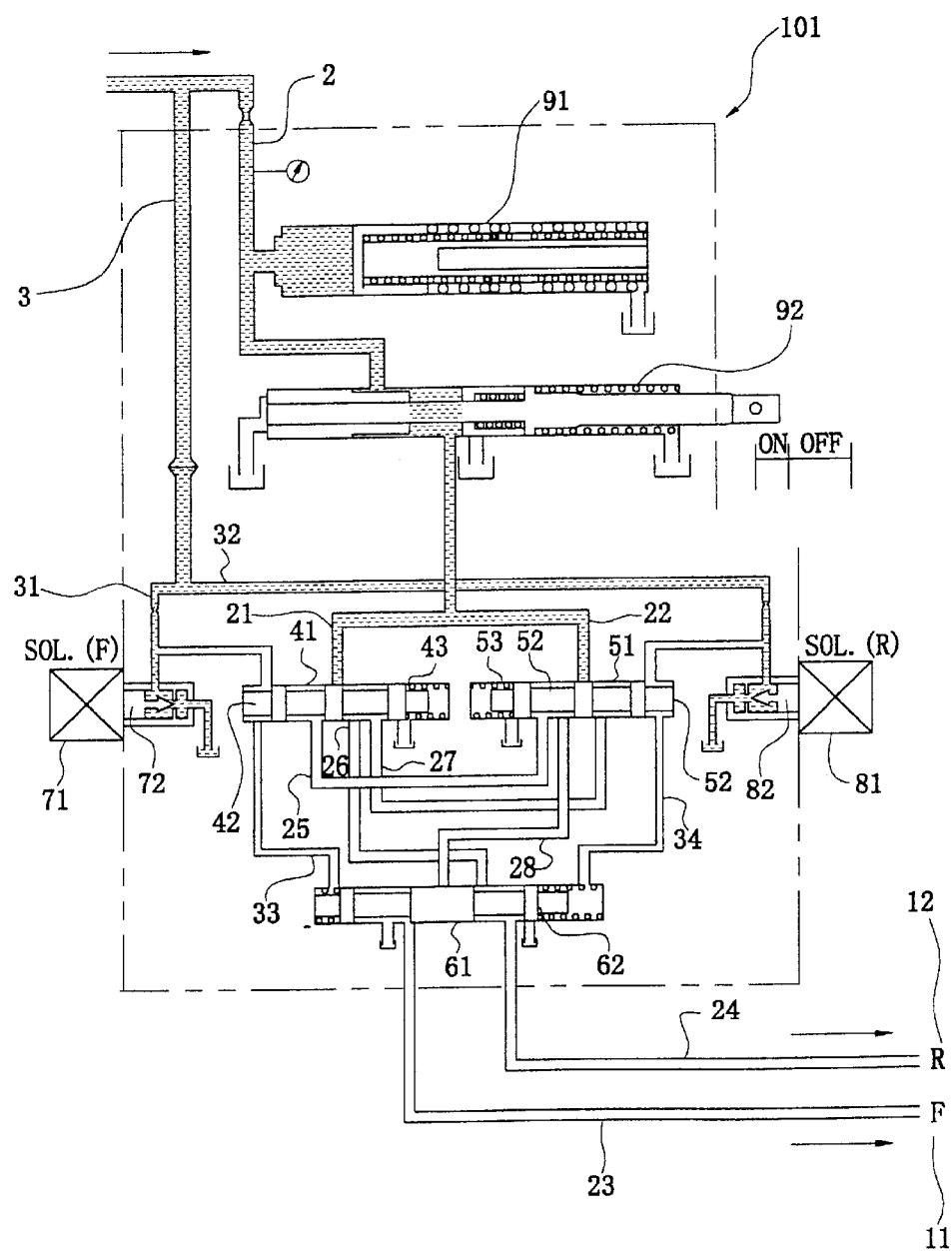
FIG. 4K is a schematic drawing showing the hydraulic control circuit depicted in FIG. 4A with the neutral drive state selected and the neutral spool member stuck in a drive state.

Now, description is given on the operation of the control hydraulic circuit 101 in the case where the neutral spool 62 is stuck when the vehicle driver selects the neutral state after being in the reverse drive state, as shown in FIG. 4K.

When the vehicle driver selects the neutral state after being in the reverse drive state, the pilot pressure is not transmitted so that the forward/reverse selector spools 42 and 52 as well as the neutral spool 62 do not change their positions. More specifically, the neutral spool 62 which is stuck stays in the leftward position, and the forward/reverse selector spools 42 and 52 stay in the same positions. As a result, the main pressure is interrupted between the main pressure transmission lines 22 and 27, and is also interrupted between the main pressure transmission lines 21 and 25. Accordingly, the main pressure is supplied to neither the forward hydraulic clutch 11 nor the reverse hydraulic clutch 12, and therefore activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the reverse drive state to the neutral state. Even in the above case, therefore, the neutral state can be achieved as selected by the vehicle driver.

Third Embodiment

A third embodiment of a hydraulic circuit for controlling an automatic transmission is shown in FIGS. 5A, 5B, 5C and 5D.

In the third embodiment, the main pressure transmission line 2 is connected via the accumulator 91 and the inching valve 92 to the neutral spool 61, and then is divided into the four main pressure transmission lines 21, 22, 25 and 26. The main pressure transmission line 21 is connected to the forward/reverse selector valve 41 via the solenoid valve 71. The main pressure transmission line 25 is connected to the forward/reverse selector valve 41, and then is divided into the main pressure transmission lines 24, 27 and 28. The main pressure transmission line 24 is connected to the reverse hydraulic clutch 12. The main pressure transmission lines 27 and 28 are connected to different ports of the forward/reverse selector valve 51, respectively. The main pressure transmission line 22 is connected via the solenoid valve 81 to the forward/reverse selector valve 51. The main pressure transmission line 26 is connected to the forward/reverse selector valve 51, and is divided into the main pressure transmission lines 23, 27 and 28. The main pressure transmission line 23 is connected to the forward hydraulic clutch 11.

The pilot pressure transmission line 3 is branched from the pilot pressure transmission line 2, is connected to a solenoid valve 200, and then is connected to the neutral valve 61.

Figure 5A:
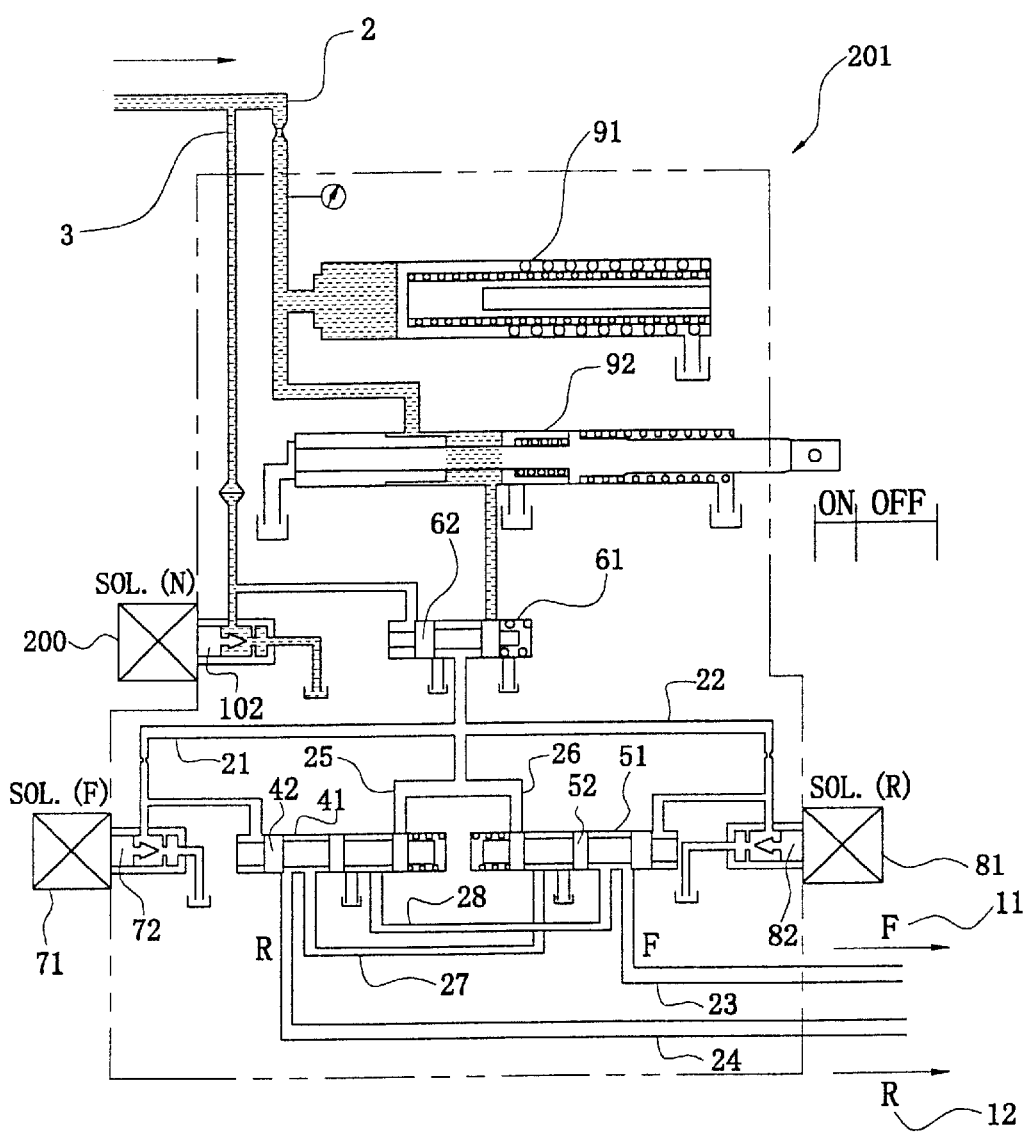
FIG. 5A is a schematic drawing showing a hydraulic control circuit for a hydraulically controlled transmission in accordance with a third embodiment of the invention, with a neutral drive state selected.

In FIG. 5A, the control hydraulic circuit 201 in accordance with the third embodiment is shown with a neutral drive state selected where no main pressure is provided to the clutches 11 or 12.

Then, operation of the control hydraulic circuit 201 is briefly described below.

Figure 5B:
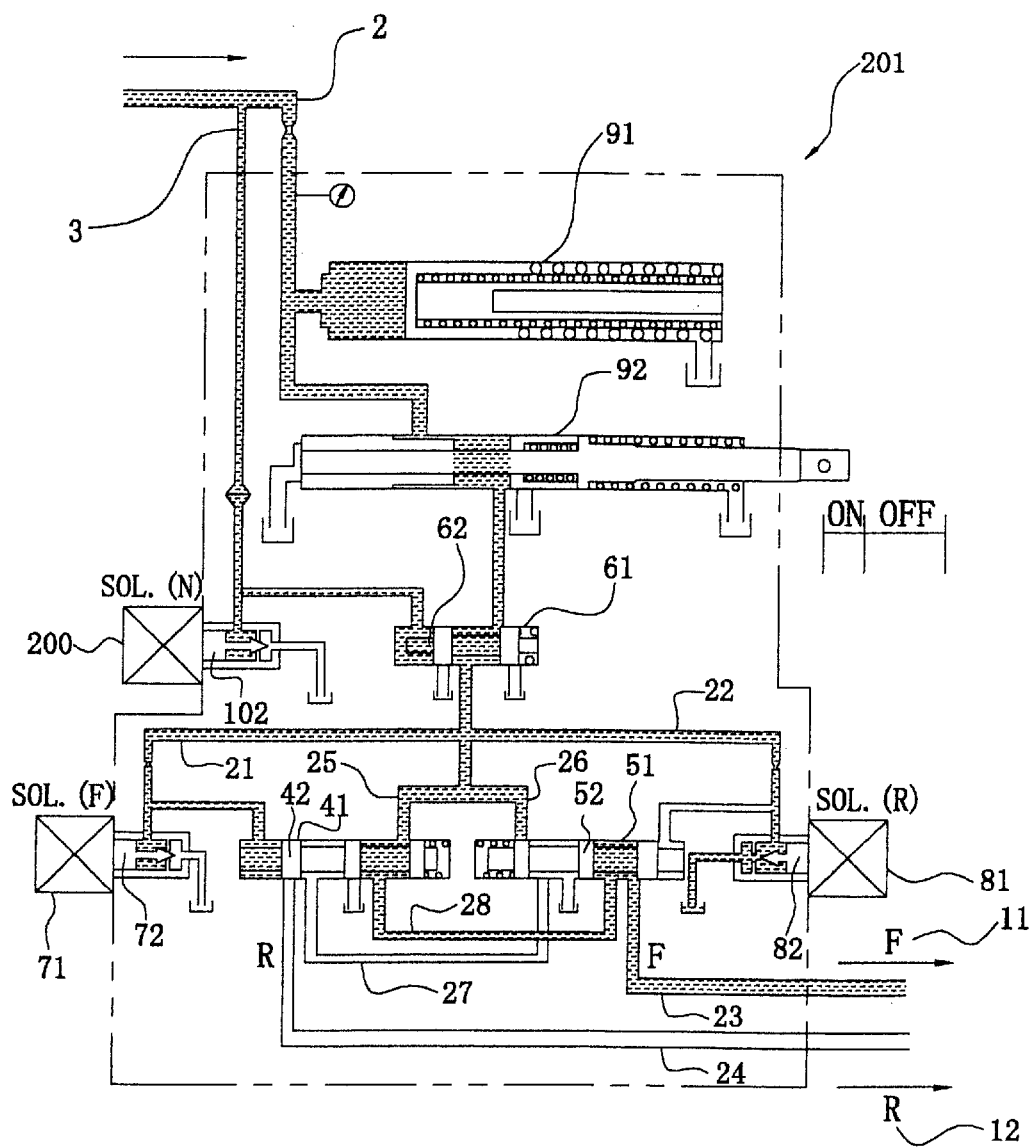
FIG. 5B is a schematic drawing showing the hydraulic control circuit depicted in FIG. 5A with the forward drive state selected.

Description is first given on the operation which is performed when the vehicle driver selects the forward drive state, as shown in FIG. 5B.

In this embodiment, when the vehicle driver selects the forward drive state, the solenoid valves 200 and 71 are energized. When the vehicle driver selects the reverse drive state, the solenoid valves 200 and 81 are energized. When the neutral state is selected, the three solenoid valves 71, 81 and 200 are all deenergized.

When the vehicle driver selects the forward drive state, the pilot pressure moves the neutral spool 62 rightward. Thereby, the main pressure supplied via the main pressure transmission line 21 moves the forward/reverse selector spool 42 rightward, as shown in FIG. 5B. At this point, the neutral spool 62 and the forward/reverse selector spool 42 move rightward, and the forward/reverse selector spool 52 does not move. Accordingly, the main pressure transmission line 2 is connected to the main pressure transmission lines 25, 28 and 23, and the main pressure is supplied to the forward hydraulic clutch 11. In this manner, the forward drive state selected by the vehicle driver is achieved.

Figure 5C:
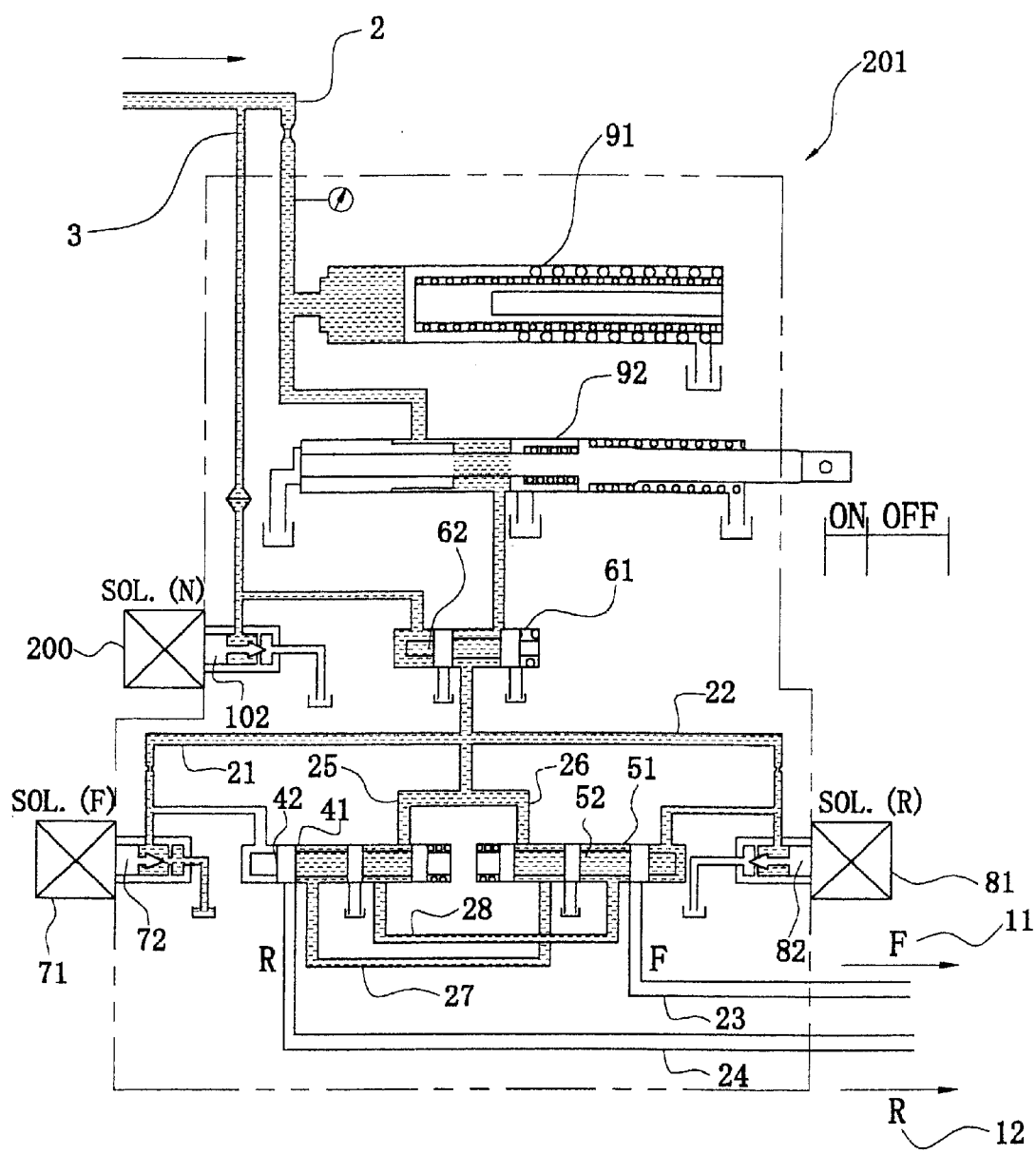
FIG. 5C is a schematic drawing showing the hydraulic control circuit depicted in FIG. 5A with the reverse drive state selected and a first spool member stuck in a forward drive state.

Now, description is given on the operation of the control hydraulic circuit 201 in the case where the forward/reverse selector spool 42 is stuck when the vehicle driver selects the reverse drive state after releasing the forward drive state, as shown in FIG. 5C.

When the vehicle driver selects the reverse drive state after releasing the forward drive state, the pilot pressure moves the neutral spool 62 rightward. Thereby, the main pressure applied via the main pressure transmission line 22 moves the forward/reverse selector spool 52 leftward. At this point of time, the neutral spool 62 moves rightward, the forward/reverse selector spool 52 moves leftward, and the forward/reverse selector spool 42 which is stuck stays in the rightward position. Therefore, the main pressure is interrupted between the main pressure transmission lines 28 and 23. Also, the main pressure transmission line 26 is connected to the main pressure transmission line 27, but is disconnected from the main pressure transmission line 24. Accordingly, the main pressure is supplied to neither the forward hydraulic clutch 11 nor the reverse hydraulic clutch 12, and therefore activates neither of them. Thus, the vehicle is in the neutral state.

Now, description is given on the operation of the control hydraulic circuit 201 in the case where the neutral spool 62 is stuck when the vehicle driver selects the reverse drive state after releasing the forward drive state (not shown).

When the vehicle driver selects the reverse drive state after releasing the forward drive state, the neutral spool 62 which is stuck stays in the right position, and the main pressure applied through the main pressure transmission line 22 moves the forward/reverse selector spool 52 leftward. At this point, since the neutral spool 62 is stuck, it stays in the right position. Also, the forward/reverse selector spool 52 moves leftward, and forward/reverse selector spool 42 returns to the initial position. Therefore, the main pressure is interrupted between the main pressure transmission lines 25 and 28. Further, the main pressure transmission line 26 is connected to the main pressure transmission lines 27 and 24, and the main pressure is supplied to the reverse hydraulic clutch 12. Thus, the vehicle is in the reverse drive state.

According to the control hydraulic circuit of this embodiment, as described above, the vehicle enters either the reverse drive state or the neutral state in the case where the forward/reverse selector spool and the neutral spool cannot operate when the vehicle driver switches the state from the forward drive to the reverse drive. Even in the above case, therefore, it is possible to prevent at least the forward movement of the vehicle, i.e., the movement in the direction opposite to that selected by the vehicle driver.

Now, description is given on the operation of the control hydraulic circuit 201 in the case where the forward/reverse selector spool 42 is stuck when the vehicle driver selects the neutral state after releasing the forward drive state (not shown).

When the vehicle driver selects the neutral state after releasing the forward drive state, the pilot pressure is not transmitted to the neutral spool 62 which does not move rightward but stays in the position shown in FIG. 5A. Accordingly, the main pressure is interrupted by the neutral spool 62, and the main pressure is supplied to neither the forward hydraulic clutch 11 nor the reverse hydraulic clutch 12, and therefore activates neither of them. Thus, the vehicle is in the neutral state.

Now, description is given on the operation of the control hydraulic circuit 201 in the case where the neutral spool 62 is stuck when the vehicle driver selects the neutral state after releasing the forward drive state (not shown).

When the vehicle driver selects the neutral state after releasing the forward drive state, the neutral spool 62 may become stuck in the rightward position. Therefore, the main pressure can be transmitted through the neutral valve 61, but is not transmitted because both the tank ports of the solenoid valves 71 and 81 are open. Accordingly, the main pressure is supplied to neither the forward hydraulic clutch 11 nor the reverse hydraulic clutch 12, and therefore activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the forward drive state to the neutral state. Even in the above case, therefore, the neutral state can be achieved as selected by the vehicle driver.

Figure 5D:
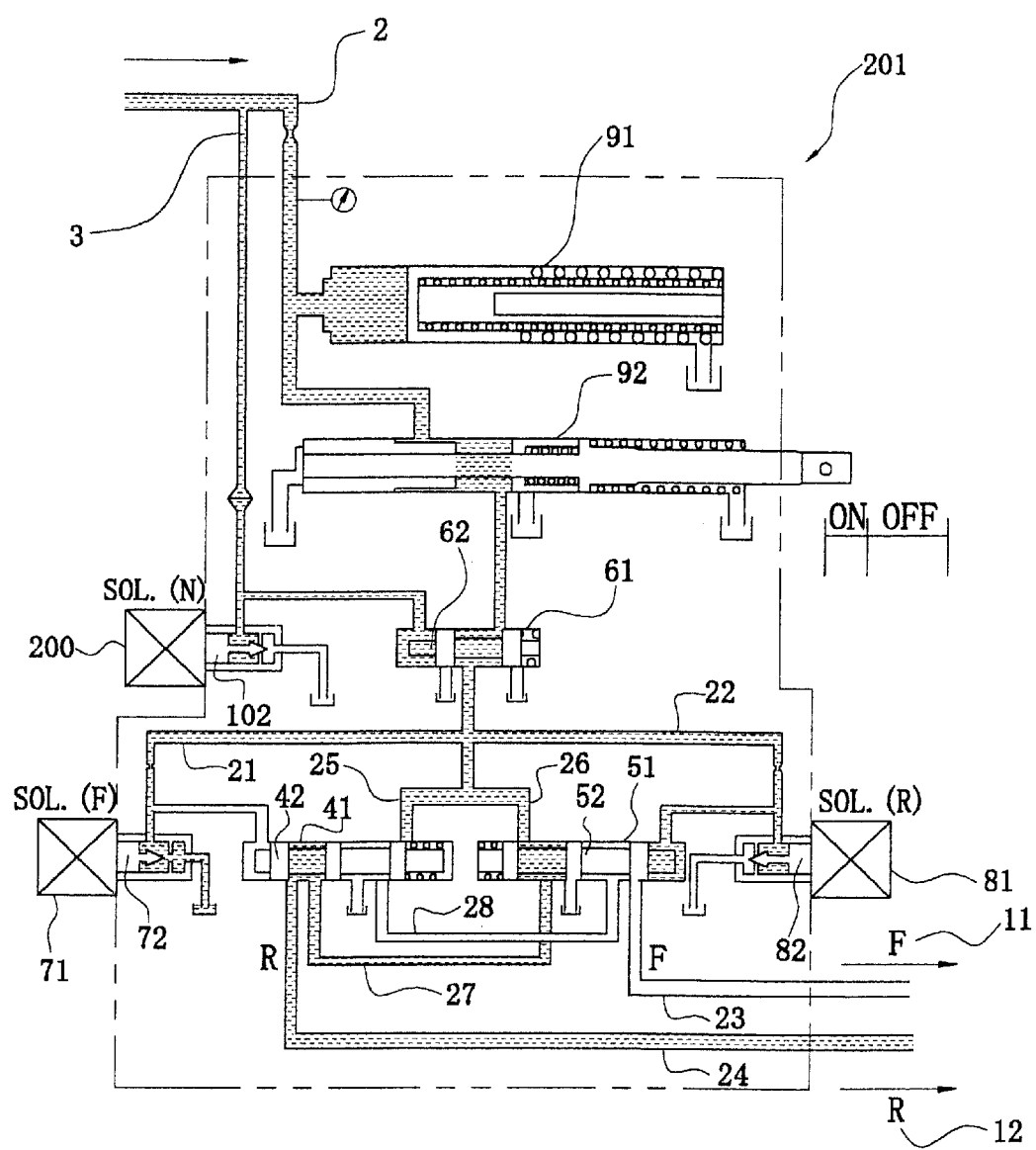
FIG. 5D is a schematic drawing showing the hydraulic control circuit depicted in FIG. 5A with the reverse drive state selected.

Now, description is given on the operation in the case where the vehicle driver selects the reverse drive state, as shown in FIG. 5D.

When the vehicle driver selects the reverse drive state, the pilot pressure moves the neutral spool 62 rightward. Thereby, the main pressure applied via the main pressure transmission line 22 moves the forward/reverse selector spool 52 leftward. At this point of time, the neutral spool 62 moves rightward, the forward/reverse selector spool 52 moves leftward, and the forward/reverse selector spool 42 does not move. Accordingly, the main pressure transmission line 2 is connected to the main pressure transmission lines 26, 27 and 24, and supplies the main pressure to the reverse hydraulic clutch 12. In this manner, the reverse drive state selected by the vehicle driver is achieved.

Figure 5E:
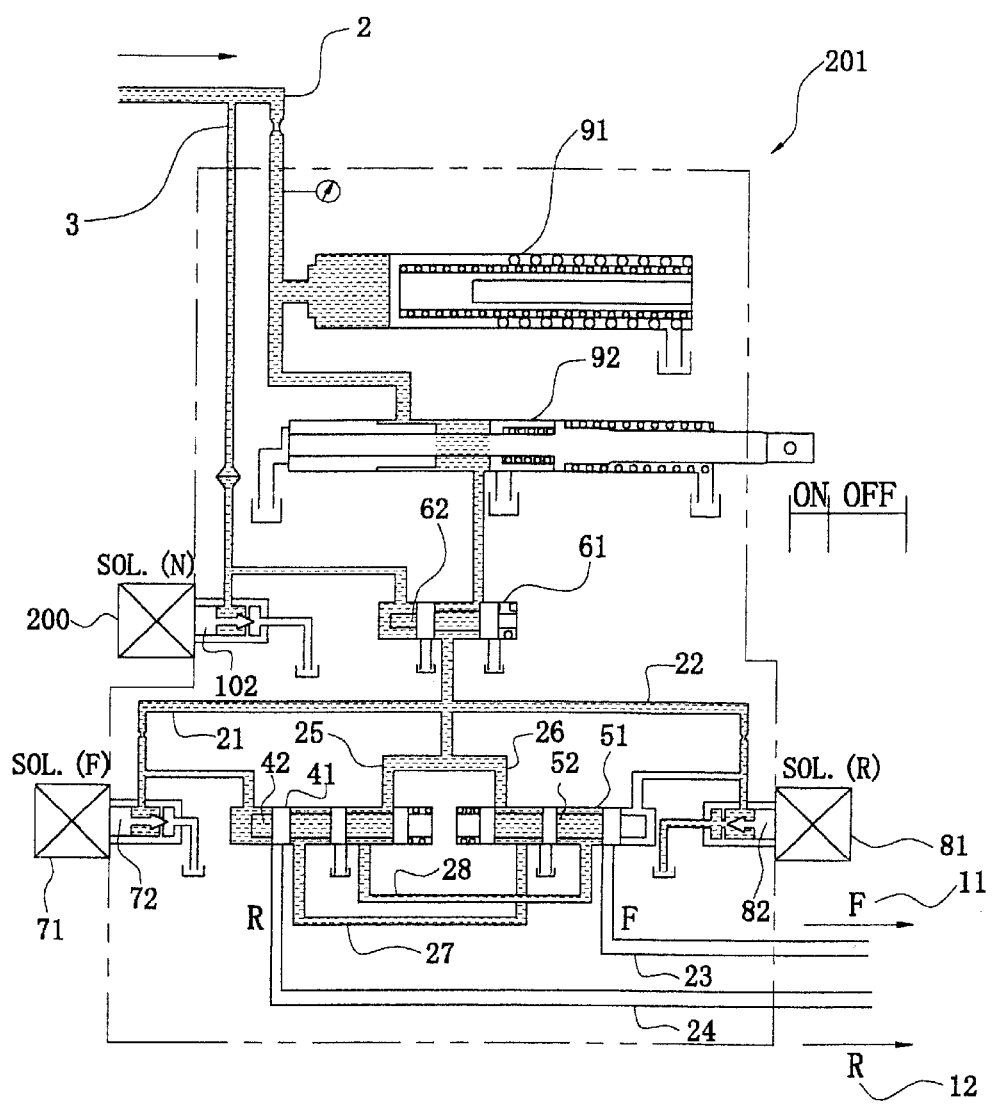
FIG. 5E is a schematic drawing showing the hydraulic control circuit depicted in FIG. 5A with the forward drive state selected and a second spool member stuck in a reverse drive state.

Now, description is given on the operation of the control hydraulic circuit 201 in the case where the forward/reverse selector spool 52 is stuck when the vehicle driver selects the forward drive state after releasing the reverse drive state, as shown in FIG. 5E.

When the vehicle driver selects the forward drive state after releasing the reverse drive state, the pilot pressure moves the neutral spool 62 rightward. Thereby, the main pressure supplied via the main pressure transmission line 21 moves the forward/reverse selector spool 42 rightward. At this point of time, the neutral spool 62 and the forward/reverse selector spool 42 move rightward, and the forward/reverse selector spool 52 which is stuck stays in the left position. Accordingly, the main pressure is interrupted between the main pressure transmission lines 27 and 24. The main pressure transmission line 25 is connected to the main pressure transmission line 28, but is disconnected from the main pressure transmission line 23. Accordingly, the main pressure is supplied to neither the forward hydraulic clutch 11 nor the reverse hydraulic clutch 12, and therefore activates neither of them. Thus, the vehicle is in the neutral state.

Now, description is given on the operation of the control hydraulic circuit 201 in the case where the neutral spool 62 is stuck when the vehicle driver selects the forward drive state after releasing the reverse drive state (not shown).

When the vehicle driver selects the forward drive state after releasing the reverse drive state, the neutral spool 62 which is stuck stays in the right position, and the main pressure supplied via the main pressure transmission line 21 moves the forward/reverse selector spool 42 rightward. At this point, the neutral spool 62 which is stuck stays in the right position, the forward/reverse selector spool 42 moves rightward and the forward/reverse selector spool 52 returned to the initial position stays there. Accordingly, the main pressure is interrupted between the main pressure transmission lines 26 and 27. The main pressure transmission line 25 is connected to the main pressure transmission lines 28 and 23, and supplies the main pressure to the forward hydraulic clutch 11. Thus, the vehicle enters the forward drive state.

According to the control hydraulic circuit of this embodiment, as described above, the vehicle enters either the neutral state or the forward drive state in the case where the forward/reverse selector spool and the neutral spool cannot operate when the vehicle driver switches the state from the reverse drive state to the forward drive state. Even in the above case, therefore, the vehicle does not move at least in the reverse direction, i.e., the direction opposite to the direction selected by the vehicle driver.

Now, description is given on the operation of the control hydraulic circuit 201 in the case where the vehicle driver selects the neutral state after releasing the reverse state, and the forward/reverse selector spool 52 is stuck (not shown).

When the vehicle driver selects the neutral state after releasing the reverse state, the solenoid 200 opens to release pilot pressure in the line 3, therefore the pilot pressure is not transmitted to the neutral spool 62 does not move rightward. Therefore, the main pressure is interrupted by the neutral spool 62 so that the main pressure is supplied to neither the forward hydraulic clutch 11 nor the reverse hydraulic clutch 12, and activates neither of them. Thus, the vehicle is in the neutral state.

Now, description is given on the operation of the control hydraulic circuit 201 in the case where the neutral spool 62 is stuck when the vehicle driver selects the neutral state after releasing the reverse state.

When the vehicle driver selects the neutral state after releasing the reverse state, the neutral spool 62 is stuck in the right position so that the main pressure is passed through the neutral valve 61, but is not transmitted because both the tank ports of the selector valves 71 and 81 are open. Therefore, the main pressure is supplied to neither the forward hydraulic clutch 11 nor the reverse hydraulic clutch 12, and activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the reverse drive to the neutral state. Even in the above case, therefore, the neutral state selected by the vehicle driver can be achieved.

Fourth Embodiment

A fourth embodiment of a hydraulic circuit 301 for controlling an automatic transmission is shown in FIGS. 6A, 6B, 6C, 6D, 6E, 6F, 6G, 6H, 6I, 6J and 6K.

Figure 6A:
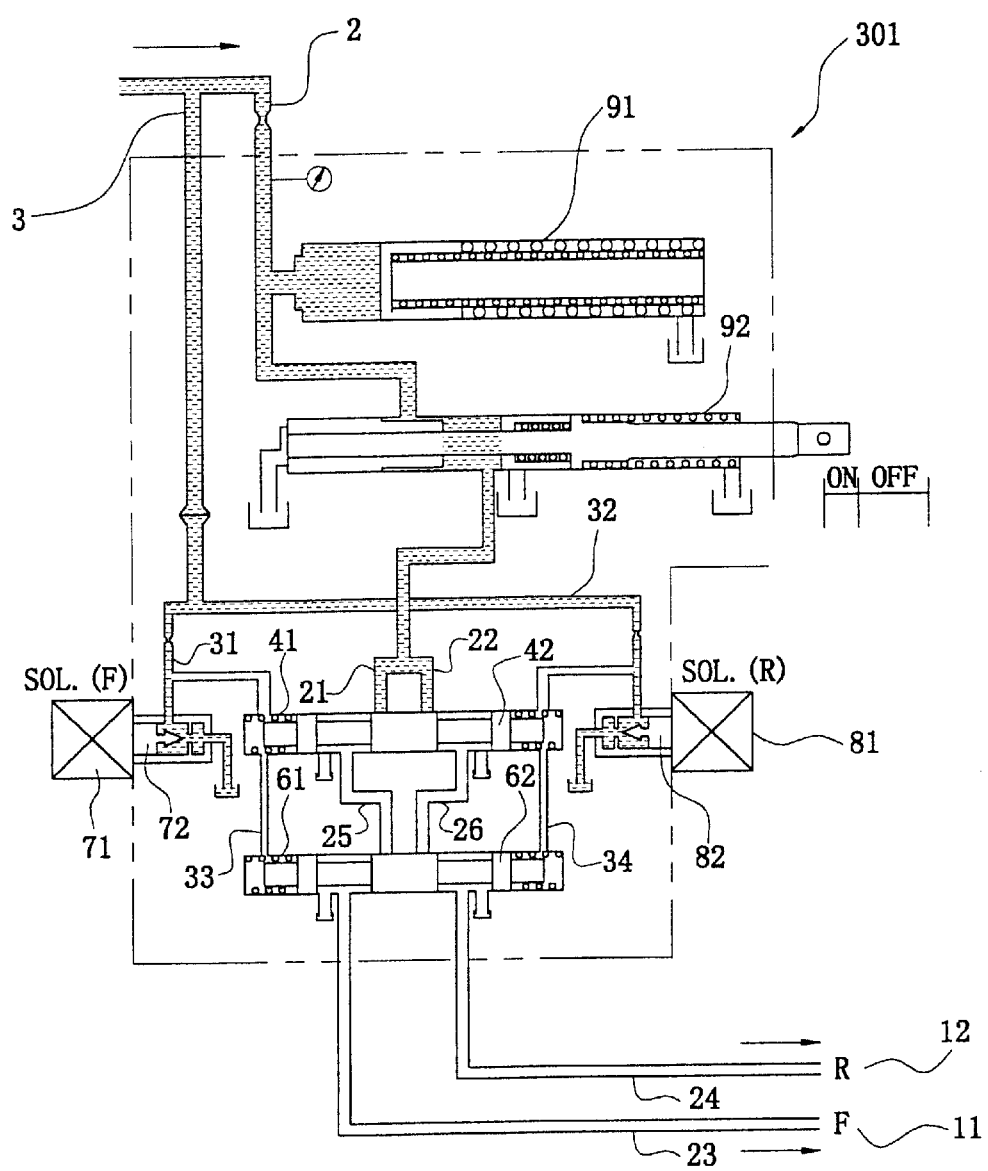
FIG. 6A is a schematic drawing showing a hydraulic control circuit for a hydraulically controlled transmission in accordance with a fourth embodiment of the invention with the circuit in a neutral drive state.

The hydraulic circuit 301 is depicted in FIG. 6A in a neutral drive state.

In this embodiment, the main pressure transmission line 2 extends through the accumulator 91 and the inching valve 92, and then is divided into the main pressure transmission lines 21 and 22, which are connected to the forward/reverse selector valve 41. The main pressure transmission lines 21 and 22 connect to the forward/reverse selector valve 41 and selectively communicate with the main pressure transmission lines 25 and 26, respectively, also connected to the neutral valve 61. The main pressure transmission lines 25 and 26 are connected to the neutral valve 61 and selectively communicate with the main pressure transmission lines 23 and 24 which are connected to the forward and reverse hydraulic clutches 11 and 12, respectively.

The pilot pressure transmission line 31 is connected to the forward/reverse selector valve 41 via the solenoid valve 71, and the portion thereof extending from the forward/reverse selector valve 41 forms the pilot pressure transmission line 33 connected to the neutral valve 61. The pilot pressure transmission line 32 is connected to the forward/reverse selector valve 41 via the solenoid valve 81, and the portion thereof extending from the forward/reverse selector valve 41 forms the pilot pressure transmission line 34 connected to the neutral valve 61.

Now, operation of the control hydraulic circuit 301 is briefly described below.

Figure 6B:
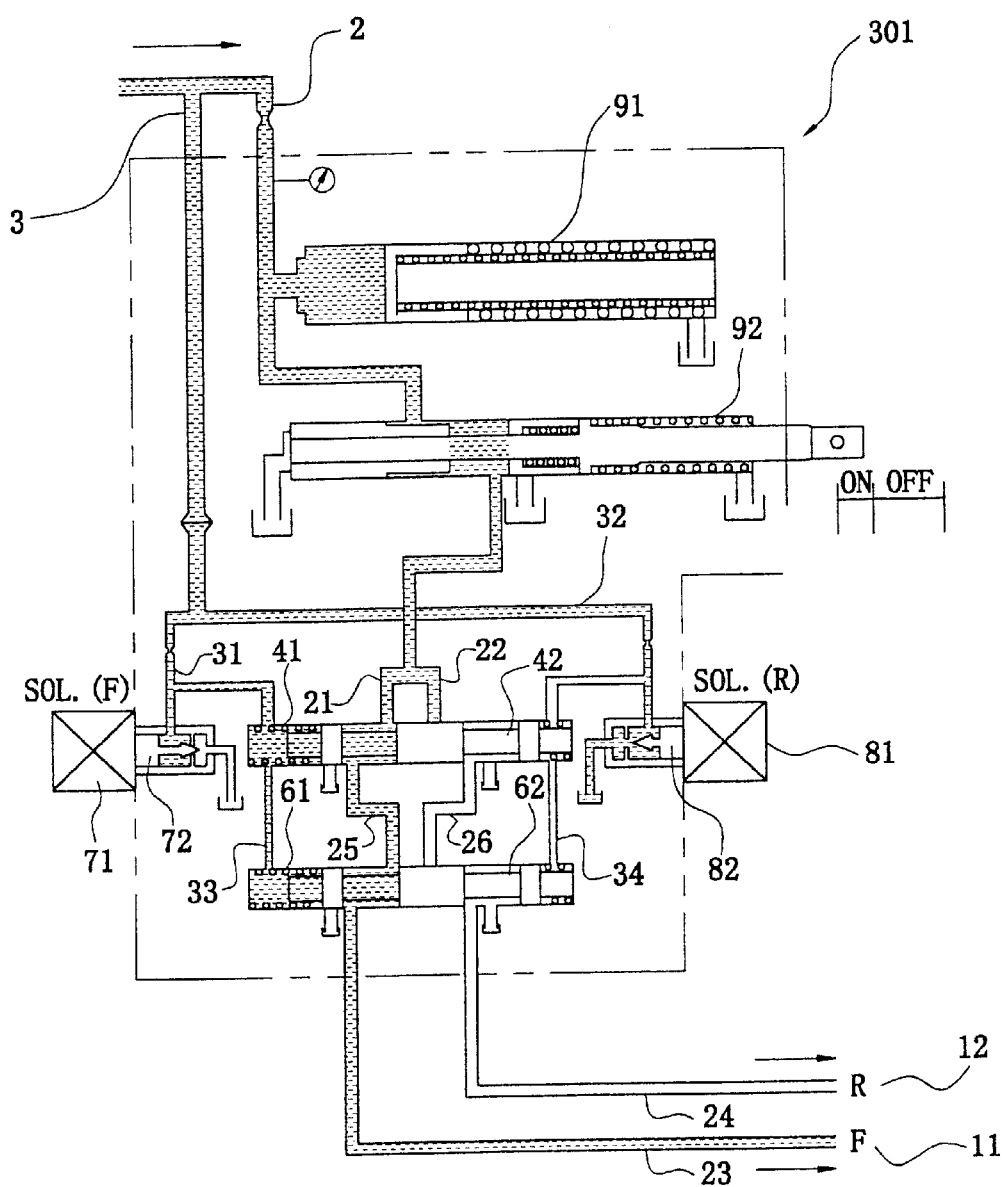
FIG. 6B is a schematic drawing showing the hydraulic control circuit depicted in FIG. 6A with the forward drive state selected.

Description is first given on the operation which is performed when the vehicle driver selects the forward drive state with reference to FIG. 6B.

When the vehicle driver selects the forward drive state, the pilot pressure is transmitted to the forward/reverse selector valve 41 and the neutral valve 61 via the pilot pressure transmission lines 31 and 33, respectively. Thereby, the forward/reverse selector spool 42 and the neutral spool 62 move rightward. Accordingly, the main pressure is supplied via the main pressure transmission lines 21, 25 and 23 to the forward hydraulic clutch 11. In this manner, the forward drive state selected by the vehicle driver is achieved.

Figure 6C:
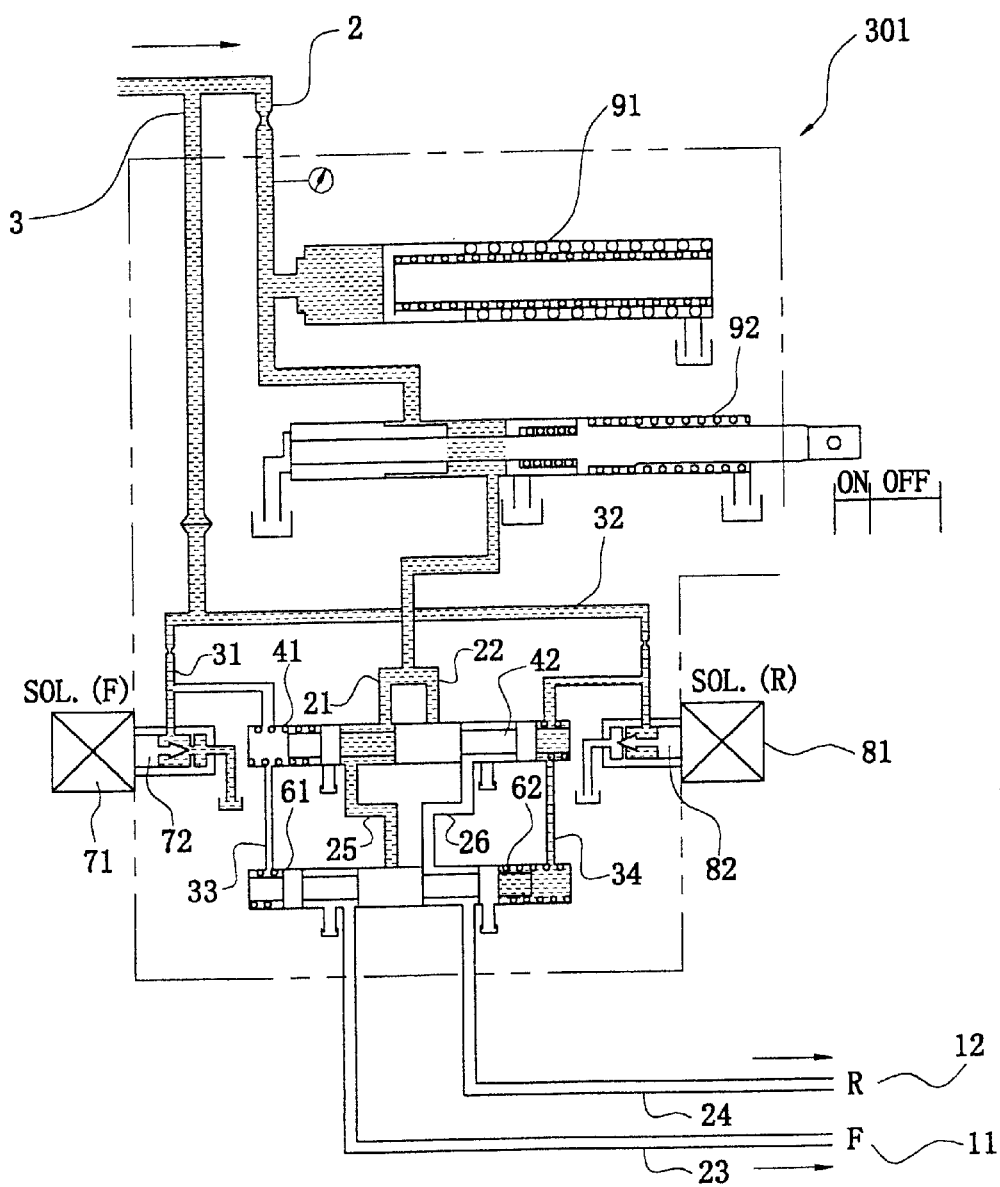
FIG. 6C is a schematic drawing showing the hydraulic control circuit depicted in FIG. 6A with the reverse drive state selected and a first spool member stuck in a forward drive state.

Now, description is given on the operation of the control hydraulic circuit 301 in the case where the forward/reverse selector spool 42 is stuck when the vehicle driver selects the reverse drive state after having been in the forward drive state, as shown in FIG. 6C.

When the vehicle driver selects the reverse drive state after releasing the forward drive state, the pilot pressure is transmitted via the pilot pressure transmission lines 32 and 34 to the forward/reverse selector valve 41 and the neutral valve 61, respectively. Thereby, the neutral spool 62 moves leftward. Since the forward/reverse selector spool 42 is stuck, it stays in the right position. Therefore, the main pressure is interrupted between the main pressure transmission lines 25 and 23. Also, the main pressure transmission line 22 is disconnected from the main pressure transmission line 26. Accordingly, the main pressure is supplied to neither the forward hydraulic clutch 11 nor the reverse hydraulic clutch 12, and therefore activates neither of them. Thus, the vehicle is in the neutral state.

Figure 6D:
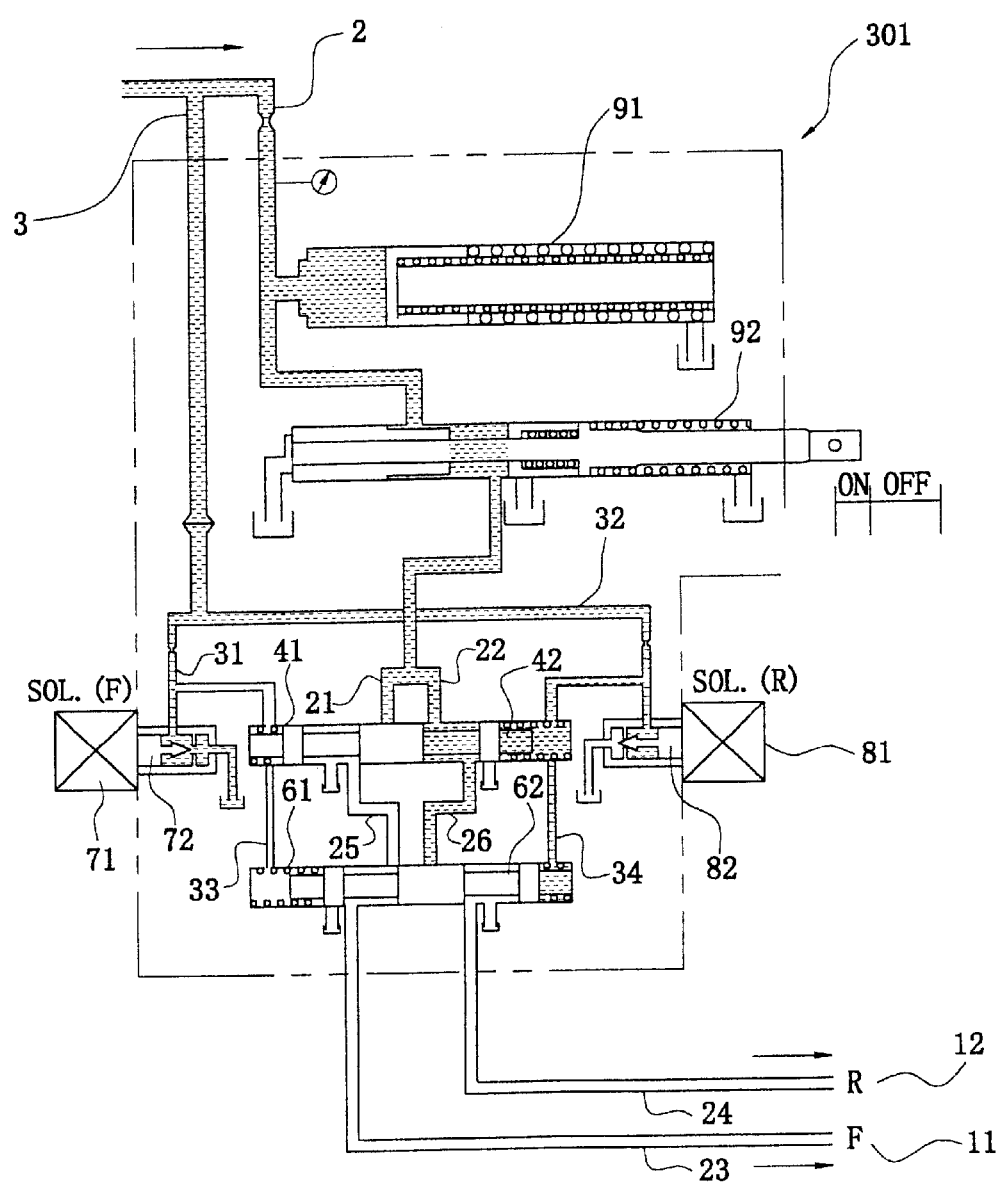
FIG. 6D is a schematic drawing showing the hydraulic control circuit depicted in FIG. 6A with the reverse drive state selected and a second spool member stuck in a reverse drive state.

Now, description is given on the operation of the control hydraulic circuit 1 in the case where the neutral spool 62 is stuck when the vehicle driver selects the reverse drive state after being in the forward drive state, as shown in FIG. 6D.

When the vehicle driver selects the reverse drive state after releasing the forward drive state, the pilot pressure is transmitted via the pilot pressure transmission lines 32 and 34 to the forward/reverse selector valve 41. Thereby, the forward/reverse selector spool 42 moves leftward. The neutral spool 62 which is stuck stays in the right position. Therefore, the main pressure is interrupted between the main pressure transmission lines 21 and 25. Further, the main pressure transmission line 22 is connected to the main pressure transmission line 26, but is disconnected from the main pressure transmission line 24. Accordingly, the main pressure is supplied to neither the forward hydraulic clutch 11 nor the reverse hydraulic clutch 12, and activates neither of them. Thus, the vehicle is in the neutral state.

According to the control hydraulic circuit of this embodiment, as described above, the vehicle enters the neutral state in the case where the forward/reverse selector spool and the neutral spool cannot operate when the vehicle driver switches the state from the forward drive to the reverse drive. Even in the above case, therefore, it is possible to prevent at least the forward movement of the vehicle, i.e., the movement in the direction opposite to that selected by the vehicle driver.

Figure 6E:
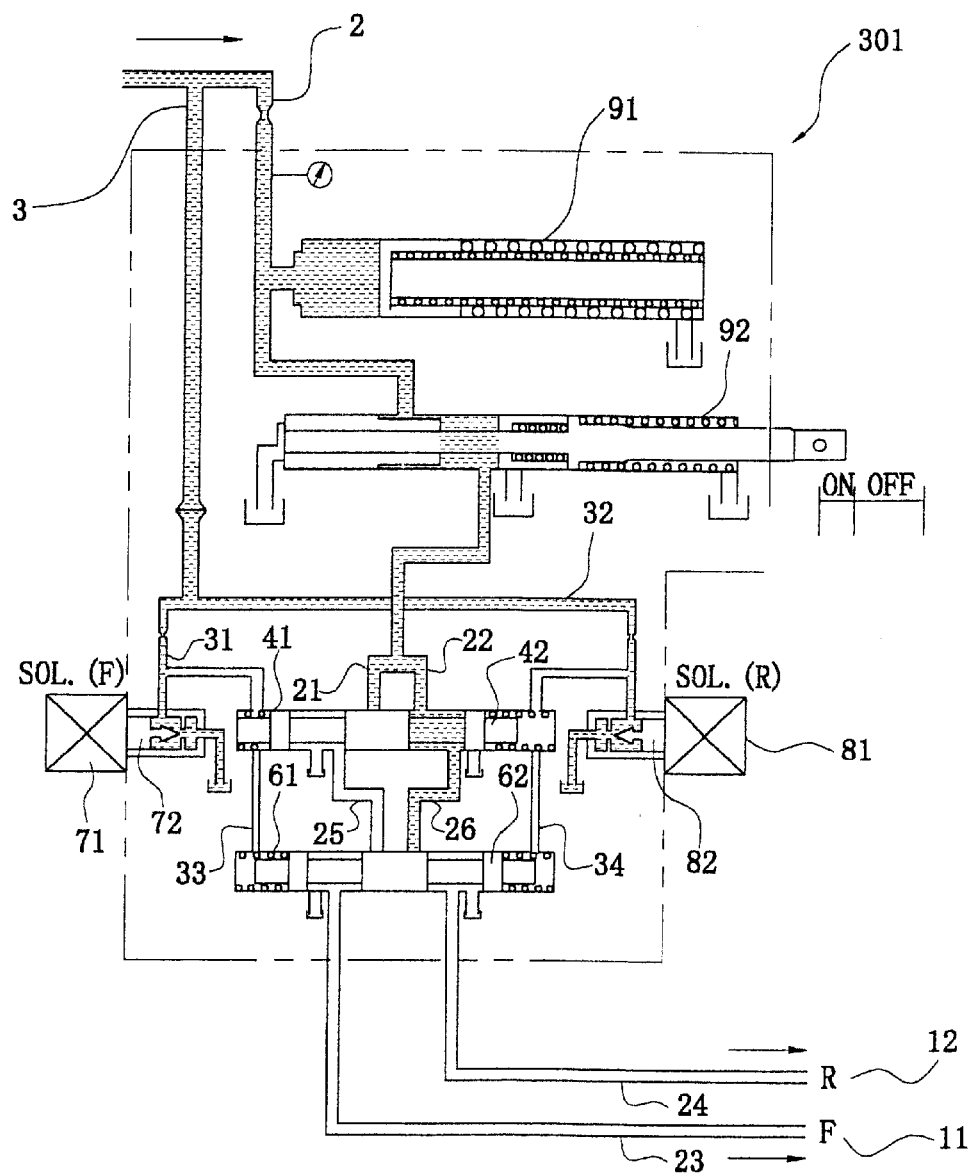
FIG. 6E is a schematic drawing showing the hydraulic control circuit depicted in FIG. 6A with the neutral drive state selected and the first spool member stuck in a reverse drive state.

Now, description is given on the operation of the control hydraulic circuit 301 in the case where the forward/reverse selector spool 42 is stuck when the vehicle driver selects the neutral state after being in the reverse drive state, as shown in FIG. 6E.

When the vehicle driver selects the neutral state after releasing the reverse drive state, the pilot pressure is not transmitted so that the forward/reverse selector spool 42 and the neutral spool 62 do not move. More specifically, the forward/reverse selector spool 42 which is stuck stays in the left position, and the neutral spool 62 does not move. As a result, the main pressure is interrupted between the main pressure transmission lines 25 and 23, and is also interrupted between the main pressure transmission lines 22 and 26. Accordingly, the main pressure is supplied to neither the forward hydraulic clutch 11 nor the reverse hydraulic clutch 12, and therefore activates neither of them. Thus, the vehicle is in the neutral state.

Figure 6F:
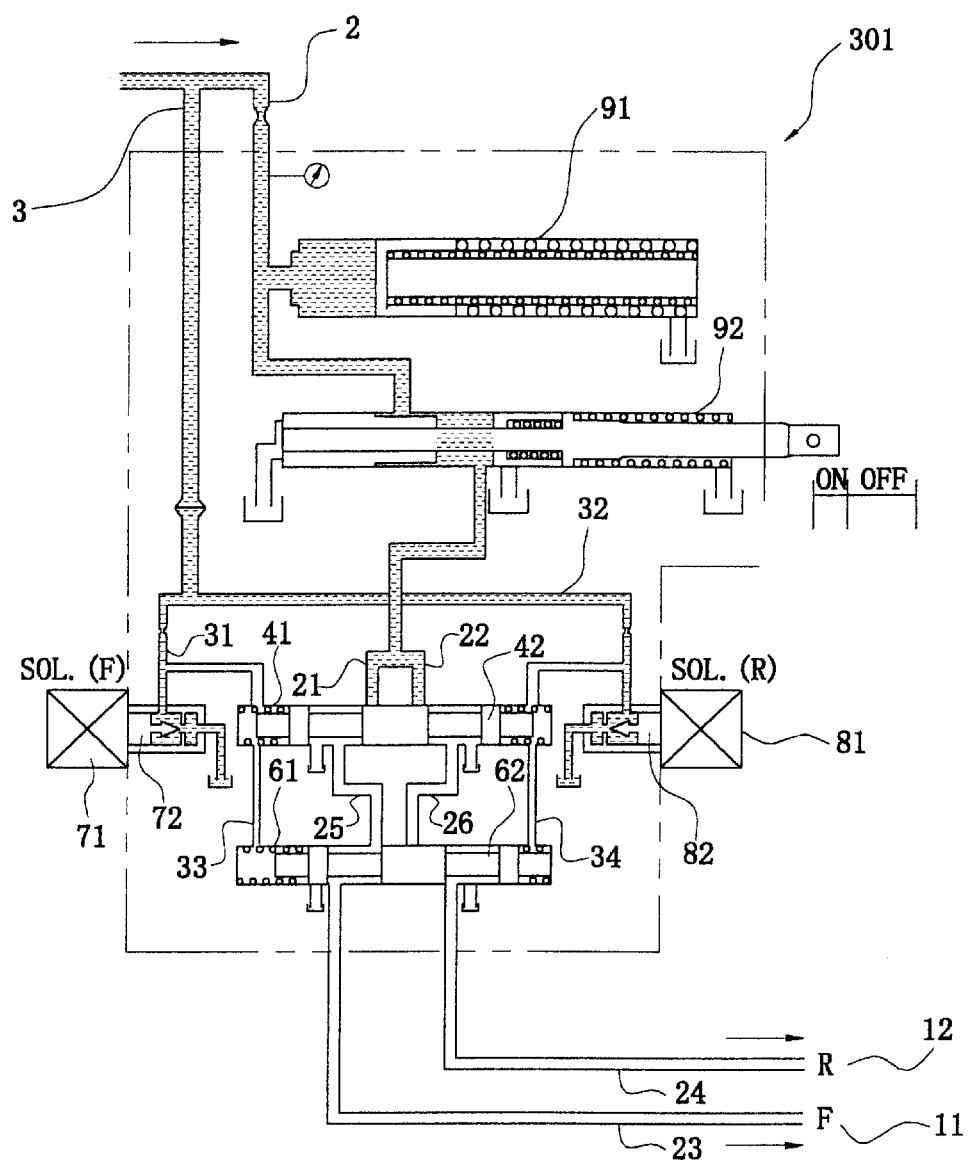
FIG. 6F is a schematic drawing showing the hydraulic control circuit depicted in FIG. 6A with the neutral drive state selected and the second spool member stuck in a reverse drive state.

Now, description is given on the operation of the control hydraulic circuit 301 in the case where the neutral spool 62 is stuck when the vehicle driver selects the neutral state after being in the forward drive state, as shown in FIG. 6F.

When the vehicle driver selects the neutral state after being in the forward drive state, the pilot pressure is not transmitted, and the forward/reverse selector spool 42 and the neutral spool 62 do not move. More specifically, the neutral spool 62 which is stuck stays in the right position, and the forward/reverse selector spool 42 does not move. As a result, the main pressure is interrupted by forward/reverse selector spool 42 between the main pressure transmission lines 21 and 22. Accordingly, the main pressure is supplied to neither the forward hydraulic clutch 11 nor the reverse hydraulic clutch 12, and therefore activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the forward drive state to the neutral state. Even in the above case, therefore, the neutral state can be achieved as selected by the vehicle driver.

Figure 6G:
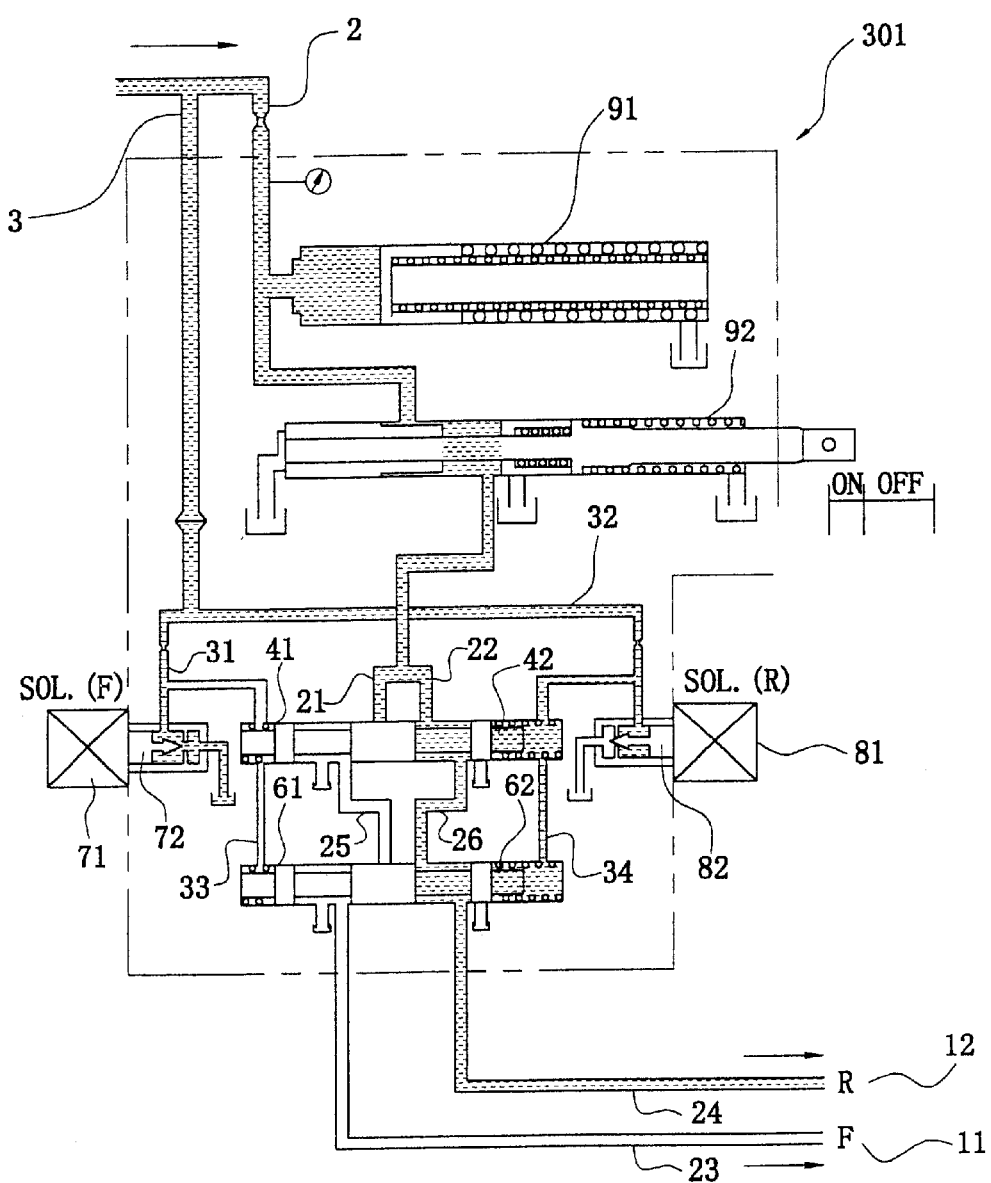
FIG. 6G is a schematic drawing showing the hydraulic control circuit depicted in FIG. 6A with the reverse drive state selected.

Now, description is given on the operation in the case where the vehicle driver selects the reverse drive state, as shown in FIG. 6G.

When the vehicle driver selects the reverse drive state, the pilot pressure is transmitted via the pilot pressure transmission lines 32 and 34 to the forward/reverse selector valve 41 and the neutral valve 61. Thereby, the forward/reverse selector spool 42 and the neutral spool 62 move leftward. Accordingly, the main pressure is supplied to the reverse hydraulic clutch 12 via the main pressure transmission lines 22, 26 and 24. In this manner, the reverse drive state selected by the vehicle driver is achieved.

Figure 6H:
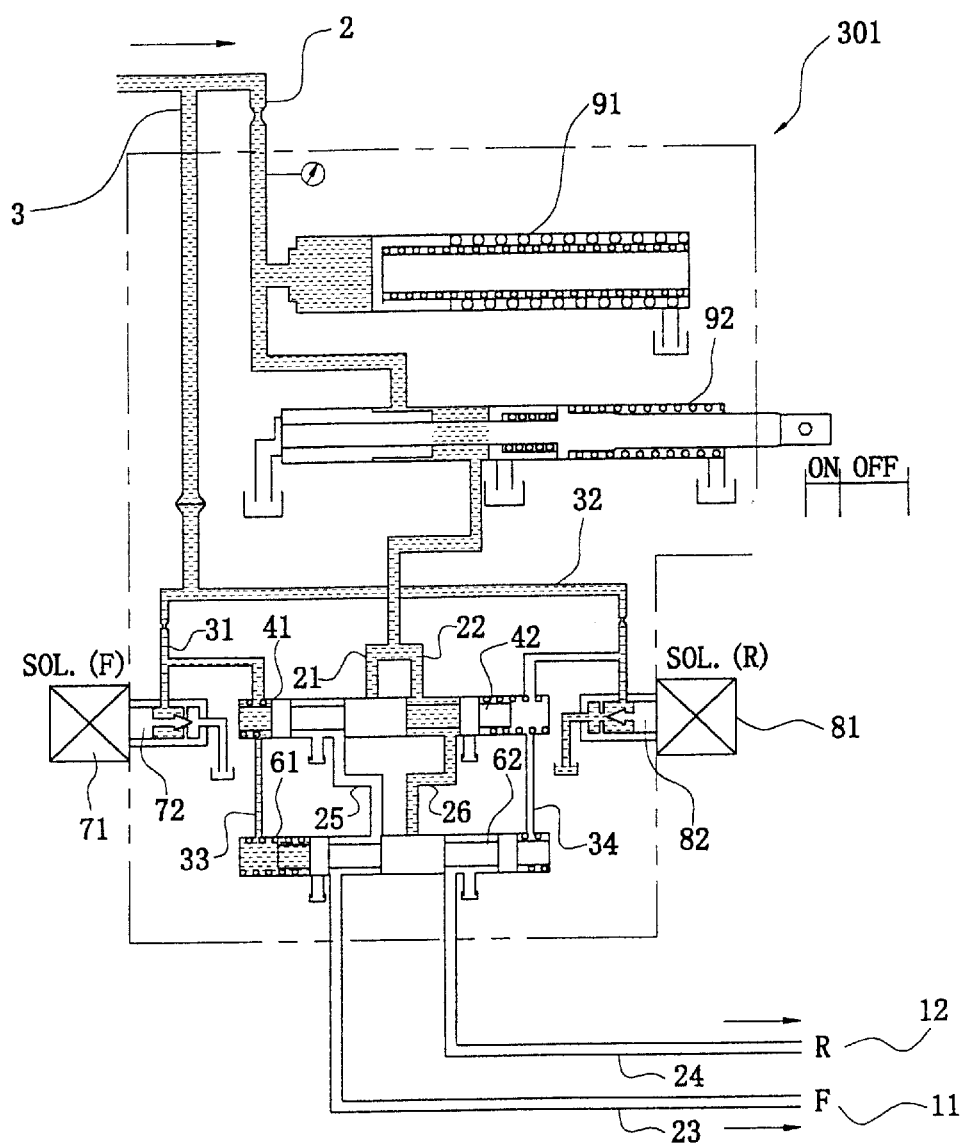
FIG. 6H is a schematic drawing showing the hydraulic control circuit depicted in FIG. 6A with the forward drive state selected and the first spool member stuck in a reverse drive state.

Now, description is given on the operation of the control hydraulic circuit 301 in the case where the forward/reverse selector spool 42 is stuck when the vehicle driver selects the forward drive state after being in the reverse drive state as shown in FIG. 6H.

When the vehicle driver selects the forward drive state after releasing the reverse drive state, the pilot pressure is transmitted via the pilot pressure transmission lines 31 and 33 to the forward/reverse selector valve 41 and the neutral valve 61. Thereby, the neutral spool 62 moves rightward. Since the forward/reverse selector spool 42 is stuck, it stays in the left position. Therefore, the main pressure is interrupted between the main pressure transmission lines 26 and 24. Further, the main pressure transmission line 21 is disconnected from the main pressure transmission line 25. Accordingly, the main pressure is supplied to neither the forward hydraulic clutch 11 nor the reverse hydraulic clutch 12, and activates neither of them. Thus, the vehicle is in the neutral state.

Figure 6I:
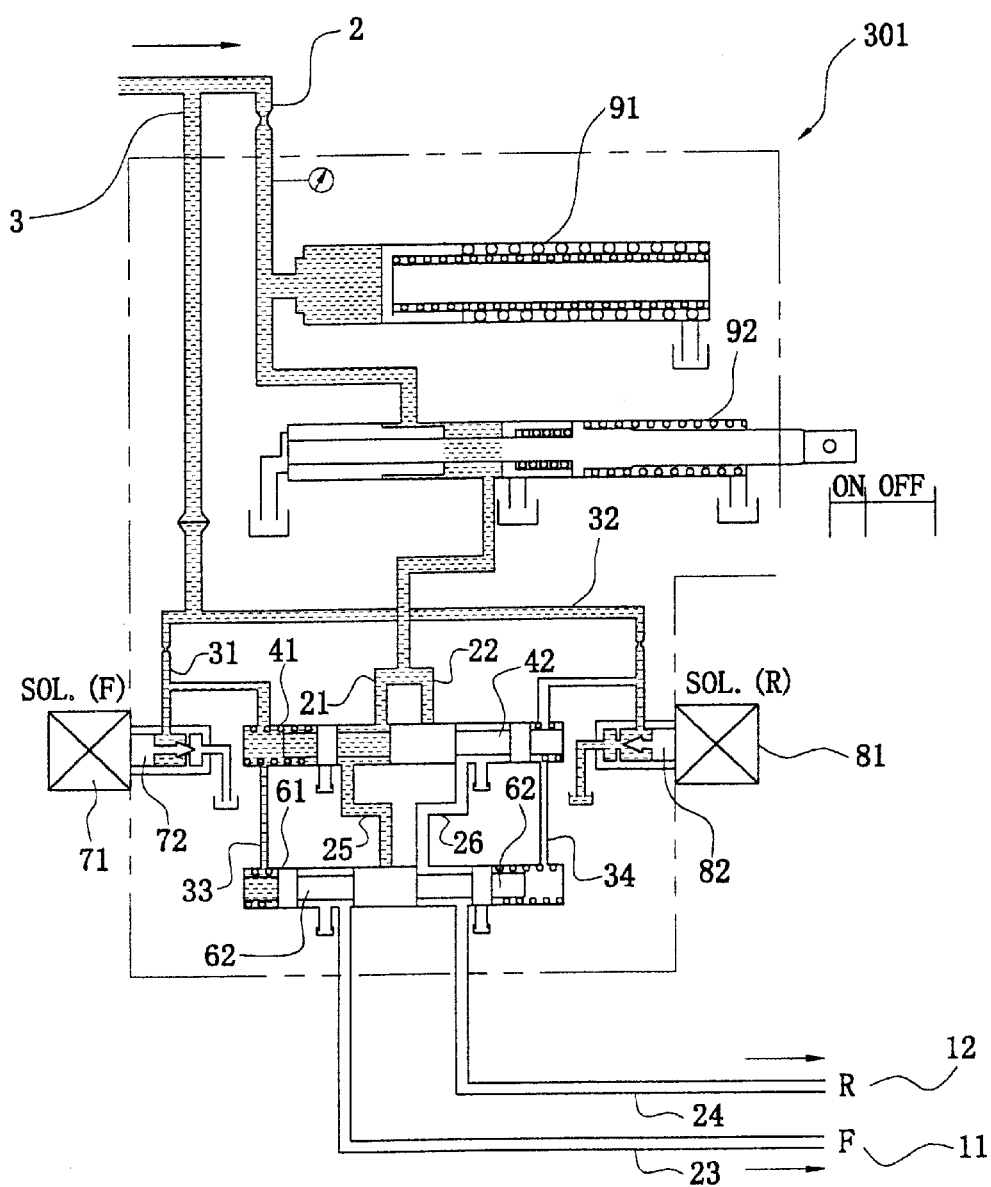
FIG. 6I is a schematic drawing showing the hydraulic control circuit depicted in FIG. 6A with the forward drive state selected and the second spool member stuck in a reverse drive state.

Now, description is given on the operation of the control hydraulic circuit 1 in the case where the neutral spool 62 is stuck when the vehicle driver selects the forward drive state after being in the reverse drive state as shown in FIG. 6I.

When the vehicle driver selects the forward drive state after being in the reverse drive state, the pilot pressure is transmitted to the forward/reverse selector valve 41 via the pilot pressure transmission lines 31 and 33. Thereby, the forward/reverse selector spool 42 moves rightward. Since the neutral spool 62 is stuck, it stays in the left position. As a result, the main pressure is interrupted between the main pressure transmission lines 22 and 26. Also, the main pressure transmission line 21 is connected to the main pressure transmission line 25, but is disconnected from the main pressure transmission line 23. Accordingly, the main pressure is supplied to neither the forward hydraulic clutch 11 nor the reverse hydraulic clutch 12, and activates neither of them. Thus, the vehicle is in the neutral state.

According to the control hydraulic circuit of this embodiment, as described above, the vehicle enters the neutral state in the case where the forward/reverse selector spool and the neutral spool cannot operate when the vehicle driver switches the state from the reverse drive state to the forward drive state. Even in the above case, therefore, the vehicle does not move in the reverse direction, i.e., the direction opposite to the direction selected by the vehicle driver.

Figure 6J:
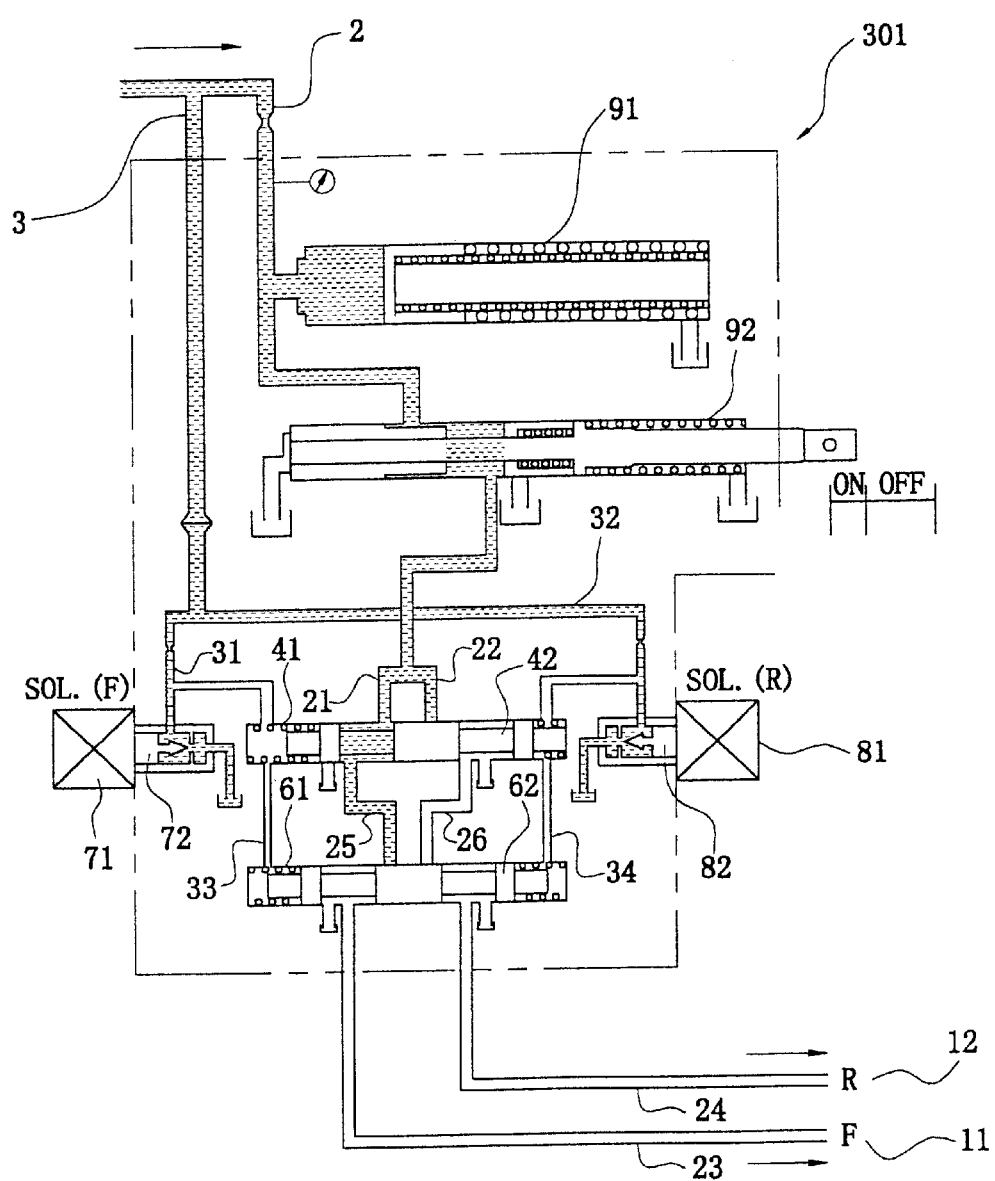
FIG. 6J is a schematic drawing showing the hydraulic control circuit depicted in FIG. 6A with the neutral drive state selected and the first spool member stuck in a reverse drive state.

Now, description is given on the operation of the control hydraulic circuit 1 in the case where the vehicle driver selects the neutral state after being the forward state, and the forward/reverse selector spool 42 is stuck, as shown in FIG. 6J.

When the vehicle driver selects the neutral state after being in the forward state, the pilot pressure is not transmitted so that the forward/reverse selector spool 42 and the neutral spool 62 do not move. Thus, the forward/reverse selector spool 42 which is stuck stays in the rightward position, and the neutral spool 62 does not move. As a result, the main pressure is interrupted between the main pressure transmission lines 26 and 24, and is also interrupted between the main pressure transmission lines 21 and 25. Therefore, the main pressure is supplied to neither the forward hydraulic clutch 11 nor the reverse hydraulic clutch 12, and activates neither of them. Thus, the vehicle is in the neutral state.

Figure 6K:
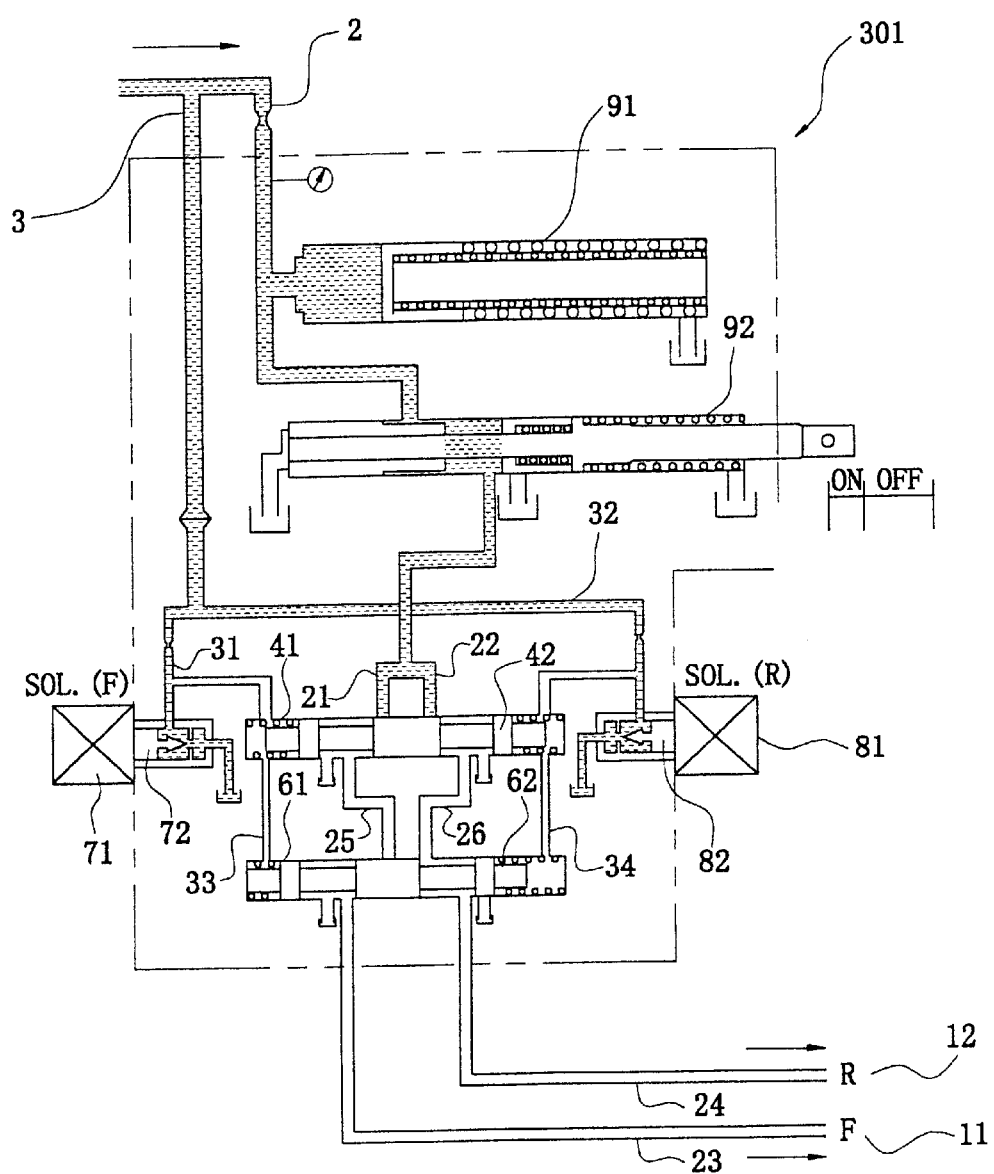
FIG. 6K is a schematic drawing showing the hydraulic control circuit depicted in FIG. 6A with the neutral drive state selected and the second spool member stuck in a reverse drive state.
Figure 7:
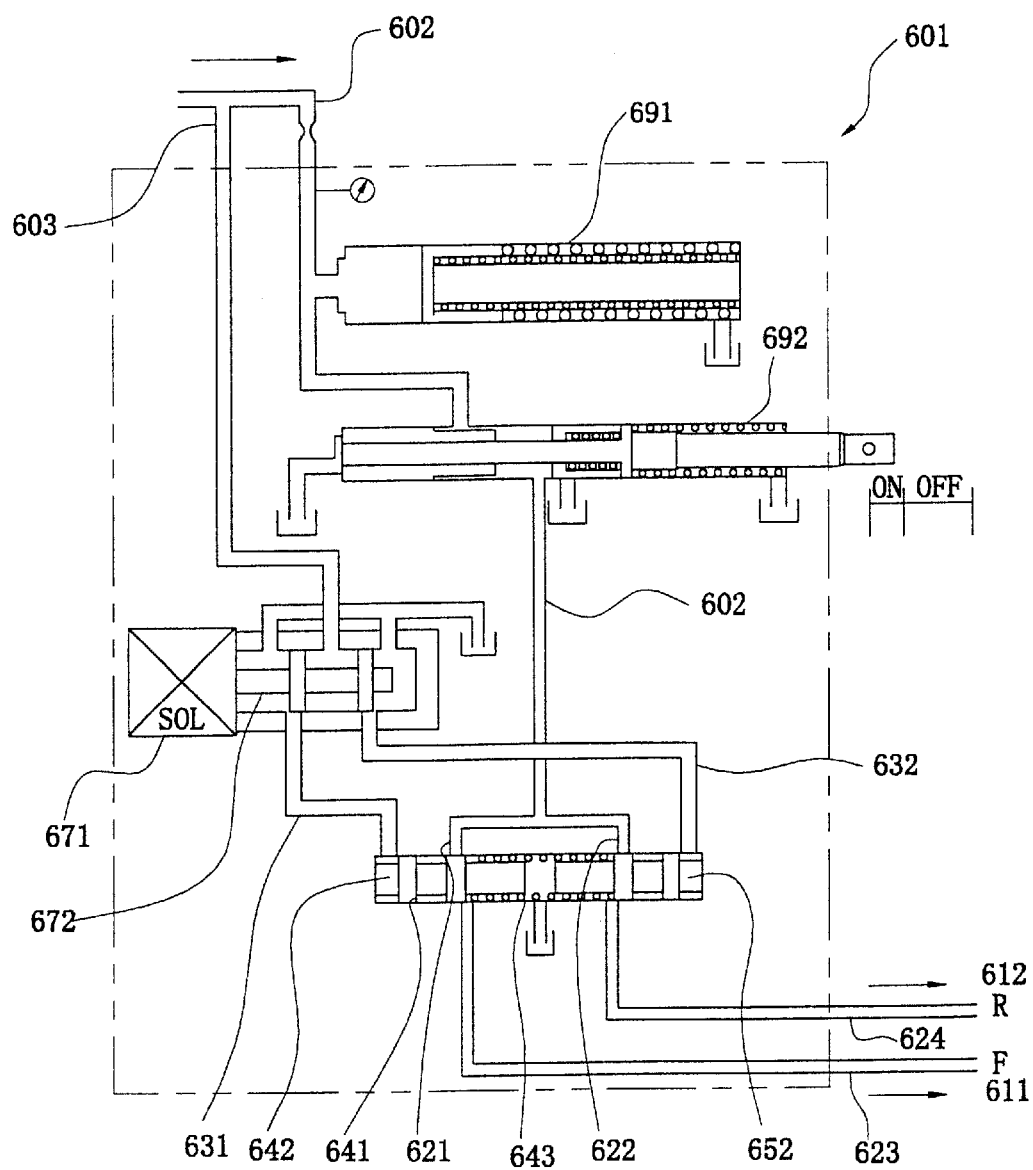
FIG. 7 is a schematic drawing showing a hydraulic control circuit for a hydraulically controlled transmission in accordance with the prior art.

Now, description is given on the operation of the control hydraulic circuit 301 in the case where the neutral spool 62 is stuck when the vehicle driver selects the neutral state after releasing the reverse state, as shown in FIG. 6K.

When the vehicle driver selects the neutral state after releasing the reverse state, the pilot pressure does not rise so that the forward/reverse selector spool 42 and the neutral spool 62 do not move. Thus, the neutral spool 62 which is stuck stays in the left position, and the forward/reverse selector spool 42 does not move. As a result, the main pressure is interrupted in the main pressure transmission lines 21 and 22 by the forward/reverse selector valve 41. Therefore, the main pressure is supplied to neither the forward hydraulic clutch 11 nor the reverse hydraulic clutch 12, and activates neither of them. Thus, the vehicle is in the neutral state.

According to the control hydraulic circuit of this embodiment, as described above, the vehicle enters neither the forward drive state nor the reverse drive state in the case where the forward/reverse selector spool and the neutral spool cannot operate when the vehicle driver switches the state from the reverse drive to the neutral state. Even in the above case, therefore, the neutral state selected by the vehicle driver can be achieved.

The above embodiment employs only one forward/reverse selector valve so that the hydraulic device can have a compact structure. Further, the paths and lines for transmitting the main pressure are simple so that it is possible to reduce a time required in the hydraulic circuit before activation of the clutch after signal reception.

According to the invention, it is possible to prevent at least the movement of the vehicle in the direction opposite to that selected by the vehicle driver when either the forward/reverse selector valve or the neutral valve cannot operate.

What is claimed is:

1. A hydraulic control circuit for controlling forward and reverse hydraulic clutches provided in an automatic transmission for engaging the automatic transmission in any one of a plurality selected states including a forward drive state, a reverse drive state and a neutral drive state, said hydraulic control circuit comprising:
    a main pressure transmission line in selective fluid communication with a forward hydraulic clutch and a reverse hydraulic clutch such that transmission of a main pressure in an operating fluid in said main pressure transmission line causes one of the forward hydraulic clutch and the reverse hydraulic clutch to become engaged for torque transmission through the automatic transmission;
    a first forward/reverse selecting valve arranged to selectively direct the main pressure in the operating fluid from said main pressure transmission line to the forward hydraulic clutch; and
    a second forward/reverse selecting valve arranged to selectively direct the main pressure in the operating fluid from said main pressure transmission line to the reverse hydraulic clutch;
    a first pilot pressure transmission line being connected to said main pressure transmission line to receive working fluid; and
    a second pilot pressure transmission line being connected to said first and second forward/reverse selecting valves to transmit working fluid therebetween,
    said first and second forward/reverse selecting valves being connected together such that in response to one of said first and second forward/reverse selecting valves becoming stuck in an undesirable position, the main pressure in the operating fluid is not transmitted to a selected one of the forward hydraulic clutch and the reverse hydraulic clutch thereby preventing misengagement of one of the clutches.

2. The hydraulic control circuit according to claim 1, wherein
    a portion of said first forward/reverse selecting valve is connected in series to a portion of said second forward/reverse selecting valve such that the main pressure in the operating fluid is directed through said portion of said first forward/reverse selecting valve in response to selection of the reverse hydraulic clutch, and in response to said first forward/reverse selecting valve becoming jammed in an undesirable position, the main pressure in the operating fluid directed through said second forward/reverse selecting valve is prevented from transmission to the reverse clutch.

3. The hydraulic control circuit according to claim 1, wherein
    a portion of said second forward/reverse selecting valve is connected in series to a portion of said first forward/reverse selecting valve such that the main pressure in the operating fluid is directed through said portion of said second forward/reverse selecting valve in response to selection of the forward hydraulic clutch, and in response to said second forward/reverse selecting valve becoming jammed in an undesirable position, the main pressure in the operating fluid directed through said first forward/reverse selecting valve is prevented from transmission to the forward clutch.

4. The hydraulic control circuit according to claim 1, further comprising:
    a forward solenoid connected to said pilot pressure line and a portion of said first forward/reverse selecting valve, said forward solenoid selectively controlling transmission of pilot pressure in the working fluid from said first pilot pressure transmission line to said first forward/reverse selecting valve.

5. The hydraulic control circuit according to claim 4, further comprising:
a reverse solenoid connected to said pilot pressure line and a portion of said second forward/reverse selecting valve, said reverse solenoid selectively controlling transmission of pilot pressure in the working fluid from said first pilot pressure transmission line to said second forward/reverse selecting valve.

6. The hydraulic control circuit according to claim 1, further comprising:
a neutral control valve, portions of said first and second forward/reverse selecting valve being in fluid communication with said neutral control valve; and
wherein said neutral control valve and said first and second forward/reverse selecting valves are connected together such that in response to one of said neutral control valve and said first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches.

7. A hydraulic control circuit for controlling forward and reverse hydraulic clutches provided in an automatic transmission for engaging the automatic transmission in any one of a plurality selected states including a forward drive state, a reverse drive state and a neutral drive state, said hydraulic control circuit comprising:
a main pressure transmission line in selective fluid communication with a forward hydraulic clutch and a reverse hydraulic clutch such that transmission of a main pressure in an operating fluid in said main pressure transmission line causes one of the forward hydraulic clutch and the reverse hydraulic clutch to become engaged for torque transmission through the automatic transmission;
means for selective control of engagement of the forward hydraulic clutch in selective fluid communication with said main pressure transmission line;
means for selective control of engagement of the reverse hydraulic clutch in selective fluid communication with said main pressure transmission line;
a first pilot pressure transmission line being connected to said main pressure transmission line for receiving working fluid;
a second pilot pressure transmission line being connected to said first and second forward/reverse selecting valves to transmit working fluid therebetween; and
means for preventing mis-engagement of the forward and reverse hydraulic clutches.

8. The hydraulic control circuit as set forth in claim 7 wherein
said means for selective control of engagement of the forward hydraulic control includes a first forward/reverse selecting valve selectively directing the main pressure in the operating fluid from said main pressure transmission line to the forward hydraulic clutch.

9. The hydraulic control circuit as set forth in claim 8 wherein
said means for selective control of engagement of the reverse hydraulic control includes a second forward/reverse selecting valve selectively directing the main pressure in the operating fluid from said main pressure transmission line to the reverse hydraulic clutch.

10. The hydraulic control circuit as set forth in claim 9 said first and second forward/reverse selecting valves are connected together such that in response to one of said first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches.

11. The hydraulic control circuit according to claim 10, wherein
a portion of said first forward/reverse selecting valve is connected in series to a portion of said second forward/reverse selecting valve such that the main pressure in the operating fluid is directed through said portion of said first forward/reverse selecting valve in response to selection of the reverse hydraulic clutch, and in response to said first forward/reverse selecting valve becoming jammed in an undesirable position, the main pressure in the operating fluid directed through said second forward/reverse selecting valve is prevented from transmission to the reverse clutch.

12. The hydraulic control circuit according to claim 11, wherein
a portion of said second forward/reverse selecting valve is connected in series to a portion of said first forward/reverse selecting valve such that the main pressure in the operating fluid is directed through said portion of said second forward/reverse selecting valve in response to selection of the forward hydraulic clutch, and in response to said second forward/reverse selecting valve becoming jammed in an undesirable position, the main pressure in the operating fluid directed through said first forward/reverse selecting valve is prevented from transmission to the forward clutch.

13. The hydraulic control circuit according to claim 12, further comprising:
a forward solenoid connected to said pilot pressure line and a second portion of said first forward/reverse selecting valve, said forward solenoid selectively controlling transmission of pilot pressure in the working fluid from said first pilot pressure transmission line to said first forward/reverse selecting valve.

14. The hydraulic control circuit according to claim 13, further comprising:
a reverse solenoid connected to said pilot pressure line and a second portion of said second forward/reverse selecting valve, said reverse solenoid selectively controlling transmission of pilot pressure in the working fluid from said first pilot pressure transmission line to said second forward/reverse selecting valve.

15. The hydraulic control circuit according to claim 14, further comprising:
a neutral control valve, portions of said first and second forward/reverse selecting valve being in fluid communication with said neutral control valve; and
wherein said neutral control valve and said first and second forward/reverse selecting valves are connected together such that in response to one of said neutral control valve and said first and second forward/reverse selecting valves becoming stuck in an undesirable position, the main pressure in the operating fluid is not transmitted to a selected one of the forward hydraulic clutch and the reverse hydraulic clutch thereby preventing mis-engagement of one of the clutches.

* * * * *